United States Patent
Togino

(10) Patent No.: US 6,201,648 B1
(45) Date of Patent: *Mar. 13, 2001

(54) OPTICAL SYSTEM

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,779

(22) Filed: Sep. 24, 1999

Related U.S. Application Data

(62) Division of application No. 08/758,666, filed on Dec. 2, 1996, now Pat. No. 6,128,144.

(51) Int. Cl.$^7$ ............................................. G02B 17/00
(52) U.S. Cl. ............................................. 359/728; 359/837
(58) Field of Search ........................... 359/720, 726–728, 359/868, 368, 372–378, 656–661, 678, 837

(56) References Cited

U.S. PATENT DOCUMENTS

| | | | |
|---|---|---|---|
| 3,810,221 | 5/1974 | Plummer | 396/382 |
| 3,836,931 | 9/1974 | Plummer | 396/352 |
| 4,518,231 | 5/1985 | Muchel et al. | 359/377 |
| 4,697,893 | 10/1987 | Fehr et al. | 359/377 |
| 4,717,246 | 1/1988 | Fehr et al. | 359/377 |
| 4,952,040 | 8/1990 | Igarashi | 359/708 |
| 4,976,524 | 12/1990 | Chiba | 359/708 |
| 5,005,957 | 4/1991 | Kanamori et al. | 359/708 |
| 5,513,041 | 4/1996 | Togino | 359/631 |
| 5,663,833 | * 9/1997 | Nanba et al. | 359/631 |
| 5,699,194 | 12/1997 | Takahashi | 359/631 |
| 5,701,202 | * 12/1997 | Takahashi | 359/631 |
| 5,706,136 | 1/1998 | Okuyama et al. | 359/630 |
| 5,714,967 | 2/1998 | Okamura et al. | 345/8 |
| 5,726,807 | 3/1998 | Nakaoka et al. | 359/631 |
| 5,812,323 | * 9/1998 | Takahashi | 359/630 |
| 5,909,325 | 6/1999 | Kuba et al. | 359/834 |
| 5,912,764 | * 6/1999 | Togino | 359/678 |

FOREIGN PATENT DOCUMENTS

| | | |
|---|---|---|
| 167926A1 | 1/1986 | (EP) . |
| 655636A1 | 5/1995 | (EP) . |
| 660155A1 | 6/1995 | (EP) . |
| 58-84201 | 5/1984 | (JP) . |
| 62-144127 | 6/1987 | (JP) . |
| 62-205547 | 9/1987 | (JP) . |
| 92/05462 | 4/1992 | (WO) . |

\* cited by examiner

*Primary Examiner*—Georgia Epps
*Assistant Examiner*—Jordan M. Schwartz
(74) *Attorney, Agent, or Firm*—Pillsbury Madison & Sutro LLP

(57) ABSTRACT

A compact optical system for microscope, endscope and binoculars capable of providing a clear image of minimal distortion even at a wide field angle. The optical system is a decentered optical system. Curved surfaces constituting the optical system include at least one rotationally asymmetric surface having no axis of rotational symmetry in or out of the surface. To correct rotationally asymmetric aberrations due to decentration by the rotationally asymmetric surface, the following condition is satisfied:

$$-1000 < FX/FXn < 1000$$

where FX is the focal length in the X-direction of the optical system, and FXn is the focal length in the X-direction of a portion of the rotationally asymmetric surface on which an axial principal ray strikes.

153 Claims, 54 Drawing Sheets

23 Binoculars

27 Ocular optical system
Image plane
Entrance pupil position
Rotationally asymmetric surface
T1
R1
Exit pupil
18 Image-forming optical system
R2
T2

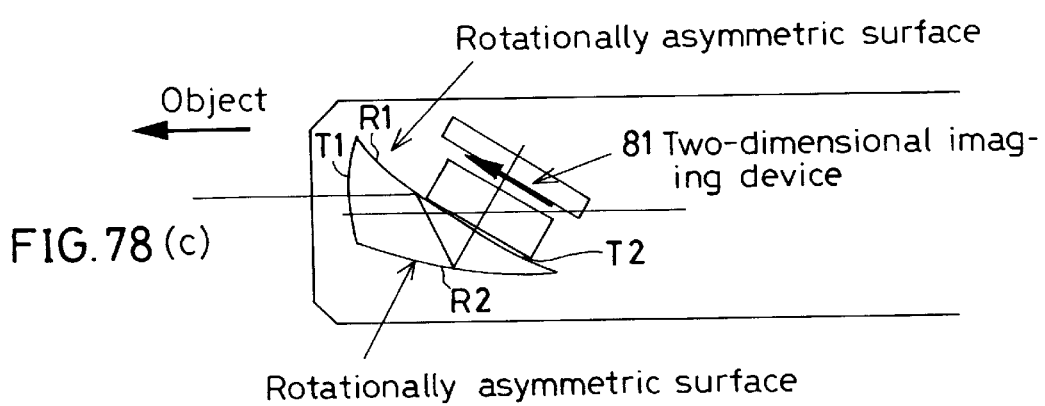

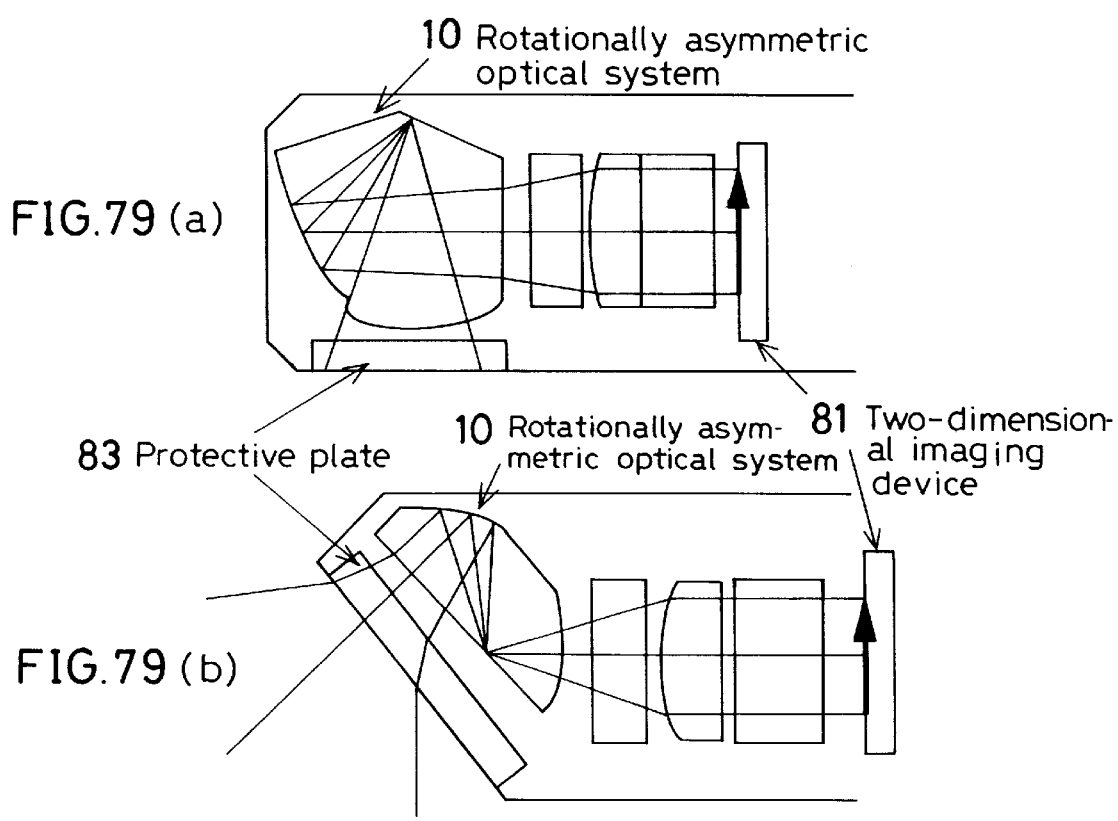

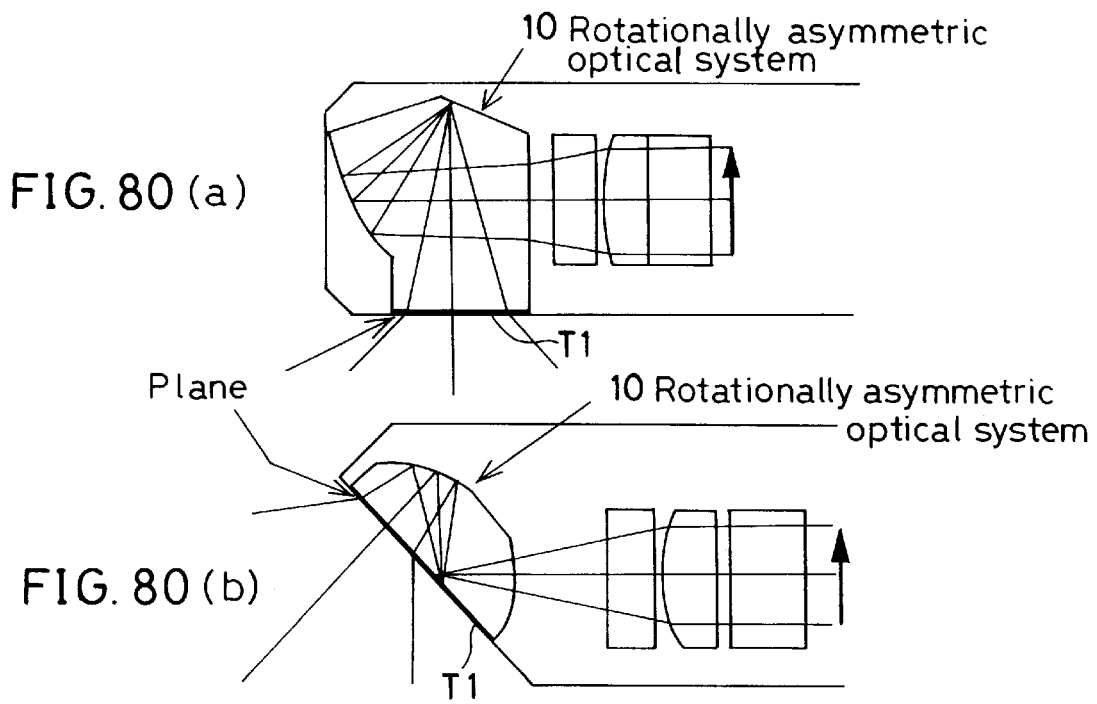
FIG. 80(a)
FIG. 80(b)
FIG. 81
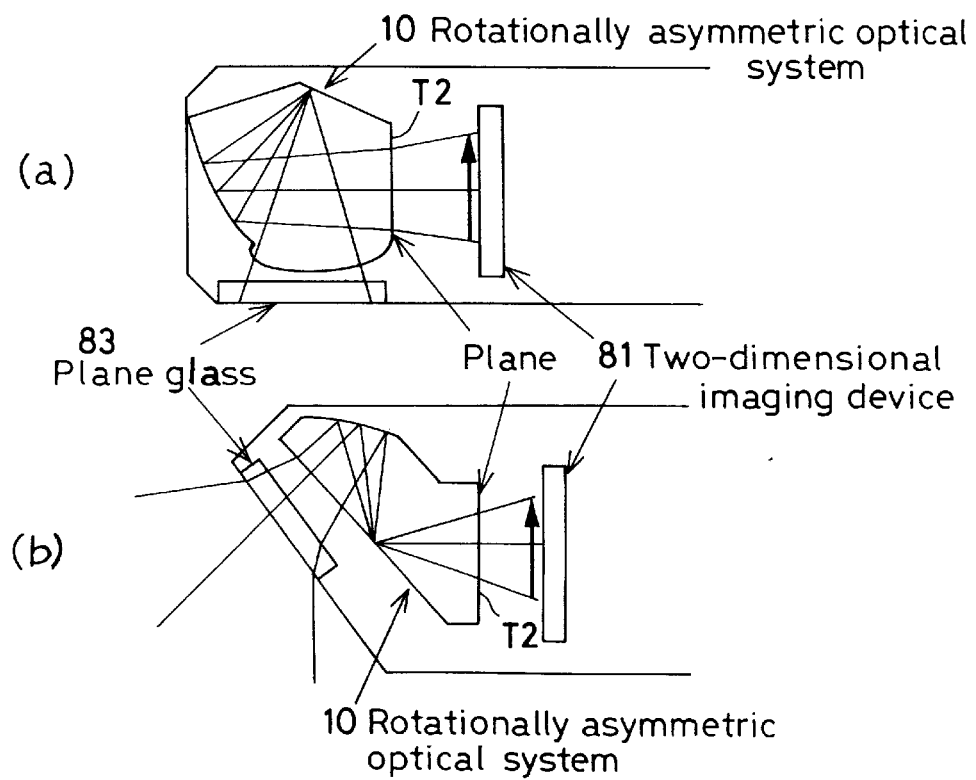

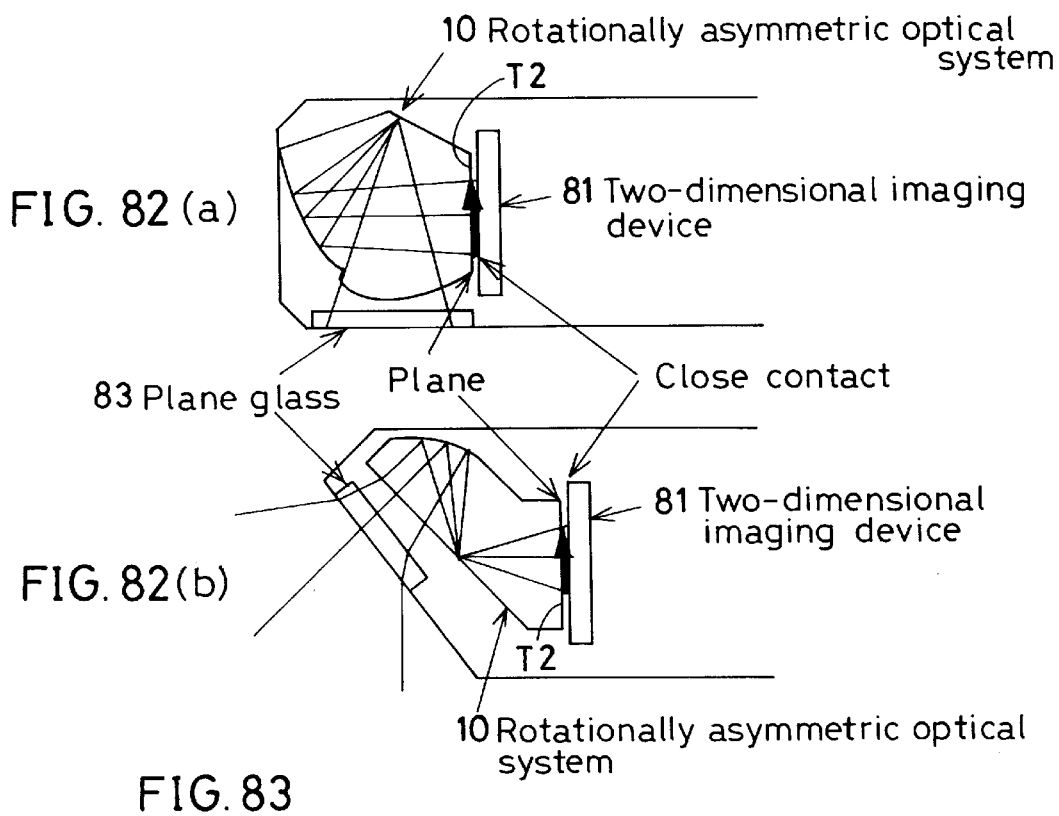
FIG. 82(a)
FIG. 82(b)
FIG. 83
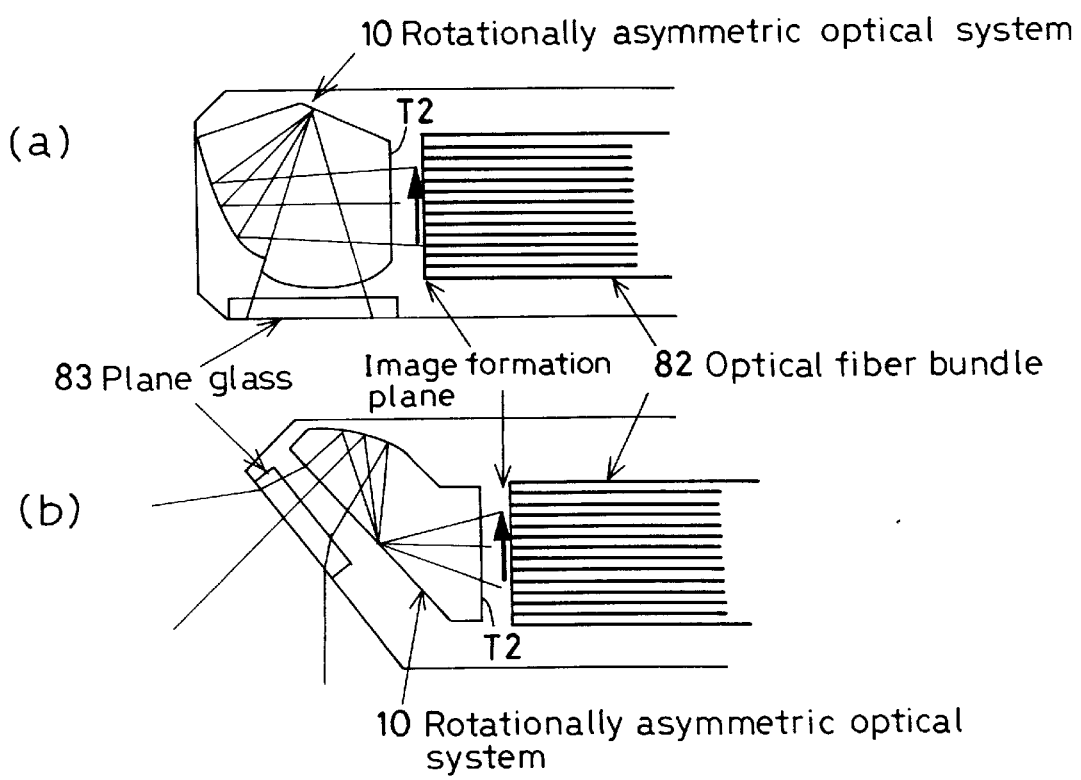

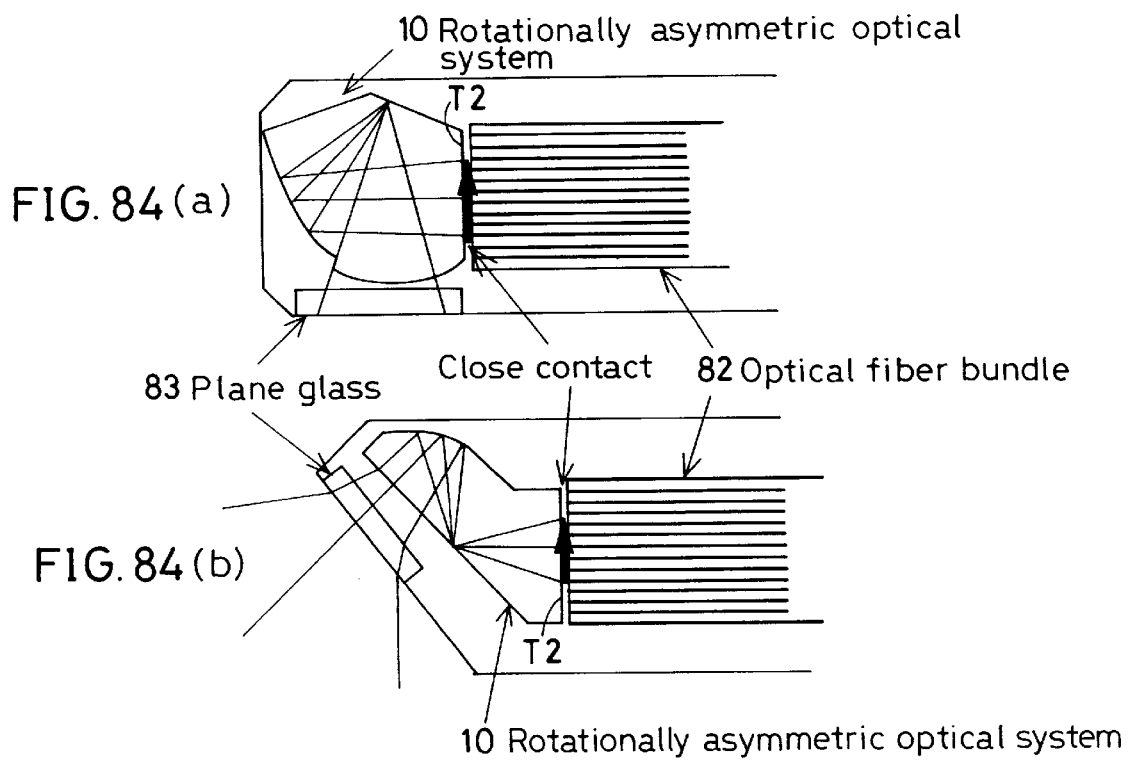
FIG. 84(a)
FIG. 84(b)
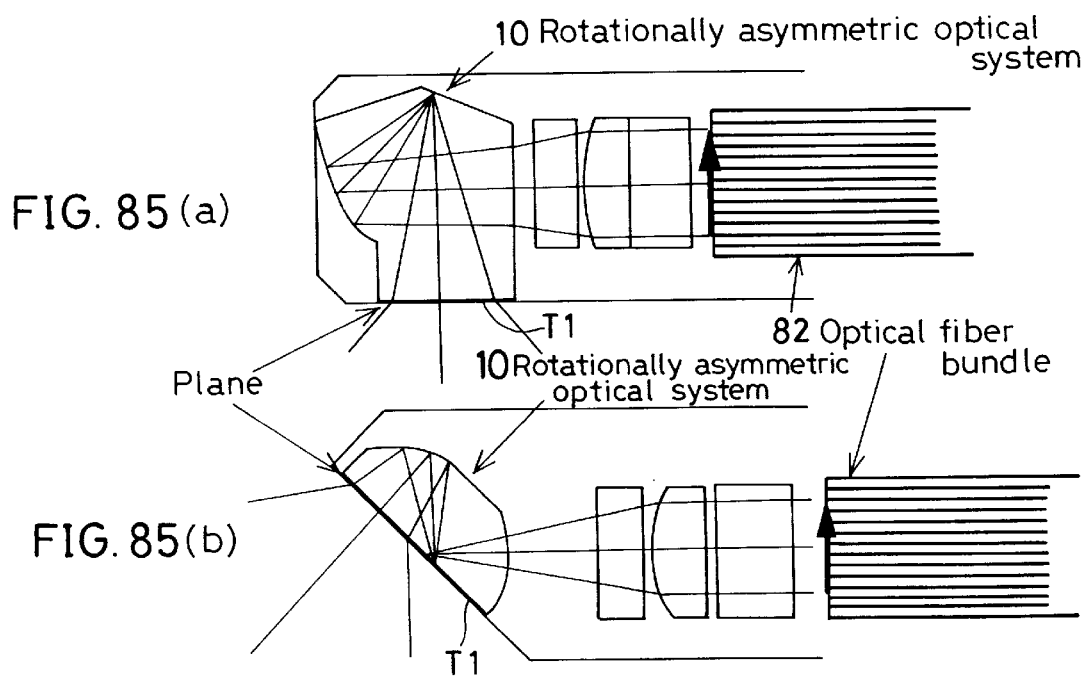
FIG. 85(a)
FIG. 85(b)

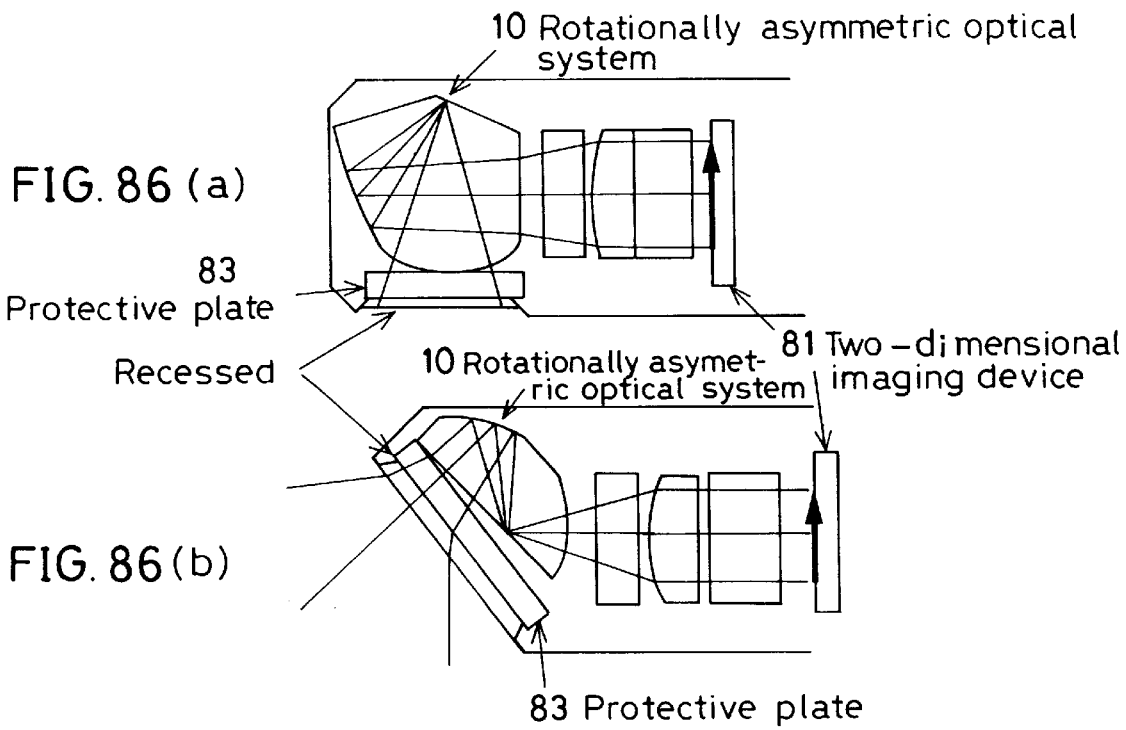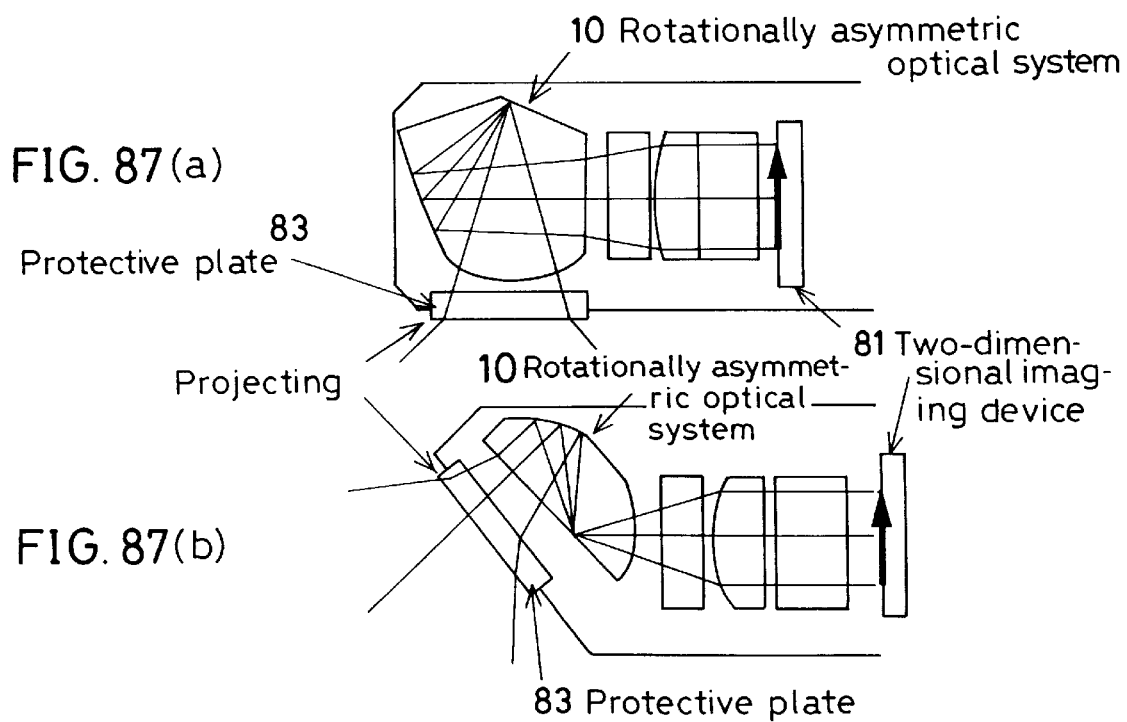

OPTICAL SYSTEM

This is a division of application Ser. No. 08/758,666, filed Dec. 2, 1996 now U.S. Pat. No. 6,128,144.

BACKGROUND OF THE INVENTION

The present invention relates to an optical system and, more particularly, to a decentered optical system having power, which comprises a decentered reflecting surface.

There has heretofore been known a compact reflecting decentered optical system as disclosed in Japanese Pat. Appln. Laid-Open (KOKAI) No. 59-84201. This is an invention of a one-dimensional light-receiving lens comprising a cylindrical reflecting surface; therefore, two-dimensional imaging cannot be effected with the conventional optical system. Japanese Pat. Appln. Laid-Open (KOKAI) No. 62-144127 discloses an optical system wherein the identical cylindrical surface is used twice to effect reflection in order to reduce spherical aberration in the above-mentioned invention. Japanese Pat. Appln. Laid-Open (KOKAI) No. 62-205547 discloses the use of an aspherical reflecting surface as a reflecting surface, but makes no mention of the configuration of the reflecting surface.

U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

Japanese Pat. Appln. Laid-Open (KORAI) No. 1-257834 (U.S. Pat. No. 5,274,406) discloses an example in which a surface having only one plane of symmetry is used for a reflecting mirror to correct image distortion in a back projection type television. In this example, however, a projection lens system is used for projection onto a screen, and the surface having only one plane of symmetry is used for correction of image distortion.

Japanese Pat. Appln. Laid-Open (KOKAI) No. 7-333551 discloses an example of a back-coated mirror type decentered optical system using an anamorphic surface and a toric surface as an observation optical system. However, the decentered optical system is not sufficiently corrected for aberrations, including image distortion.

None of the above-described prior art use a surface having only one plane of symmetry as a back-coated mirror to form a turn-back optical path.

In the conventional rotationally symmetric optical systems, a transmitting rotationally symmetric lens having refracting power is assigned to exert the required refracting power. Therefore, many constituent elements are needed for aberration correction. In the conventional decentered optical systems, however, an imaged figure or the like is undesirably distorted and the correct shape cannot be recorded unless aberrations of the formed image are favorably corrected and, particularly, rotationally asymmetric distortion is favorably corrected.

In a rotationally symmetric optical system comprising a refracting lens which is formed from a surface rotationally symmetric about an optical axis, a straight-line optical path is formed. Therefore, the whole optical system undesirably lengthens in the direction of the optical axis, resulting in an unfavorably large-sized apparatus.

In view of the problems associated with the prior art, an object of the present invention is to provide a compact optical system capable of providing a clear image of minimal distortion even at a wide field angle.

SUMMARY OF THE INVENTION

To attain the above-described object, the present invention provides a decentered optical system including at least one curved surface with a rotationally asymmetric surface configuration having no axis of rotational symmetry in nor out of the surface, wherein rotationally asymmetric aberrations due to decentration are corrected by the rotationally asymmetric surface.

According to a first aspect of the present invention, there is provided a decentered optical system including at least one rotationally asymmetric surface having no axis of rotational symmetry in nor out of the surface, wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the X-axis direction are made to enter the optical system from the entrance side thereof, and the sine of an angle formed between the two rays as projected on the XZ-plane at the exit side of the optical system is denoted by NA'X, and further that a value obtained by dividing the distance d between the parallel rays by NA'X is denoted by FX, and the focal length in the X-axis direction of that portion of the rotationally asymmetric surface on which the axial principal ray strikes is denoted by FXn, the following condition is satisfied to correct rotationally asymmetric aberrations due to decentration by the rotationally asymmetric surface:

$$-1000 < FX/FXn < 1000 \qquad (1\text{-}1)$$

According to a second aspect of the present invention, there is provided a decentered optical system including at least one rotationally asymmetric surface having no axis of rotational symmetry in nor out of the surface, wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the Y-axis direction are made to enter the optical system from the entrance side thereof, and the sine of an angle formed between the two rays in the YZ-plane at the exit side of the optical system is denoted by NA'Y, and further that a value obtained by dividing the distance d between the parallel rays by NA'Y is denoted by FY, and the focal length in the Y-axis direction of that portion of the rotationally asymmetric surface on which the axial principal ray strikes is denoted by FYn, the following condition is satisfied to correct rotationally asymmetric aberrations due to decentration by the rotationally asymmetric surface:

$$1000 < FY/FYn < 1000 \tag{2-1}$$

According to a third aspect of the present invention, there is provided a decentered optical system including at least one rotationally asymmetric surface having no axis of rotational symmetry in nor out of the surface, wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the X-axis direction are made to enter the optical system from the entrance side thereof, and the sine of an angle formed between the two rays as projected on the XZ-plane at the exit side of the optical system is denoted by NA'X, and a value obtained by dividing the distance d between the parallel rays by NA'X is denoted by FX, and further that the principal ray and a light ray which is parallel to the principal ray at a slight distance d in the Y-axis direction are made to enter the optical system from the entrance side thereof, and the sine of an angle formed between the two rays in the YZ-plane at the exit side of the optical system is denoted by NA'Y, and a value obtained by dividing the distance d between the parallel rays by NA'Y is denoted by FY, the following condition is satisfied to correct rotationally asymmetric aberrations due to decentration by the rotationally asymmetric surface:

$$0.0 < |FY/FX| < 100 \tag{3-1}$$

First of all, a coordinate system used in the following description will be explained. It is assumed that a light ray passing through the center of an object point and passing through the center of a stop to reach the center of an image plane is defined as an axial principal ray. It is also assumed that an optical axis defined by a straight line intersecting the first surface of the optical system is defined as a Z-axis, and that an axis perpendicularly intersecting the Z-axis in the decentration plane of each surface constituting the optical system is defined as a Y-axis, and further that an axis perpendicularly intersecting the optical axis and also perpendicularly intersecting the Y-axis is defined as an X-axis.

Ray tracing will be described by forward ray tracing in which light rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces.

However, in a decentered optical system, rotationally asymmetric aberrations due to decentration cannot be corrected by a rotationally symmetric optical system.

The arrangement and operation of the present invention will be described below.

The basic arrangement of the present invention is as follows: A decentered optical system includes at least one curved surface with a rotationally asymmetric surface configuration having no axis of rotational symmetry in nor out of the surface, and rotationally asymmetric aberrations due to decentration are corrected by the rotationally asymmetric surface.

When a rotationally symmetric optical system is decentered, rotationally asymmetric aberrations occur, and it is impossible to correct these aberrations only by the rotationally symmetric optical system. Rotationally asymmetric aberrations due to decentration include image distortion, curvature of field, and astigmatic and comatic aberrations, which occur even on the axis. FIG. 99 shows curvature of field produced by a decentered concave mirror M. FIG. 100 shows axial astigmatism produced by a decentered concave mirror M. FIG. 101 shows axial comatic aberration produced by a decentered concave mirror M. According to the present invention, a rotationally asymmetric surface is disposed in the optical system to correct such rotationally asymmetric aberrations due to decentration.

Rotationally asymmetric aberrations produced by the decentered concave mirror M include rotationally asymmetric curvature of field such as that shown in FIG. 99. For example, when light rays from an infinitely distant object point are incident on the decentered concave mirror M, the light rays are reflected by the concave mirror M to form an image. In this case, the back focal length from that portion of the concave mirror M on which the light rays strike to the image surface is half the curvature of the portion on which the light rays strike. Consequently, an image surface tilted with respect to the axial principal ray is formed as shown in FIG. 99. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction. It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 100, as in the case of the above. The astigmatism can be corrected by appropriately changing the curvature in the X-axis direction of the rotationally asymmetric surface as in the case of the above.

Rotationally asymmetric coma will be explained below. A decentered concave mirror M produces coma even for axial rays, as shown in FIG. 101, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

As the above-described rotationally asymmetric surface, it is desirable to use a plane-symmetry three-dimensional surface characterized by having only one plane of symmetry.

The term "three-dimensional surface" as used in the present invention means a surface which is defined by the following equation:

$$Z = C_2 + C_3 y + C_4 x + C_5 y^2 + C_6 yx + C_7 x^2 + C_8 y^3 + C_9 y^3 x + \quad (a)$$
$$C_{10} yx^2 + C_{11} x^3 + C_{12} y^4 + C_{13} y^3 x + C_{15} yx^3 +$$
$$C_{16} x^4 + C_{17} y^5 + C_{18} y^4 x + C_{19} y^3 x^2 + C_{20} y^2 x^3 + C_{21} yx^4 +$$
$$C_{22} x^5 + C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 + C_{33} y^4 x^3 +$$
$$C_{34} y^3 x^4 + C_{35} y^2 x^5 + C_{36} yx^6 + C_{37} x^7$$

where $C_m$ (m is an integer of 2 or higher) are coefficients.

In general, the above-described three-dimensional surface does not have planes of symmetry in both the XZ- and YZ-planes. In the present invention, a three-dimensional surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, ... are set equal to zero. By doing so, it is possible to obtain a three-dimensional surface having only one plane of symmetry parallel to the YZ-plane.

A three-dimensional surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, ... are set equal to zero. By doing so, it is possible to obtain a three-dimensional surface having only one plane of symmetry parallel to the XZ-plane. The use of a three-dimensional surface having such a plane of symmetry makes it possible to improve the productivity.

Rotationally asymmetric aberrations due to decentration can be effectively corrected by using a three-dimensional surface having either a plane of symmetry parallel to the YZ-plane or a plane of symmetry parallel to the XZ-plane.

It should be noted that the above defining equation is shown merely as an example, and that the feature of the present invention resides in that rotationally asymmetric aberrations due to decentration are corrected by a rotationally asymmetric surface having only one plane of symmetry. Therefore, the same advantageous effect can be obtained for any other defining equation.

It is desirable that the plane of symmetry of the rotationally asymmetric surface should be disposed in a plane approximately coincident with the decentration plane, which is the direction of decentration of each surface constituting the optical system.

If the rotationally asymmetric surface is a three-dimensional surface which is disposed in the decentered optical system and which has a plane of symmetry approximately coincident with the decentration plane of each decentered surface, both sides of the plane of symmetry can be made symmetric. This makes it possible to favorably effect aberration correction and to improve the productivity to a considerable extent.

It is also desirable to use the rotationally asymmetric surface as a reflecting surface.

If the above-described three-dimensional surface is formed as a reflecting surface, aberration correction can be made favorably. If a rotationally asymmetric surface is used as a reflecting surface, no chromatic aberration occurs in contrast to a case where it is used as a transmitting surface. Moreover, even if the tilt of the surface is small, the surface can bend light rays. Accordingly, the amount of other aberration produced by the surface is also small. In other words, when the same refracting power is to be obtained, the amount of aberration produced by a reflecting surface is smaller than by a refracting surface.

In this case, it is desirable for the reflecting surface to be a surface having totally reflecting action or reflecting action.

If the reflecting surface is a totally reflecting surface tilted with respect to light rays so that the light rays are incident thereon at an angle exceeding the critical angle, a high reflectivity can be obtained. The reflecting surface is preferably a reflecting surface having a thin film of a metal, e.g. aluminum or silver, formed thereon, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

The rotationally asymmetric surface having only one plane of symmetry can also be used as a back-coated mirror.

By forming the above-described reflecting surface from a back-coated mirror, curvature of field can be reduced. The reason for this is as follows: When concave mirrors of the same focal length are to be formed from a back-coated mirror and a surface-coated mirror, respectively, the back-coated mirror can have a greater radius of curvature by an amount corresponding to the refractive index and thus produces a smaller amount of aberration, particularly curvature of field.

Assuming that a light ray emanating from the center of an object point and passing through the center of a pupil to reach the center of an image is defined as a principal ray, and that a Y-axis is taken in the decentration plane of each surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the X-axis direction are made to enter the optical system from the entrance side thereof, and the sine of an angle formed between the two rays as projected on the XZ-plane at the exit side of the optical system is denoted by NA'X, and further that a value obtained by dividing the distance d between the parallel rays by NA'X is denoted by FX, and the focal length in the X-axis direction of that portion of the rotationally asymmetric surface on which the axial principal ray strikes is denoted by FXn, it is desirable to satisfy the following condition:

$$1000 < FX/FXn < 1000 \qquad (1\text{-}1)$$

The focal length of each surface of the optical system according to the present invention will be described. It is preferable from the viewpoint of aberration correction to satisfy the above condition (1-1) on the assumption that, as shown in FIG. 102, the direction of decentration of the optical system S is taken in the Y-axis direction, and that a light ray of height d in the YZ-plane which is parallel to the axial principal ray of the optical system S is made to enter the optical system S from the object side, and the sine of an angle formed between the parallel light and the axial principal ray as they are projected on the YZ-plane after exiting from the optical system S is denoted by NA'Y, and further that d/NA'Y is defined as a focal length FY in the Y-axis direction, and a focal length FX in the X-axis direction is similarly defined, and further that the focal length in the X-axis direction of that portion of a specific rotationally asymmetric surface A according to the present invention on which the axial principal ray strikes is denoted by FXn.

If FX/FXn is not larger than the lower limit of the condition (1-1), i.e. −1000, or not smaller than the upper limit, i.e. 1000, the focal length of the rotationally asymmetric surface becomes excessively short on the negative side and the positive side, respectively, in comparison to the focal length FX of the entire optical system. Consequently, the refracting power of the rotationally asymmetric surface becomes excessively strong, and aberrations produced by the rotationally asymmetric surface cannot be corrected by another surface.

It is even more desirable from the viewpoint of aberration correction to satisfy the following condition:

$$-100 < FX/FXn < 100 \quad (1\text{-}2)$$

By satisfying the condition (1-2), rotationally asymmetric aberrations can be corrected even more favorably.

It is still more desirable from the viewpoint of aberration correction to satisfy the following condition:

$$-10 < FX/FXn < 10 \quad (1\text{-}3)$$

By satisfying the condition (1-3), rotationally asymmetric aberrations can be corrected even more favorably.

Assuming that a light ray emanating from the center of an object point and passing through the center of a pupil to reach the center of an image is defined as a principal ray, and that a Y-axis is taken in the decentration plane of each surface, and an X-axis is taken in a direction perpendicularly intersecting the Y-axis, and further an axis constituting an orthogonal coordinate system in combination with the X- and Y-axes is defined as a 2-axis, and further that the principal ray and a light ray which is parallel to the principal ray at a slight distance d in the Y-axis direction are made to enter the optical system from the entrance side thereof, and the sine of an angle formed between the two rays in the YZ-plane at the exit side of the optical system is denoted by NA'Y, and further that a value obtained by dividing the distance d between the parallel rays by NA'Y is denoted by FY, and further the focal length in the Y-axis direction of that portion of the rotationally asymmetric surface on which the axial principal ray strikes is denoted by FYn, it is desirable to satisfy the following condition:

$$-1000 < FY/FYn < 1000 \quad (2\text{-}1)$$

If FY/FYn is not larger than the lower limit of the condition (2-1), i.e. −1000, or not smaller than the upper limit, i.e. 1000, the focal length of the rotationally asymmetric surface becomes excessively short on the negative side and the positive side, respectively, in comparison to the focal length FY of the entire optical system. Consequently, the refracting power of the rotationally asymmetric surface becomes excessively strong, and aberrations produced by the rotationally asymmetric surface cannot be corrected by another surface.

It is even more desirable from the viewpoint of aberration correction to satisfy the following condition:

$$-100 < FY/FYn < 100 \quad (2\text{-}2)$$

By satisfying the condition (2-2), rotationally asymmetric aberrations can be corrected even more favorably.

It is still more desirable from the viewpoint of aberration correction to satisfy the following condition:

$$-10 < FY/FYn < 10 \quad (2\text{-}3)$$

By satisfying the condition (2-3), rotationally asymmetric aberrations can be corrected even more favorably.

It is preferable from the viewpoint of aberration correction to satisfy the following condition:

$$0.01 < |FY/FX| < 100 \quad (3\text{-}1)$$

where FX and FY are the focal lengths of the entire optical system.

If |FY/FX| is not larger than the lower limit of the condition (3-1), i.e. 0.01, or not smaller than the upper limit, i.e. 100, the focal lengths in the X- and Y-axis directions of the entire optical system become excessively different from each other. Consequently, it becomes difficult to correct image distortion favorably, and the image is undesirably distorted.

It is even more desirable from the viewpoint of aberration correction to satisfy the following condition:

$$0.1 < |FY/FX| < 10 \quad (3\text{-}2)$$

By satisfying the condition (3-2), rotationally asymmetric aberrations can be corrected even more favorably.

It is still more desirable from the viewpoint of aberration correction to satisfy the following condition:

$$0.5 < |FY/FX| < 2 \quad (3\text{-}3)$$

By satisfying the condition (3-3), rotationally asymmetric aberrations can be corrected even more favorably.

The optical system according to the present invention may comprise only a first reflecting surface, wherein light rays are reflected by the first reflecting surface in a direction different from a direction in which the light rays are incident thereon. If the first reflecting surface is tilted with respect to the axial principal ray, aberrations due to decentration are produced when light rays are reflected at the surface. Rotationally asymmetric aberrations due to decentration can be satisfactorily corrected by forming the reflecting surface from a rotationally asymmetric surface. If the reflecting surface is not formed from a rotationally asymmetric surface, a large amount of rotationally asymmetric aberration is produced, and the resolution is degraded. Further, aberration correction can be made even more effectively by satisfying the above conditions (1-1) to (3-3).

The optical system according to the present invention may comprise a first reflecting surface and a first transmitting surface, wherein light rays enter the optical system through the first transmitting surface and are reflected by the first reflecting surface to exit from the optical system through the first transmitting surface in a direction different from a direction in which the light rays are incident on the first transmitting surface. By adding one transmitting surface, the Petzval sum of the optical system can be reduced. In the case of transmitting and reflecting surfaces of positive power, Petzval curvatures cancel each other. Accordingly, power can be dispersed, and the Petzval sum can be reduced. Thus, it becomes possible to correct curvature of field.

It is preferable from the viewpoint of favorably correcting field curvature that the first transmitting surface and the first reflecting surface should have powers of the same sign at their axial principal ray transmitting and reflecting regions.

The optical system according to the present invention may comprise a first reflecting surface, a first transmitting surface, and a second transmitting surface, wherein light rays enter the optical system through the first transmitting surface and are reflected by the first reflecting surface to exit from the optical system through the second transmitting surface in a direction different from a direction in which the light rays are incident on the first transmitting surface. By dividing the above-described first transmitting surface into two surfaces, curvature of field can be corrected even more favorably. In a case where the first and second transmitting surfaces constitute a transmission lens, it is possible to suppress divergence of light rays at the first reflecting surface and hence possible to reduce the size of the first reflecting surface. If the optical system is arranged such that light rays travel successively through the first transmitting surface, the first reflecting surface, and the second transmitting surface, it is possible to form the first reflecting mirror from a back-coated mirror. If the first reflecting surface is formed from a back-coated mirror, curvature of field can be corrected more favorably than in the case of a surface-coated mirror. If either or both of the first and second transmitting surfaces are given power different in sign from the power of the first reflecting surface, curvature of field can be corrected approximately completely. On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberration as a whole.

The optical system according to the present invention may comprise a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface. If the optical system comprises a pair of first and second reflecting surfaces and a first transmitting surface, the optical axis can be folded by the two reflecting surfaces. This enables a reduction in the size of the optical system. Moreover, because reflection takes place an even number of times, an image can be formed without being reversed. Further, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field. Furthermore, it is also possible to substantially eliminate field curvature by forming the two reflecting surfaces from back-coated mirrors.

The optical system according to the present invention may comprise a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface. If the optical system comprises a pair of first and second reflecting surfaces, and a pair of first and second transmitting surfaces, the optical axis can be folded by the two reflecting surfaces, and thus the optical system can be constructed in a compact form, as stated above. Moreover, the presence of two transmitting surfaces makes it possible to produce even more favorable effects on the principal point position and field curvature. Furthermore, even more favorable aberration correcting performance can be obtained by forming the two reflecting surfaces from back-coated mirrors.

In the above-described case, the optical system may be arranged such that the optical path has portions intersecting each other. If some portions of the optical path intersect each other, it is possible to construct the optical system in a compact form. The arrangement makes it possible to dispose the object and image planes approximately perpendicular to each other. Accordingly, the optical system and an imaging device or the like, which is disposed at the image-formation position, can be disposed approximately parallel to each other. Thus, an imaging optical system of low height, for example, can be constructed.

In the above-described case, the optical system may be arranged such that the optical path has no portions intersecting each other. If no portions of the optical path intersect each other, a Z-shaped optical path can be formed. Consequently, the angle of decentration at each reflecting surface can be reduced, and the amount of aberration due to decentration can be reduced. Therefore, the arrangement is favorable from the viewpoint of correcting aberrations due to decentration. Further, the optical path from the object to the optical system and the optical path from the optical system to the image plane can be disposed approximately parallel to each other. In particular, when the optical system is used as an observation optical system or an ocular optical system, the direction for observation of an object and the direction for observation through the optical system are identical with each other. Accordingly, it is possible to make observation without feeling incongruous.

In the above-described case, the first transmitting surface and second reflecting surface of the optical system may be the identical surface. If the first transmitting surface and the second reflecting surface are the identical surface, the number of surfaces to be formed is three. Accordingly, the productivity of the optical system improves.

In the above-described case, the first reflecting surface and second transmitting surface of the optical system may be the identical surface. If the first reflecting surface and the second transmitting surface are the identical surface, the number of surfaces to be formed is three. Accordingly, the productivity of the optical system improves.

The optical system according to the present invention may comprise a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface. If the optical system comprises three reflecting surfaces and two transmitting surfaces, the degree of freedom further increases, which is favorable from the viewpoint of aberration correction.

In this case, the first transmitting surface and second reflecting surface of the optical system may be the identical surface. Alternatively, the first reflecting surface and the third reflecting surface may be the identical surface. Alternatively, the first transmitting surface and the third reflecting surface may be the identical surface. Alternatively, the second transmitting surface and the second reflecting surface may be the identical surface. By forming at least two surfaces from the identical surface configuration in this way, the productivity of the optical system improves.

The optical system according to the present invention may comprise at least a first reflecting surface, a second reflecting surface, a third reflecting surface, a fourth reflecting surface, a first transmitting surface, and a second transmitting surface, wherein light rays enter the optical system through the first transmitting surface and are reflected successively by the first, second, third and fourth reflecting surfaces to exit from the optical system through the second transmitting surface in a direction different from a direction in which the light rays are incident on the first transmitting surface. If the optical system comprises four reflecting surfaces, and two transmitting surfaces, the degree of freedom further increases, which is favorable from the viewpoint of aberration correction.

In this case, the first transmitting surface and second reflecting surface of the optical system may be the identical surface. The second transmitting surface and third reflecting surface of the optical system may be the identical surface. The first and third reflecting surfaces of the optical system may be the identical surface. The second and fourth reflecting surfaces of the optical system may be the identical surface. The first transmitting surface and second and fourth reflecting surfaces of the optical system may be the identical surface. The optical system may be arranged such that the first transmitting surface and the second reflecting surface are the identical surface, and that the first and third reflecting surface are the identical surface. The optical system may be arranged such that the first transmitting surface and the second reflecting surface are the identical surface, and that the second transmitting surface and the third reflecting surface are the identical surface. The optical system may be arranged such that the first and third reflecting surfaces are the identical surface, and that the second and fourth reflecting surfaces are the identical surface. The optical system may be arranged such that the second and fourth reflecting surfaces are the identical surface, and that the second transmitting surface and the third reflecting surface are the identical surface. The optical system may be arranged such that the first transmitting surface and the second and fourth reflecting surfaces are the identical surface, and that the second transmitting surface and the third reflecting surface are the identical surface. The optical system may be arranged such that the first transmitting surface and the second and fourth reflecting surfaces are the identical surface, and that the first and third reflecting surfaces are the identical surface. The optical system may be arranged such that the first transmitting surface and the second reflecting surface are the identical surface, and that the second transmitting surface and the first and third reflecting surfaces are the identical surface. The optical system may be arranged such that the second and fourth reflecting surfaces are the identical surface, and that the second transmitting surface and the first and third reflecting surfaces are the identical surface. Alternatively, the optical system may be arranged such that the first transmitting surface and the second and fourth reflecting surfaces are the identical surface, and that the second transmitting surface and the first and third reflecting surfaces are the identical surface. By forming at least two surfaces from the identical surface configuration in this way, the productivity of the optical system improves.

The optical system according to the present invention may be produced by first machining a rotationally asymmetric surface and then machining a rotationally symmetric surface. If a rotationally asymmetric surface is first formed and then a rotationally symmetric surface is machined, positioning of each surface is facilitated, and the manufacturing accuracy improves.

The optical system according to the present invention may be produced by cementing together an optical component having at least one rotationally asymmetric surface machined thereon and an optical component having another surface machined thereon. If a decentered optical system is produced by cementing together an optical component having a rotationally asymmetric surface formed thereon and an optical component having another surface machined thereon, the rotationally asymmetric surface is formed on a planar thin member by machining. Therefore, it is possible to avoid degradation of the machining accuracy due to distortion or the like of the optical component during machining. In a case where a rotationally asymmetric surface is produced by injection molding, the optical component is preferably as thin as possible. The thinner the optical component, the further the distortion of the resin after the injection molding can be reduced.

When the optical system according to the present invention is arranged as an ocular optical system having a folded optical path, a reflecting surface constituting the folded optical path may have power. If an ocular optical system is constructed by using a folded optical path, it is possible to give power to a reflecting surface, and a transmission lens can be omitted. Moreover, the optical system can be constructed in a compact form by folding the optical path. It is also possible to give power to an inversion prism, which is even more desirable.

When the optical system according to the present invention is arranged as an image-forming optical system having a folded optical path, a reflecting surface constituting the folded optical path may have power. If an image-forming optical system is constructed by using a folded optical path, it is possible to give power to a reflecting surface, and a transmission lens can be omitted. Moreover, the optical system can be constructed in a compact form by folding the optical path. It is also possible to give power to an inversion prism, which is even more desirable.

An afocal optical system can be constructed of a combination of the above-described image-forming optical system having a folded optical path and an ocular optical system. For example, a prism optical system for obtaining an inverted image can be arranged as an image-forming optical system by giving power to it. Thus, the optical system can be constructed in a compact form. It is particularly preferable that an objective lens system of a real-image finder in a finder optical system of a camera or the like should be formed from an optical system having a rotationally asymmetric surface used in an inversion prism. By doing so, it is possible to reduce the size of the objective lens system and to simplify the structure thereof.

The afocal optical system may be arranged to obtain an erect image by an even number of reflections. In particular, when a human being makes an observation, the ease of observation is markedly improved by providing an erect image.

An afocal optical system can be constructed of a combination of an image-forming optical system and the above-described ocular optical system having a folded optical path. Such a combination makes it possible to reduce the size of an afocal optical system of short focal length in particular, which is complicated in arrangement. In the case of an ocular optical system having a focal length of 100 mm or less, the effect of reducing the size is even more remarkable.

In this case also, the afocal optical system may be arranged to obtain an erect image by an even number of reflections. In particular, when a human being makes an observation, the ease of observation is markedly improved by providing an erect image.

An afocal optical system can be constructed of a combination of the above-described image-forming optical system having a folded optical path and the above-described ocular optical system having a folded optical path. Such a combination makes it possible to construct an afocal optical system in an even more compact form. It is even more desirable to use a rotationally asymmetric surface for an inversion prism and to give power to the prism optical system, thereby simplifying the structure of an objective lens or an ocular lens or omitting it, and thus simplifying the structure of the optical system.

In this case also, the afocal optical system may be arranged to obtain an erect image by an even number of reflections. In particular, when a human being makes an observation, the ease of observation is markedly improved by providing an erect image.

The optical system according to the present invention may also be arranged as a camera optical system and provided as an optical device in a camera. Thus, it is possible to construct a camera optical system in a compact form.

In this case, the camera optical system may be disposed in a real-image finder optical system of a camera, or in a virtual-image finder optical system of a camera. Thus, it is possible to provide a compact finder optical system of minimal aberration. It is preferable to use a rotationally asymmetric surface as a back-coated mirror and to form a reflecting surface of an inversion prism as a back-coated mirror. By doing so, it is possible to provide a finder optical system having a minimal number of components.

The camera optical system may be disposed in an objective lens system or an ocular optical system of a finder optical system. Thus, the optical system can be constructed in a compact form. In particular, the ocular optical system is preferably formed by using a rotationally asymmetric reflecting surface. It is even more desirable to form a back-coated reflecting surface of the prism optical system from a rotationally asymmetric surface. By doing so, it is possible to construct an ocular optical system corrected for image distortion. If a rotationally asymmetric surface is used in the objective lens system, not only the image distortion but also chromatic aberrations can be favorably corrected. It is still more desirable to use a rotationally asymmetric surface as a back-coated mirror. By doing so, the amount of aberration produced can be reduced.

In a case where the above-described camera optical system according to the present invention is disposed in an objective lens system of a finder optical system, the arrangement may be such that at least one lens whose refracting power is not zero is disposed on the object side of the objective lens system, and the camera optical system is disposed on the observation side of the lens. The arrangement may also be such that the camera optical system is disposed on the object side of the objective lens system, and at least one lens whose refracting power is not zero is disposed on the observation side of the camera optical system. Alternatively, the objective lens system may be arranged such that at least one lens whose refracting power is not zero is disposed on the object side, and the camera optical system is disposed on the observation side of the lens, and further at least one lens whose refracting power is not zero is disposed on the observation side of the camera optical system. The objective lens system may comprise two lens units, that is, the camera optical system, and a positive lens unit whose overall refracting power is greater than zero. The objective lens system may also comprise two lens units, that is, the camera optical system, and a negative lens unit whose overall refracting power is smaller than zero.

That is, it is possible to improve the performance of the optical system by disposing another optical system on the object side of the objective lens system. By disposing an optical system on the object side of the objective lens system, it is possible to enlarge the entrance pupil diameter and field angle of light rays entering the camera optical system having a folded optical path according to the present invention. Thus, it is possible to construct a camera finder optical system having a reduced f-number or a widened field angle. In particular, it is preferable to dispose a positive optical system on the object side when it is intended to construct a finder optical system having a long focal length and a small f-number as a whole. If a negative optical system is disposed on the object side, an optical system of wide observation field angle can be effectively constructed. That is, by disposing a negative optical system on the object side, it is possible to converge light rays of wide field angle from an object which enter the camera optical system. Accordingly, it is possible to obtain a wide field angle without increasing the size of the prism optical system. In a case where a negative optical system is formed from a lens having a negative power, the negative lens produces image distortion and lateral chromatic aberration to a considerable extent. Therefore, it is preferable from the viewpoint of favorably correcting aberrations to arrange the camera optical system such that aberrations produced by the negative lens and aberrations produced by the prism optical system cancel each other. It is also preferable from the viewpoint of reducing image distortion produced by the negative lens that the radius of curvature of the negative lens on the prism optical system side should be smaller than the radius of curvature on the object side. If the negative lens is formed from a rotationally symmetric surface, the productivity of the lens improves. It is also possible to form the negative lens from a rotationally asymmetric surface. By doing so, image distortion can be corrected even more favorably. If the negative lens is produced in the form a diffraction optical element or a Fresnel lens, it is possible to obtain a thin lens. This is advantageous when it is desired to construct a compact optical system.

If another optical system is disposed on the image side of the camera optical system having a folded optical path according to the present invention, the performance of the optical system can be improved. By disposing another optical system on the image side, it is possible to control the exit pupil position of light rays exiting from the camera optical system having a folded optical path and also possible to enlarge the field angle. In particular, when a positive optical system is disposed on the image side, it is possible to dispose the exit pupil far away from the imaging plane. If a negative optical system is disposed on the image side, the field angle can be effectively widened.

If another optical system is disposed on each of the object and image sides of the camera optical system having a folded optical path according to the present invention, the performance of the optical system can be furthermore improved. In particular, it is preferable to dispose a positive optical system on the object system when it is intended to construct a telephoto type lens having a long focal length and a small f-number. If a negative optical system is disposed on the object side, an optical system having a wide observation field angle can be effectively constructed.

Regarding an optical system disposed on the image side, when it is desired to dispose the exit pupil at a distant position, a positive optical system is preferably disposed on the image side, whereas, when it is desired to widen the field angle, a negative optical system is preferably disposed on the image side.

If an optical system is constructed of at least two lens units, that is, the camera optical system having a folded optical path according to the present invention, and a positive optical system, aberration correction can be made effectively. In a case where the camera optical system having a folded optical path, which is combined with a positive optical system, is arranged to have a positive focal length, the aberration correcting action is shared between the two lens units, and the amount of aberration produced reduces. In a case where the camera optical system is arranged to have a negative focal length, the field angle can be widened by the negative lens unit.

If an optical system is constructed of at least two lens units, that is, the camera optical system having a folded-optical path according to the present invention, and a negative optical system, aberration correction can be made effectively. In a case where the camera optical system having a folded optical path, which is combined with a negative optical system, is arranged to have a positive focal length, the field angle can be widened by the negative lens unit. In a case where the camera optical system is arranged to have a negative focal length, the aberration correcting action is shared between the two lens units, and the amount of aberration produced reduces.

If an objective lens system of a finder optical system is constructed of the camera optical system according to the present invention, and another lens unit, the magnification can be changed by varying the spacing between the two lens units. By arranging the camera optical system and another optical system such that the magnification is changed by varying the spacing therebetween, it is possible to construct a compact variable-magnification finder optical system. In general, a variable-magnification optical system is arranged such that the magnification is changed by varying the spacing between at least two lens units. If the camera optical system having a folded optical path according to the present invention is adopted for a variable-magnification optical system, it is possible to construct a compact variable-magnification finder optical system having a folded optical path. It is also possible to adjust the focus position by varying the spacing between the lens units. It is preferable that the spacing between the lens units should be varied by using a unit-spacing varying device that varies the spacing between the lens units by moving an optical system in the direction of the optical axis.

An objective lens system of a finder optical system may be constructed of three lens units, that is, the camera optical system according to the present invention, a positive lens unit whose overall refracting power is greater than zero, and a negative lens unit whose overall refracting power is smaller than zero.

In this case, the magnification can be changed by varying the spacing between the camera optical system according to the present invention and the positive lens unit and the spacing between the positive and negative lens units. By arranging an optical system such that the magnification is changed by varying the spacing between at least three lens units in total, it is possible to construct an optical compensation variable-magnification finder optical system. Thus, the number of moving lens units is minimized, and the way in which the lens units are moved is simplified.

A real-image finder optical system, which has an objective lens system for forming an object image and an ocular optical system for observing the object image, may be arranged such that it has an indication-within-finder optical system which forms an indication image different from the object image to display photographic information or the like, and that the camera optical system according to the present invention is disposed in the indication-within-finder optical system. The use of the camera optical system according to the present invention makes it possible to construct a compact indication-within-finder optical system.

It is also possible to construct an optical system having an objective lens system for forming an object image, an imaging device for receiving the object image, and a distance-measuring part for measuring a displacement between the imaging device and an object image formation position which changes with the object distance, wherein the camera optical system according to the present invention is provided as an optical device constituting the distance-measuring part. The use of the camera optical system according to the present invention makes it possible to construct a compact AF optical system.

It is also possible to construct an optical system having an objective lens system for forming an object image, an imaging device for receiving the object image, and a photometer part for measuring an optimal value of an exposure to the imaging device which changes with the brightness of the object, wherein the camera optical system according to the present invention is provided as an optical device constituting the photometer part. The use of the camera optical system according to the present invention makes it possible to construct a compact AE optical system.

It is also possible to construct an optical system having an objective lens system for forming an object image, an imaging device for receiving the object image, a date display part for displaying an information image, e.g. a date of photo shooting, and an information image forming optical system for forming the information image displayed by the date display part on the imaging device, wherein the camera optical system according to the present invention is provided as the information image forming optical system. The use of the camera optical system according to the present invention makes it possible to construct a compact date information image forming optical system.

It is also possible to construct an optical system having an objective lens system for forming an object image, and a silver halide film provided as an imaging device for receiving the object image, wherein the camera optical system according to the present invention is provided as the objective lens system. By using the camera optical system according to the present invention as an objective lens system, it is possible to construct a compact imaging optical system for silver halide film.

It is also possible to construct an optical system having an objective lens system for forming an object image, and an electronic imaging device provided as an imaging device for receiving the object image, wherein the camera optical system according to the present invention is provided as the objective lens system. By using the camera optical system according to the present invention as an objective lens system, it is possible to construct a compact optical system for an electronic camera.

In a case where the camera optical system according to the present invention is used as an objective lens system, the objective lens system may have the camera optical system according to the present invention, and an antivibration optical system having the function of preventing formation of a blurred image, e.g. camera-shake, due to vibration. By combining an antivibration optical system with the camera optical system according to the present invention, it is possible to minimize the aggravation of aberrations when the antivibration function is made to work. This is particularly effective when an optical system according to the present invention comprises a back-coated mirror. The reason for this is that in theory a back-coated reflecting mirror requires a smaller curvature than a transmission lens system. That is, the antivibration function is realized by bending light rays through a variable-apical angle prism or the like having the function of bending light rays so that, even when the optical system is tilted, the light rays reach the previous image position. This, however, requires the optical system to be favorably corrected for aberrations with respect to as many angles of incident rays as possible. If an antivibration optical system is constructed by using a conventional transmission refracting lens system, because each surface constituting the optical system has a large curvature, aberrations are rapidly aggravated when light rays are deviated. In the case of an optical system having a reflecting surface formed from a back-coated mirror, because the curvature of the surface is small, variation of aberrations is minimized even if light rays are slightly deviated.

In this case, the antivibration optical system may be formed from a wedge-shaped prism.

The camera optical system provided in an objective lens system may be arranged such that the refracting power is variable.

In this case, the camera optical system may have a first decentered optical system with a rotationally asymmetric curved surface whose refracting power varies in a first direction perpendicular to an optical axis, and a second decentered optical system with a rotationally asymmetric curved surface whose refracting power varies in a second direction perpendicular to both the optical axis and the first direction, so that the refracting power of the camera optical system is changed by moving the first decentered optical system in the first direction, and/or moving the second decentered optical system in the second direction. That is, at least two cylindrical optical elements each comprising a rotationally asymmetric surface are disposed in the XY-plane, which is approximately perpendicular to the optical axis, and the two optical elements are moved approximately rectilinearly in the X- and Y-axis directions, respectively. Each cylindrical optical element is arranged such that the curvatures in a direction perpendicularly intersecting the direction of movement at two ends thereof are different from each other. The optical element movable in the X-axis direction causes the power in the Y-axis direction to change by being moved in the X-axis direction, whereas the optical element movable in the Y-axis direction causes the power in the X-axis direction to change by being moved in the Y-axis direction. By simultaneously moving the at least two optical elements, the powers in the X- and Y-axis directions are changed. Thus, a variable-refracting power optical system can be constructed. In this case, the optical system is not a liquid crystal lens or the like in which the configuration of the optical system or the internal structure of the optical system is changeable. Therefore, it is possible to obtain stable refracting power varying effect which is not affected by temperature, gravity, etc.

The optical system according to the present invention may be arranged as a converter lens. The use of the optical system according to the present invention makes it possible to construct a compact converter lens.

The optical system according to the present invention may be disposed in an optical device provided in binoculars. By using the optical system according to the present invention in an optical system of binoculars, it is possible to construct compact binoculars.

In this case, the optical system according to the present invention may be disposed in an objective lens system provided in binoculars. If a rotationally asymmetric surface is used in an objective lens system for binoculars, it is possible to favorably correct not only image distortion but also chromatic aberrations. It is preferable to use a rotationally asymmetric surface as a back-coated mirror. By doing so, it is possible to reduce aberrations produced in the objective lens system.

The optical system according to the present invention may be disposed in an ocular lens system provided in binoculars. If an optical system in binoculars is constructed by using a folded optical path, and moreover a binocular afocal optical system is constructed by using an optical element with a reflecting surface having power, it is possible to construct the optical system in a compact form. In particular, it is desirable to form an ocular optical system from a rotationally asymmetric reflecting surface, and it is preferable to form a back-coated reflecting surface of a prism optical system from a rotationally asymmetric surface. By doing so, it is possible to construct an ocular optical system for binoculars which is corrected for image distortion.

The optical system according to the present invention may be disposed in each of objective and ocular lens systems provided in binoculars. By using a rotationally asymmetric surface in each of objective and ocular lens systems constituting an optical system for binoculars, it is possible to provide a finder optical system which is compact and has minimal aberration. It is preferable to use the rotationally asymmetric surfaces as back-coated mirrors and to construct a reflecting surface of an inversion prism as a back-coated mirror. By doing so, it is possible to provide a binocular optical system having a minimal number of components.

The optical system according to the present invention may be disposed at an entrance surface and/or an exit surface of an image rotator. A conventional image rotator does not particularly have power and is used in combination with an optical system having refracting power, e.g. an image-forming lens, which is provided separately from the image rotator. However, if an optical system is constructed by using a rotationally asymmetric surface according to the present invention, the image rotator itself can be given refracting power. Accordingly, it becomes possible to simplify the arrangement of an image-forming lens or the like or to omit the image-forming lens.

The optical system according to the present invention may be disposed in an optical device provided in a microscope. By using the optical system according to the present invention in an optical device provided in a microscope, it is possible to provide a microscope which is compact and has minimal aberration.

In this case, the optical system according to the present invention may be disposed in an objective optical system for a microscope. By constructing an objective optical system for a microscope using the optical system according to the present invention, it is possible to construct a microscope objective lens having minimal chromatic aberration in particular. A reflecting surface in the optical system according to the present invention produces no chromatic aberration in theory. Therefore, it is preferable to construct a microscope objective lens by using the optical system according to the present invention in which a strong refracting power can be given to the reflecting surface, which produces no chromatic aberration.

In this case, the optical system according to the present invention may be disposed in an ocular optical system for a microscope. The use of the optical system according to the present invention makes it possible to provide a microscope ocular lens which is compact and has minimal aberration. In particular, by using a folded optical path, the size of the optical system can be reduced, and it is possible to construct an ocular lens having a high eye point. It is preferable to construct an ocular lens as a prism optical system by using a rotationally asymmetric surface as a back-coated mirror. By doing so, it is possible to provide an ocular optical system having a minimal number of components.

The optical system according to the present invention may be disposed in an intermediate-image relay optical system for a microscope. The use of the optical system according to the present invention makes it possible to construct a microscope intermediate-image relay optical system which is compact and has minimal aberration. By giving power to a reflecting surface, it is possible to omit an optical path bending mirror or prism.

The optical system according to the present invention may be disposed in an illumination system for a microscope. The use of the optical system according to the present invention makes it possible to construct a microscope illumination optical system which is compact and has minimal unevenness of illumination. If power is given to a reflecting surface, it becomes possible to omit an optical path bending mirror or prism.

In this case, the optical system according to the present invention may be disposed in an incident-light illumination system for a microscope or in a transmission illumination system for a microscope.

The optical system according to the present invention may be disposed in a multi-discussion lens barrel for a microscope. The use of the optical system according to the present invention makes it possible to construct a microscope multi-discussion lens barrel optical system which has a minimal number of components. -If power is given to a reflecting surface, it becomes possible to omit an optical path bending mirror or prism.

The optical system according to the present invention may be disposed in an optical system of an image-drawing device for a microscope. The use of the optical system according to the present invention makes it possible to construct an optical system of an image-drawing device for a microscope which has a minimal number of components. If power is given to a reflecting surface, it becomes possible to omit an optical path bending mirror or prism.

The optical system according to the present invention may be disposed in an autofocus system for a microscope. The use of the optical system according to the present invention makes it possible to construct a microscope AF optical system which has a minimal number of components. If power is given to a reflecting surface, it becomes possible to omit an optical path bending mirror or prism.

The optical system according to the present invention may be disposed in a projection optical system for an inverted microscope. The use of the optical system according to the present invention makes it possible to construct a projection optical system for an inverted microscope which has a minimal number of components. If power is given to a reflecting surface, it becomes possible to omit an optical path bending mirror or prism.

The optical system according to the present invention may be disposed in an optical device provided in a binocular stereoscopic microscope having an optical axis for a right eye and an optical axis for a left eye. The use of the optical system according to the present invention makes it possible to provide a binocular stereoscopic microscope which is compact and has minimal aberration. If a binocular stereoscopic microscope, e.g. an operating microscope, is constructed by using the optical system according to the present invention, it is possible to correct rotationally asymmetric aberrations and hence possible to view a flat and clear observation image.

In this case, in order to correct aberrations due to decentration which are produced by an objective lens system common to an optical axis for a right eye and an optical axis for a left eye, the optical system according to the present invention may be provided for each of the optical axes for right and left eyes. If a binocular stereoscopic microscope, e.g. an operating microscope, is constructed by using the optical system according to the present invention for each of the optical axes for right and left eyes, it is possible to correct rotationally asymmetric aberrations and hence possible to view a flat and clear observation image.

The optical system according to the present invention may be provided in a variable-magnification optical system incorporated in a binocular stereoscopic microscope. If the optical system according to the present invention is disposed in the variable-magnification optical system, it is possible to produce aberration correcting effects during low power observation, when rotationally asymmetric aberrations are particularly likely to occur. It is preferable to dispose the optical system according to the present invention in an optical element on the object side of the variable-magnification optical system. By doing so, aberrations such as field curvature and image distortion can be favorably corrected during observation at low power.

The optical system according to the present invention may be provided in an image-forming optical system incorporated in a binocular stereoscopic microscope. By using the optical system according to the present invention in the image-forming optical system, an ordinary observation mode and an observation mode corrected for rotationally asymmetric aberrations can be readily switched from one to another by replacing only the image-forming optical system.

The optical system according to the present invention may be provided in an ocular optical system incorporated in a binocular stereoscopic microscope. The use of the optical system according to the present invention in the ocular optical system enables an improvement in the capability of correcting rotationally asymmetric aberrations; this is even more desirable. The reason for this is as follows: In an ocular optical system, an extra-axial principal ray passes at a position relatively higher than the optical axis. Therefore, an ocular optical system using the optical system according to the present invention exhibits a great capability of correcting off-axis rotationally asymmetric aberrations.

In an arrangement wherein two optical axes (for right and left eyes) are tilted with respect to an object plane, and objective lens systems are provided for the two optical axes, the optical system according to the present invention may be provided for each of the optical axes for right and left eyes to correct aberrations produced by the two objective lens systems. If a binocular stereoscopic microscope is constructed by using the optical system according to the present invention, it is possible to correct rotationally asymmetric aberrations produced by objective lens systems provided on optical axes tilted with respect to an object plane, and hence possible to view a flat and clear observation image.

In this case, the optical systems according to the present invention, which are provided for the right and left optical axes, may be disposed closest to the object on the right and left optical axes. If the optical systems according to the present invention are disposed closest to the object, when the magnification is changed by a variable-magnification optical system, aberrations vary with the observation object height. Accordingly, aberration variation during zooming reduces.

in this case, the optical systems according to the present invention, which are provided for the right and left optical axes, may be disposed on the respective image sides of the right and left objective lens systems. By doing so, replacement of objective lens systems can be readily performed because the optical systems need not be removed when the objective lens systems are replaced.

The optical system according to the present invention may be disposed in an optical device provided in an endoscope. If an optical system for an endoscope is constructed by using the optical system according to the present invention, a compact optical system can be formed because the optical path is folded. If another optical system of positive refracting power is disposed between the endoscope optical system and the image formation position, it is possible to dispose the pupil position in the optical system according to the present invention and to dispose the exit pupil at a distant position. Accordingly, it is possible to reduce the size of the prism optical system while maintaining telecentricity on the image side. If the optical element of positive refracting power is not provided, the telecentricity degrades, and the light-gathering efficiency reduces in a case where a CCD, for example, is used as an imaging device. In a case where an image guide is utilized, the light-gathering efficiency reduces, and it becomes impossible to observe a bright image unless an optical fiber bundle of large numerical aperture is used.

In a case where the above-described positive optical system is formed from a lens of positive power, the positive lens produces image distortion and lateral chromatic aberration to a considerable extent. Therefore, it is preferable from the viewpoint of favorably correcting aberrations to arrange the system such that aberrations produced by the positive lens and aberrations produced by the prism optical system according to the present invention cancel each other. It is preferable from the viewpoint of reducing image distortion produced by the positive lens that the radius of curvature on the image-formation plane side of the positive lens should be smaller than the radius of curvature on the object side. Conversely, the positive lens may have a curvature on the object side thereof and a flat surface on the image-formation plane side and be integrated with an imaging device. By doing so, the productivity of the optical system can be improved. If the positive lens is formed from a rotationally symmetric surface, the productivity of the lens improves. It is also possible to form the positive lens from a rotationally asymmetric surface. In this case, it is possible to correct image distortion even more favorably. If the positive lens is produced in the form a diffraction optical element or a Fresnel lens, it is possible to obtain a thin lens. This is advantageous when it is desired to construct a compact optical system.

In this case, the optical system according to the present invention may be applied to an endoscope using an imaging device. If an optical system for an endoscope is constructed by using the optical system according to the present invention and a two-dimensional imaging device, a compact endoscope can be obtained. The reason for this is that a two-dimensional imaging device comprises an electric board or the like which is thin and has a wide imaging area, and it is therefore preferable to dispose the two-dimensional imaging device at a tilt -with respect to an optical axis of light rays from an object from the viewpoint of reducing the overall size of the apparatus.

The optical system according to the present invention may be used in an endoscope objective optical system. By doing so, it is possible to reduce both the diameter and length of an objective optical system incorporated in a distal end part of an endoscope. Thus, it is possible to solve, particularly, the problem that the endoscope distal end part is likely to become undesirably thick.

A protective transparent plate may be disposed on the object side of the optical system according to the present invention. By doing so, it becomes possible to facilitate removal of dust and water drops from the endoscope distal end part. It is preferable that the protective transparent plate be a transparent plane-parallel plate.

An object-side surface of the optical system according to the present invention may be a plane surface. This makes it possible to facilitate removal of dust and water drops from the endoscope distal end part.

An image-side surface of the optical system according to the present invention may be a plane surface. This makes it possible to accurately position a two-dimensional imaging device and the optical system according to the present invention with respect to each other.

The image-side surface of the optical system according to the present invention may be placed in close contact with an imaging device. By doing so, the assembleability of optical components can be improved.

An optical fiber bundle may be disposed at the image-formation plane of the optical system separately from the optical system. By doing so, replacement of the optical fiber bundle is facilitated.

An optical fiber bundle may be placed in close contact with the image-side surface of the optical system according to the present invention. By doing so, it becomes possible to construct a compact endoscope objective optical system.

The object-side surface of the optical system may be formed from a protective transparent plate. By doing so, it becomes possible to facilitate removal of dust and water drops from the endoscope distal end part. It is preferable that the protective transparent plate be a plane-parallel plate.

The object-side surface of the optical system according to the present invention may be a plane surface. This makes it possible to facilitate removal of dust and water drops from the endoscope distal end part.

A first surface in the distal end part of the endoscope may be made of glass or a crystalline material, e.g. sapphire. By doing so, the optical system in the endoscope distal end part becomes unlikely to be damaged.

The first surface of the endoscope objective optical system may be recessed from the enclosure of the endoscope. By doing so, the distal end portion of the optical system is prevented from being damaged by contacting an object under observation.

The first surface of the endoscope objective optical system may project from the enclosure of the endoscope. This makes it possible to readily remove water drops from the distal end part.

The optical system according to the present invention may be disposed in a camera adapter for an endoscope to project an observation image onto an imaging device through the optical system. The use of a rotationally asymmetric surface makes it possible to construct the optical system in a compact form. It should be noted that a CCD, a film, etc. may be used as an imaging device.

In this case, a plane glass plate may be provided in front of or behind the optical system according to the present invention. With such an arrangement, it is possible to prevent dust or other foreign matter from entering the optical system when the endoscope camera adapter optical system is detached or attached.

It is possible to provide a device for varying the spacing between the optical system according to the present invention and another optical system or the image-formation plane. With such an arrangement, focusing can be performed.

The arrangement may be such that the sum total of reflections taking place in the optical system according to the present invention and another optical system is an even number. Such an arrangement is preferable because an image can be formed without being reversed, and thus it is possible for an observer to make observation without feeling incongruous.

The camera adapter for an endoscope may comprise an optical system in which the sum total of reflections is an odd number, and an electrically image-inverting circuit. In a case where the number of reflections in the optical system is an odd number, it is preferable to invert the image by electric processing because by doing so an observer can make observation without feeling incongruous.

The camera adapter for an endoscope may have a semi-transparent reflecting surface to divide an optical path into two. If the optical path is divided into two by a semitransparent reflecting surface, it is possible to have an observation optical path and a camera optical path and hence possible to perform photographing while making observation.

The observation optical path for an observer may be approximately parallel to an optical axis of light rays entering the endoscope camera adapter from an observation optical system. It is preferable that the observation optical path should be approximately parallel to an optical axis of light rays entering the endoscope camera adapter from the observation optical system. The reason for this is that if the observation optical path is approximately parallel to the optical axis, the observation direction and the direction for controlling observation equipment such as an endoscope coincide with each other, thus allowing an observer to perform observation without feeling incongruous.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 78(a), 78(b) and 78(c) each illustrate an optical ray trace of Example 72 in which an optical system according to the present invention is used in an objective optical system of an endoscope.

FIGS. 79(a) and 79(b) each illustrate an optical ray trace of Example 73 in which an optical system according to the present invention is used in an objective optical system of an endoscope.

FIGS. 80(a) and 80(b) each illustrate an optical ray trace of Example 74 in which an optical system according to the present invention is used in an objective optical system of an endoscope.

FIGS. 81(a) and 81(b) each illustrate an optical ray trace of Example 75 in which an optical system according to the present invention is used in an objective optical system of an endoscope.

FIGS. 82(a) and 82(b) each illustrate an optical ray trace of Example 76 in which an optical system according to the present invention is used in an objective optical system of an endoscope.

FIGS. 83(a) and 83(b) each illustrate an optical ray trace of Example 77 in which an optical system according to the present invention is used in an objective optical system of an endoscope.

FIGS. 84(a) and 84(b) each illustrate an optical ray trace of Example 78 in which an optical system according to the present invention is used in an objective optical system of an endoscope.

FIGS. 85(a) and 85(b) each illustrate an optical ray trace of Example 79 in which an optical system according to the present invention is used in an objective optical system of an endoscope.

FIGS. 86(a) and 86(b) each illustrate an optical ray trace of Example 81 in which an optical system according to the present invention is used in an objective optical system of an endoscope.

FIGS. 87(a) and 87(b) each illustrate an optical ray trace of Example 82 in which an optical system according to the present invention is used in an objective optical system of an endoscope.

DESCRIPTION OF THE PREFERRED EMBODIMENTS

Examples of optical systems according to the present invention, together with examples of optical systems of various optical apparatuses using the optical systems according to the present invention, will be described below.

Examples 1 to 5 and Examples 7 to 13 will be described first. They are examples of representative optical systems involving constituent parameters according to the present invention. However, the present invention is not necessarily limited to these examples. It should be noted that Example 6 is concerned with a surface having reflecting action.

Figure 1:
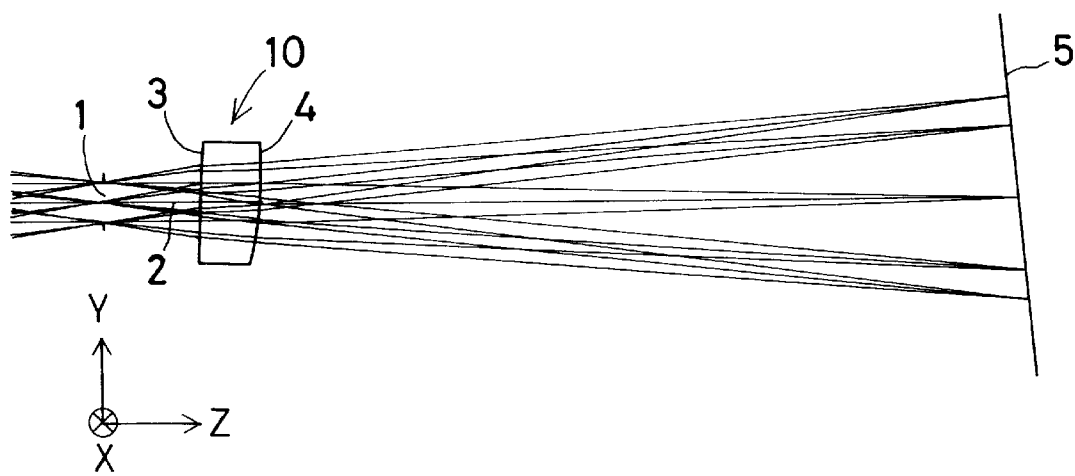
FIG. 1 is a sectional view of an optical system according to Example 1 of the present invention.

In constituent parameters of Examples 1 to 5 (described later), a coordinate system is defined as follows: As shown in FIG. 1, the center of a pupil (aperture) 1 is defined as the origin of an optical system. An optical axis 2 is defined by a light ray emanating from the center of an object (not shown in the figure) and passing through the center of the aperture 1. A direction in which the light ray travels as far as a first surface of an optical system 10 along the optical axis 2 is defined as a direction of the Z-axis. A direction perpendicularly intersecting the Z-axis and passing through the origin in a plane where the optical axis 2 is bent by the optical system 10 is defined as a direction of the Y-axis. A direction perpendicularly intersecting both the Z- and Y-axes and passing through the origin is defined as a direction of the X-axis. A direction extending toward the first surface of the optical system 10 from the object point is defined as a positive direction of the Z-axis. The X-, Y- and Z-axes constitute a right-handed orthogonal coordinate system. In the coordinate system, each surface separation is defined along the Z-axis direction. A position given by the surface separation becomes the origin of a new coordinate system defining the position of the subsequent surface. A displacement in the Y-axis direction of the vertex of the surface relative to the new origin is given as a displacement Y. An amount of rotation from the Z-axis direction of the center axis of an expression defining the surface is given as a tilt angle θ. Similarly, the subsequent surface is defined with respect to the coordinate system defining the preceding surface. That is, according to a coordinate system newly defined after decentration of each surface, a surface separation between the surface and the subsequent surface is defined. It should be noted that, regarding the tilt angle, the counterclockwise direction is defined as a positive direction.

Figure 7:
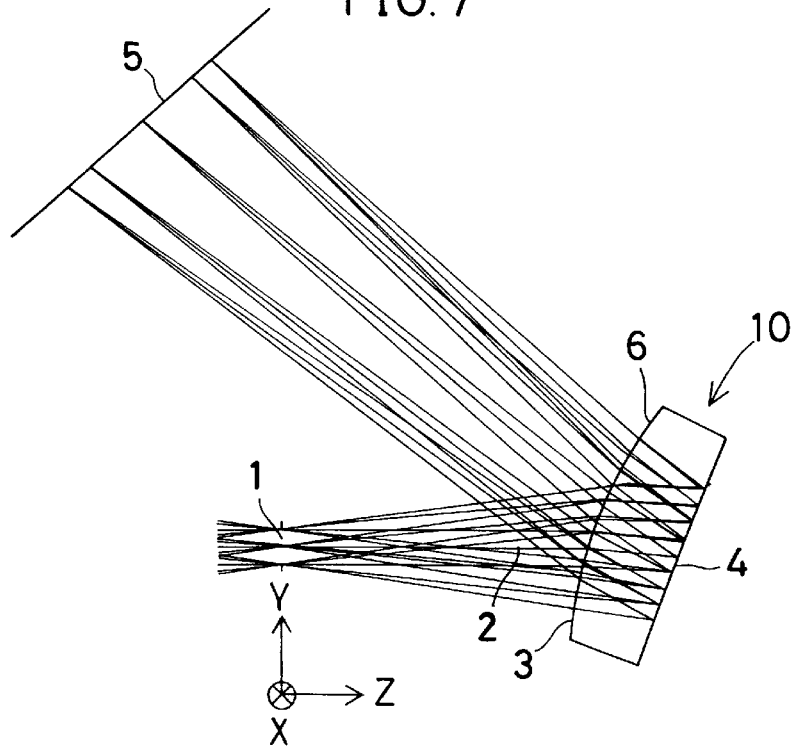
FIG. 7 is a sectional view of an optical system according to Example 7 of the present invention.

In the constituent parameters of Examples 7 to 13 (described later), a coordinate system is defined as follows: As shown in FIG. 7, the surface No. 1 [containing a pupil (aperture) 1] of an optical system 10 is defined as the origin of the optical system. An optical axis 2 is defined by a light ray emanating from the center of an object (not shown in the figure) and passing through the center of the aperture 1. A direction in which the light ray travels as far as a first surface of the optical system 10 along the optical axis 2 is defined as a direction of the Z-axis. A direction perpendicularly intersecting the Z-axis and passing through the origin in a plane in which the optical axis 2 is bent by the optical system 10 is defined as a direction of the Y-axis. A direction perpendicularly intersecting both the Z- and Y-axes and passing through the origin is defined as a direction of the X-axis. A direction extending from the object point toward the first surface of the optical system is defined as a positive direction of the Z-axis. The X-, Y- and Z-axes constitute a right-handed orthogonal coordinate system. Regarding each surface for which displacements Y and Z and a tilt angle θ are shown, the displacements Y and Z are each a displacement of the position of the vertex of the surface relative to the surface No. 1 [containing the pupil (aperture) 1] of the optical system, which is the origin of the optical system 10, and the tilt angle θ is an amount of rotation of the center axis of an expression defining the surface from the Z-axis direction. It should be noted that, regarding the tilt angle, the counterclockwise direction is defined as a positive direction. Regarding each surface for which a surface separation is shown, the surface separation is an axial distance between the surface and the subsequent surface.

Three-dimensional surfaces are polynomial surfaces expressed by the above equation (a). It should be noted that the Z-axis of the defining equation (a) is the axis of a three-dimensional surface.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) - (1 + K_y)(Y^2/R_y^2)\}^{1/2}] + AR[(1 - AP)X^2 + (1 + AP)Y^2]^2 + BR[(1 - BP)X^2 + (1 + BP)Y^2]^3 + CR[(1 - CP)X^2 + (1 + CP)Y^2]^4 + DR[(1 - DP)X^2 + (1 + DP)Y^2]^5 \qquad (b)$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ plane; AR, BR, CR and DR are 4th-, 6th-, 8th- and 10th-order aspherical coefficients, respectively, which are rotationally symmetric with respect to the Z-axis; and AP, BP, CP and DP are 4th-, 6th-, 8th- and 10th-order aspherical coefficients, respectively, which are rotationally asymmetric with respect to the Z-axis.

Coefficients concerning aspherical surfaces which are not shown in the constituent parameters (shown later) are zero. The refractive index of a medium lying between surfaces is expressed by the refractive index for the spectral d-line (wavelength: 587.56 nm). Lengths are given in millimeters.

Three-dimensional surfaces may also be defined by Zernike polynomials. That is, the configuration of a three-dimensional surface may be defined by the following equation (c). The Z-axis of the defining equation (c) is the axis of Zernike polynomial.

$$x = R \times \cos(A) \qquad (c)$$
$$y = R \times \sin(A)$$
$$Z = D_2 + D_3 R \cos(A) + D_4 R \sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) +$$
$$D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

where $D_m$ (m is an integer of 2 or higher) are coefficients.

Examples of other surfaces usable in the present invention include those which are given by the following defining equation:

$$Z = \Sigma\Sigma C_{nm} XY$$

Assuming that k=7 (polynomial of degree 7), for example, the equation, when expanded, may be given by:

$$Z = C_2 + C_3 y + C_4 |x| + C_5 y^2 + C_6 y |x| + C_7 x^2 + C_8 y^3 + \qquad (d)$$
$$C_9 y^2 |x| + C_{10} yx^2 + C_{11} |x^3| + C_{12} y^4 + C_{13} y^3 |x| +$$
$$C_{14} y^2 x^2 + C_{15} y |x^3| + C_{16} x^4 + C_{17} y^5 + C_{18} y^4 |x| +$$
$$C_{19} y^3 x^2 + C_{20} y^2 |x^3| + C_{21} yx^4 + C_{22} |x^5| +$$
$$C_{23} y^6 + C_{24} y^5 |x| + C_{25} y^4 x^2 + C_{26} y^3 |x^3| +$$
$$C_{27} y^2 x^4 + C_{28} y |x^5| + C_{29} x^6 + C_{30} y^7 + C_{31} y^6 |x| +$$
$$C_{32} y^5 x^2 + C_{33} y^4 |x^3| + C_{34} y^3 x^4 + C_{35} y^2 |x^5| +$$
$$C_{36} yx^6 + C_{37} |x^7|$$

EXAMPLE 1

FIG. 1 is a sectional view of Example 1 taken by the YZ-plane containing the optical axis 2. The optical system according to this example is a refracting decentered optical system 10 consisting essentially of a first surface 3 formed from a decentered toric surface, and a second surface 4 formed from a decentered spherical surface. Constituent parameters of this example will be shown later. In this example, imaging field angles are as follows: The horizontal field angle is 24°, and the vertical field angle is 16.7°. The entrance pupil diameter is 2 millimeters. It should be noted that reference numeral 5 denotes an image plane. The same shall apply hereinafter.

EXAMPLE 2

Figure 2:
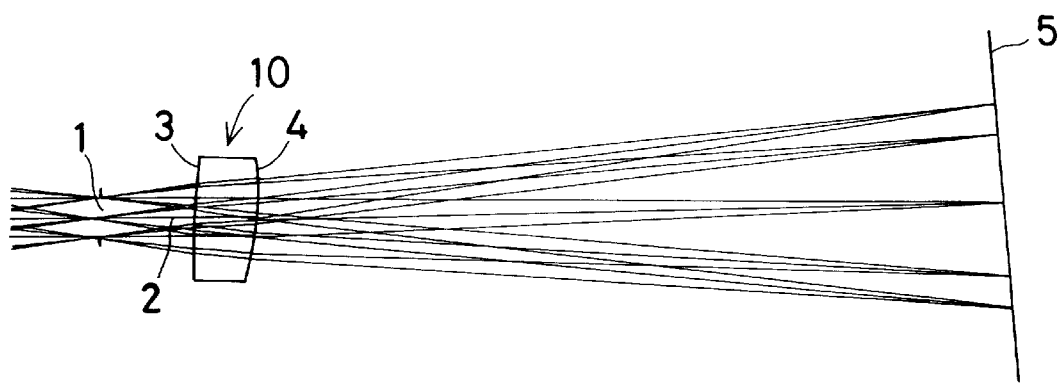
FIG. 2 is a sectional view of an optical system according to Example 2 of the present invention.

FIG. 2 is a sectional view of Example 2 taken by the YZ-plane containing the optical axis 2. The optical system according to this example is a refracting decentered optical system 10 consisting essentially of a first surface 3 formed from an anamorphic surface, and a second surface 4 formed from a decentered spherical surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 3

Figure 3:
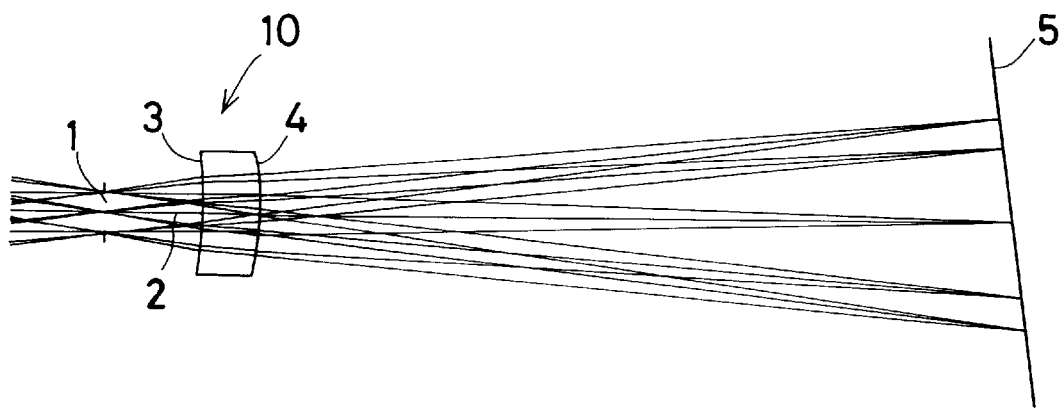
FIG. 3 is a sectional view of an optical system according to Example 3 of the present invention.

FIG. 3 is a sectional view of Example 3 taken by the YZ-plane containing the optical axis 2. The optical system according to this example is a refracting decentered optical system 10 consisting essentially of a first surface 3 formed from a three-dimensional surface, and a second surface 4 formed from a decentered spherical surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 4

Figure 4:
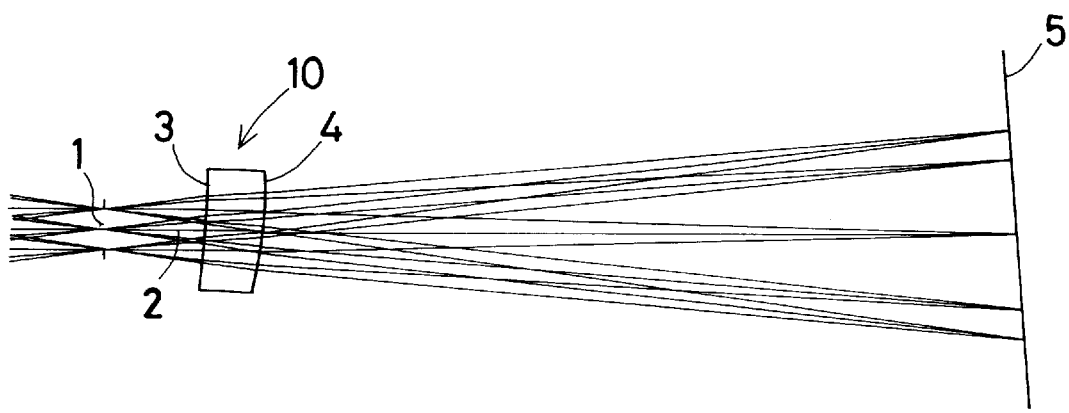
FIG. 4 is a sectional view of an optical system according to Example 4 of the present invention.

FIG. 4 is a sectional view of Example 4 taken by the YZ-plane containing the optical axis 2. The optical system according to this example is a refracting decentered optical system 10 consisting essentially of a first surface 3 formed from a decentered three-dimensional surface, and a second surface 4 formed from a decentered spherical surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 5

Figure 5:
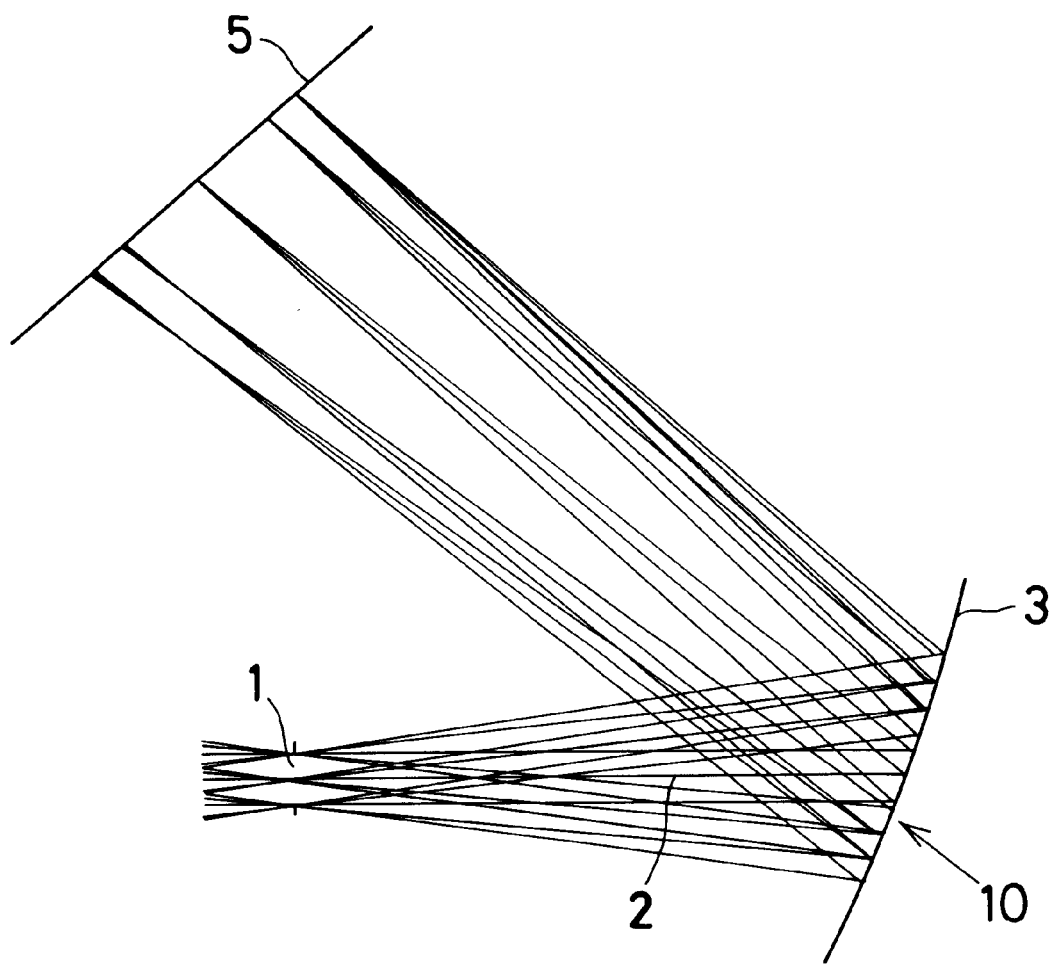
FIG. 5 is a sectional view of an optical system according to Example 5 of the present invention.

FIG. 5 is a sectional view of Example 5 taken by the YZ-plane containing the optical axis 2. The optical system according to this example is a reflecting decentered optical system 10 consisting essentially of a first surface 3 formed from a decentered three-dimensional reflecting surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 6

Figure 6A:
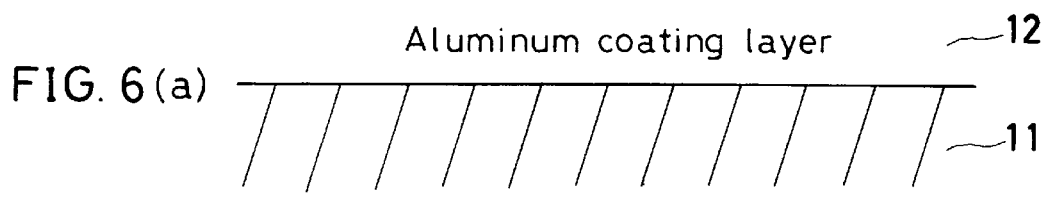
FIGS. 6(a), 6(b) and 6(c) illustrate examples of the structures of surfaces having reflecting action in Example 6 of the present invention.
Figure 6B:
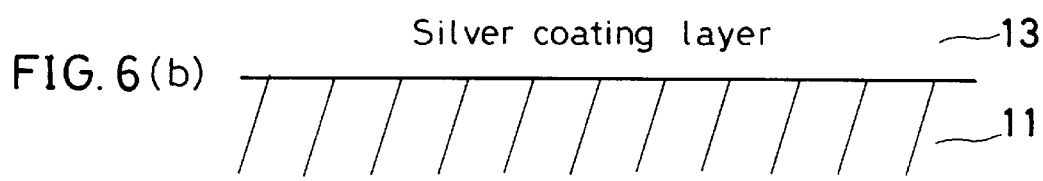
Figure 6C:
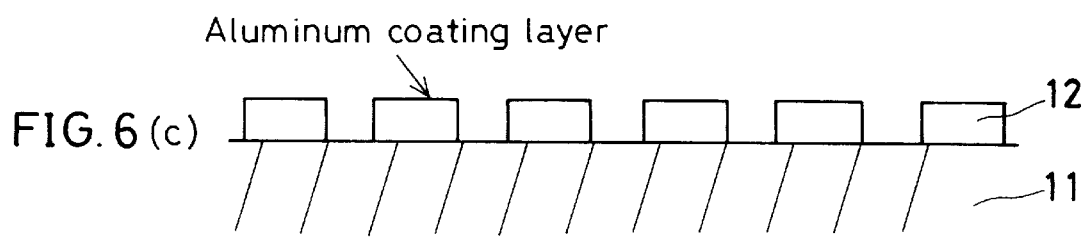

This example is concerned with the structure of a surface having reflecting action, which may be applied in a case where a rotationally asymmetric surface according to the present invention is used as a reflecting surface, particularly as a back-coated mirror. As shown in FIGS. 6(*a*), 6(*b*) and 6(*c*), examples of reflecting surfaces usable in the present invention include a structure in which, as shown in FIG. 6(*a*), a transparent member 11 made of a transparent material such as a glass or plastic material has an aluminum coating layer 12 provided on the surface thereof; a structure in which, as shown in FIG. 6(*b*), a transparent member 11 has a silver coating layer 13 provided on the surface thereof; and a structure in which, as shown in FIG. 6(*c*), a transparent member 11 has an aluminum coating layer 12 partially provided on the surface thereof to form a semitransparent mirror. It is also possible to use a reflecting surface structure which is provided with an optical multilayer film so as to have a reflectivity of 100% or to form a semitransparent mirror.

EXAMPLE 7

FIG. 7 is a sectional view of Example 7 taken by the YZ-plane containing the optical axis 2. The optical system according to this example is a reflecting decentered optical system 10 consisting essentially of a first surface 3 formed from a decentered three-dimensional transmitting surface, a second surface 4 formed from a decentered three-dimensional reflecting surface, and a third surface 6 formed from a transmitting surface common to the first and third surfaces 3 and 6. Constituent parameters of this example will be shown later. In this example, imaging field angles are as follows: The horizontal field angle is 24°, and the vertical field angle is 16.7°. The entrance pupil diameter is 2 millimeters.

EXAMPLE 8

Figure 8:
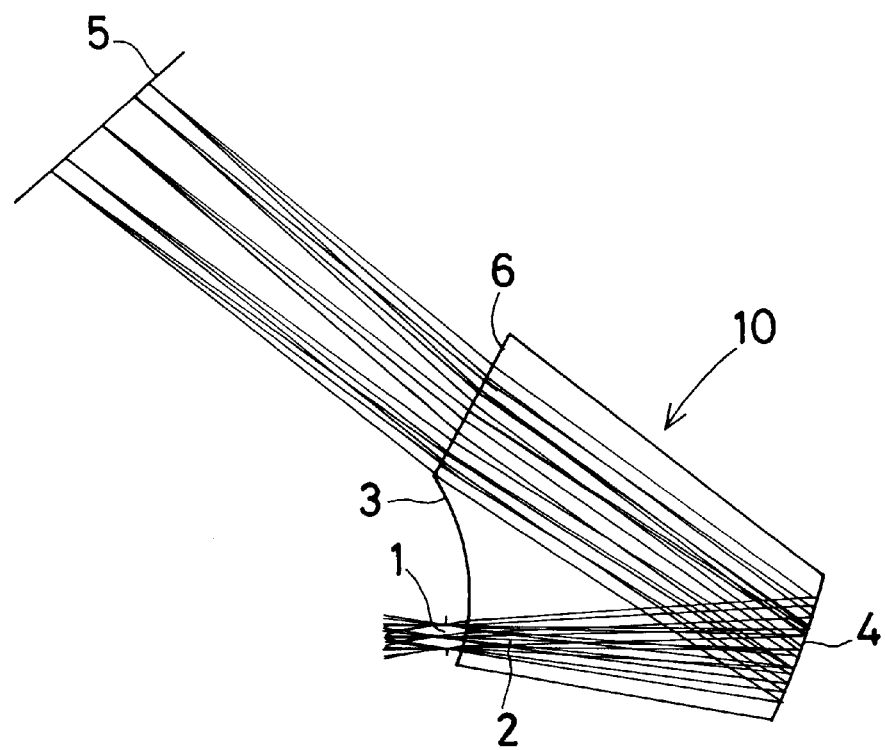
FIG. 8 is a sectional view of an optical system according to Example 8 of the present invention.

FIG. 8 is a sectional view of Example 8 taken by the YZ-plane containing the optical axis 2. The optical system according to this example is a reflecting decentered optical system 10 consisting essentially of a first surface 3 formed from a decentered three-dimensional transmitting surface, a second surface 4 formed from a decentered three-dimensional reflecting surface, and a third surface 6 formed from a decentered three-dimensional transmitting surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 9

Figure 9:
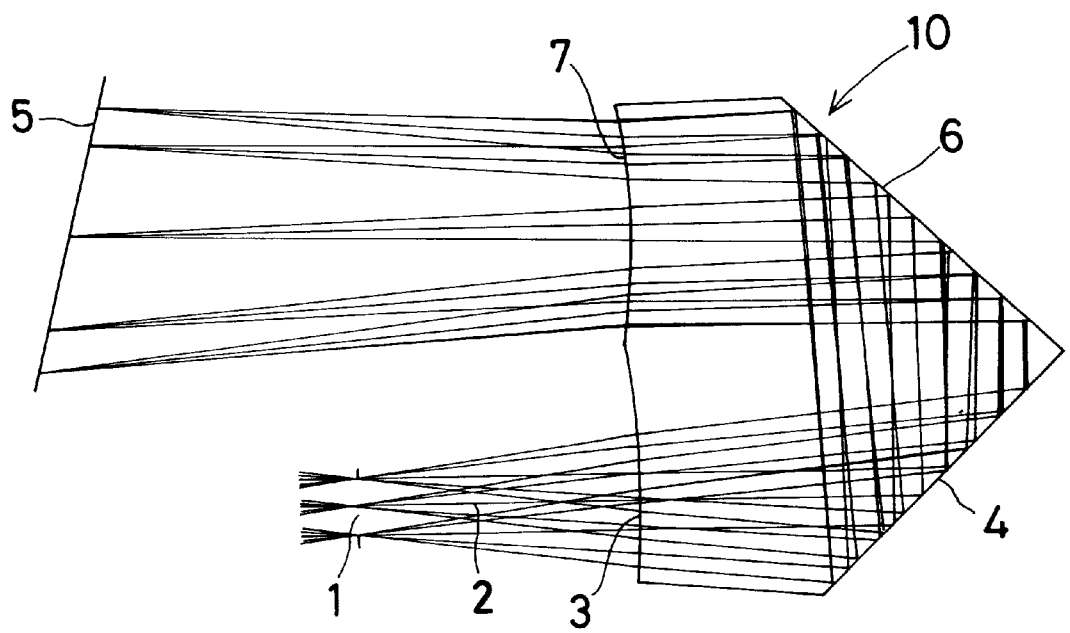
FIG. 9 is a sectional view of an optical system according to Example 9 of the present invention.

FIG. 9 is a sectional view of Example 9 taken by the YZ-plane containing the optical axis 2. The optical system according to this example is a reflecting decentered optical system 10 consisting essentially of a first surface 3 formed from a decentered three-dimensional transmitting surface, a second surface 4 formed from a decentered three-dimensional reflecting surface, a third surface 6 formed from a decentered three-dimensional reflecting surface, and a fourth surface 7 formed from a decentered three-dimensional transmitting surface. Constituent parameters of this example will be shown later. In this example, imaging field angles are as follows: The horizontal field angle is 24°, and the vertical field angle is 16.7°. The entrance pupil diameter is 2 millimeters.

EXAMPLE 10

Figure 10:
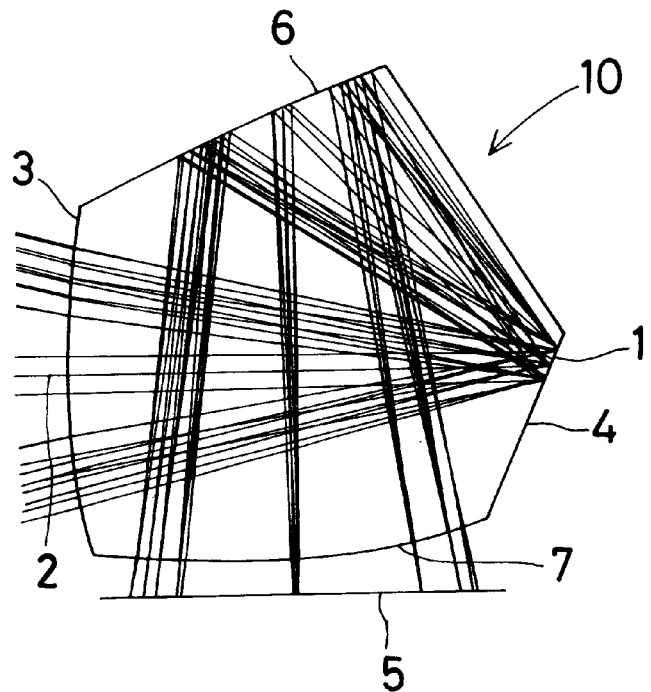
FIG. 10 is a sectional view of an optical system according to Example 10 of the present invention.

FIG. 10 is a sectional view of Example 10 taken by the YZ-plane containing the optical axis 2. The optical system according to this example is a reflecting decentered optical system 10 consisting essentially of a first surface 3 formed from a three-dimensional transmitting surface, a second surface 4 formed from a decentered three-dimensional reflecting surface, a third surface 6 formed from a decentered three-dimensional reflecting surface, and a fourth surface 7 formed from a decentered three-dimensional transmitting surface. Constituent parameters of this example will be shown later. In this example, imaging field angles are as follows: The horizontal field angle is 40°, and the vertical field angle is 30°. The entrance pupil diameter is 2 millimeters.

EXAMPLE 11

Figure 11:
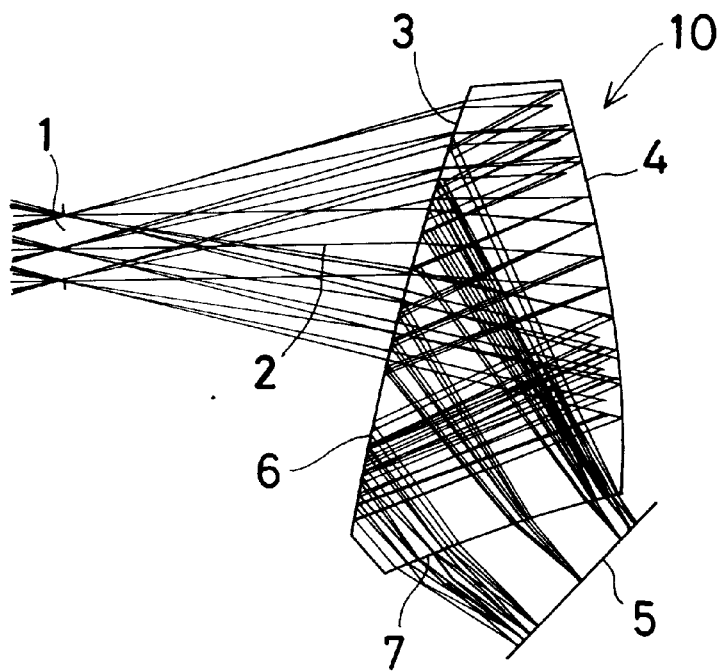
FIG. 11 is a sectional view of an optical system according to Example 11 of the present invention.

FIG. 11 is a sectional view of Example 11 taken by the YZ-plane containing the optical axis 2. The optical system according to this example is a reflecting decentered optical system 10 consisting essentially of a first surface 3 formed from a decentered three-dimensional transmitting surface, a second surface 4 formed from a decentered three-dimensional reflecting surface, a third surface 6 which is a reflecting surface formed from a surface common to the first and third surfaces 3 and 6, and a fourth surface 7 formed from a decentered three-dimensional transmitting surface. Constituent parameters of this example will be shown later. In this example, imaging field angles are as follows: The horizontal field angle is 40°, and the vertical field angle is 30°. The entrance pupil diameter is 10 millimeters.

EXAMPLE 12

Figure 12:
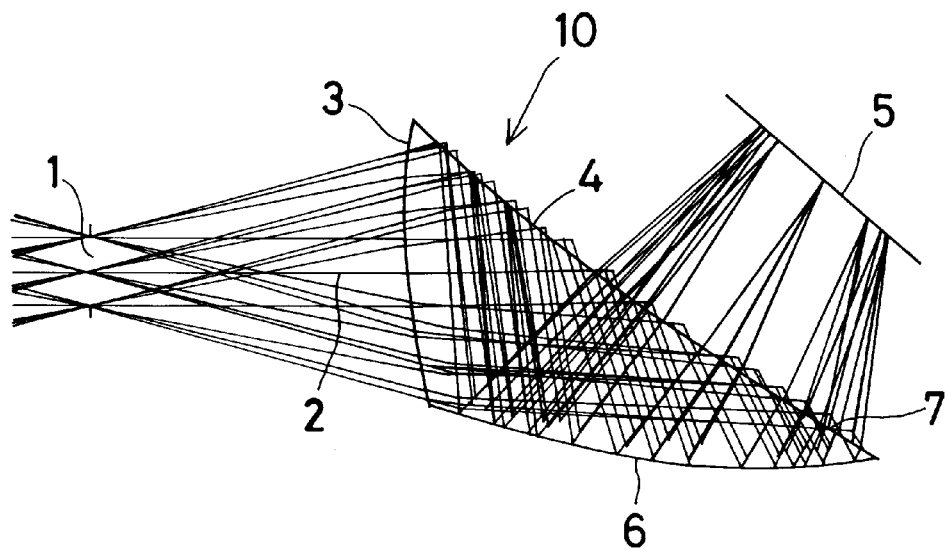
FIG. 12 is a sectional view of an optical system according to Example 12 of the present invention.

FIG. 12 is a sectional view of Example 12 taken by the YZ-plane containing the optical axis 2. The optical system according to this example is a reflecting decentered optical system 10 consisting essentially of a first surface 3 formed from a decentered three-dimensional transmitting surface, a second surface 4 formed from a decentered three-dimensional reflecting surface, a third surface 6 formed from a decentered three-dimensional reflecting surface, and a fourth surface 7 which is a transmitting surface formed from a surface common to the second and fourth surfaces 4 and 7. Constituent parameters of this example will be shown later. In this example, imaging field angles are as follows: The horizontal field angle is 40°, and the vertical field angle is 30°. The entrance pupil diameter is 10 millimeters.

EXAMPLE 13

Figure 13:
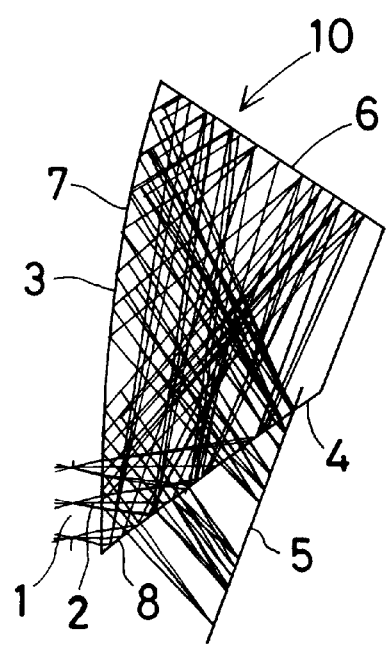
FIG. 13 is a sectional view of an optical system according to Example 13 of the present invention.

FIG. 13 is a sectional view of Example 13 taken by the YZ-plane containing the optical axis 2. The optical system according to this example is a reflecting decentered optical system 10 consisting essentially of a first surface 3 formed from a three-dimensional transmitting surface, a second surface 4 formed from a decentered three-dimensional reflecting surface, a third surface 6 formed from a plane reflecting surface, a fourth surface 7 which is a reflecting surface formed from a surface common to the first and fourth surfaces 3 and 7, and a fifth surface 8 which is a transmitting surface formed from a surface common to the second and fifth surfaces 4 and 8. Constituent parameters of this example will be shown later. In this example, imaging field angles are as follows: The horizontal field angle is 40°, and the vertical field angle is 30°. The entrance pupil diameter is 10 millimeters.

The constituent parameters of the above Examples 1 to 5 and 7 to 13 are as follows:

Example 1

| Surface No. | | Radius of curvature | Surface separation | | Refractive index (Displacement) | | Abbe's No. (Tilt angle) |
|---|---|---|---|---|---|---|---|
| 1 | | ∞ (pupil) | 5.000 | | | | |
| 2 | $R_y$ | 88.44333 | 3.000 | | 1.51633 | | 64.15 |
| | $R_x$ | 95.45737 | | Y | 0.000 | θ | −1.99° |
| 3 | | −17.301 | 38.032 | Y | 0.069 | θ | −1.77° |
| 4 | | ∞ (image plane) | | Y | 3.119 | θ | 10.00° |

| | |
|---|---|
| CXn | 0.01048 |
| CYn | 0.01130 |
| FXn | 184.8040 |
| FYn | 184.8766 |
| FX | 28.3607 |
| FY | 27.8784 |
| FXn/FX | 6.51620 |
| FYn/FY | 6.63154 |
| FY/FX | 0.98299 |

Example 2

| Surface No. | | Radius of curvature | Surface separation | | Refractive index (Displacement) | | Abbe's No. (Tilt angle) |
|---|---|---|---|---|---|---|---|
| 1 | | ∞ (pupil) | 2.273 | | | | |
| 2 | $R_y$ | 96.003 | 3.000 | | 1.5163 | | 64.15 |
| | $R_x$ | 95.457 | | Y | 0.000 | θ | 0.00° |
| | $K_y$ | 0 | | | | | |
| | $K_x$ | 0 | | | | | |
| | AR | $-8.9601 \times 10^{-5}$ | | | | | |
| | AP | $-4.4886 \times 10^{-1}$ | | | | | |
| 3 | | −17.143 | 37.747 | Y | 0.094 | θ | −2.42° |
| 4 | | ∞ (image plane) | | Y | 4.240 | θ | 10.00° |

| | |
|---|---|
| CXn | 0.01048 |
| CYn | 0.01042 |
| FXn | 184.8767 |
| FYn | 185.9339 |
| FX | 28.4495 |
| FY | 28.1215 |
| FXn/FX | 6.49842 |
| FYn/FY | 6.61181 |
| FY/FX | 1.01745 |

-continued

Example 3

| Surface No. | Radius of curvature | Surface separation | | Refractive index (Displacement) | | Abbe's No. (Tilt angle) |
|---|---|---|---|---|---|---|
| 1 | ∞ (pupil) | 5.000 | | | | |
| 2 | Three-dimensional surface(1) | 3.000 | | 1.5163 | | 64.15 |
| | | | Y | 0.000 | θ | 0.00° |
| 3 | −11.903 | 37.119 | Y | 0.000 | θ | −1.42° |
| 4 | ∞ (image plane) | | Y | 1.436 | θ | 10.00° |

Three-dimensional surface(1)

| $C_5$ | $-1.6641 \times 10^{-2}$ | $C_7$ | $-1.6675 \times 10^{-2}$ | $C_{10}$ | $3.5664 \times 10^{-4}$ |
|---|---|---|---|---|---|

| CXn | −0.03335 |
|---|---|
| CYn | −0.03328 |
| FXn | −58.0733 |
| FYn | −58.1955 |
| FX | 35.5619 |
| FY | 35.2237 |
| FXn/FX | −1.63302 |
| FYn/FY | −1.65217 |
| FY/FX | 0.99049 |

Example 4

| Surface No. | Radius of curvature | Surface separation | | Refractive index (Displacement) | | Abbe's No. (Tilt angle) |
|---|---|---|---|---|---|---|
| 1 | ∞ (pupil) | 5.000 | | | | |
| 2 | Three-dimensional surface(1) | 3.000 | | 1.5163 | | 64.15 |
| | | | Y | 0.000 | θ | −2.57° |
| 3 | −15.349 | 36.155 | Y | 0.089 | θ | −2.06° |
| 4 | ∞ (image plane) | | Y | 3.615 | θ | 10.00° |

Three-dimensional surface(1)

| $C_5$ | $-6.2923 \times 10^{-3}$ | $C_7$ | $-6.1230 \times 10^{-3}$ | $C_{10}$ | $1.0315 \times 10^{-4}$ |
|---|---|---|---|---|---|

| CXn | −0.01225 |
|---|---|
| CYn | −0.01258 |
| FXn | −158.10170 |
| FYn | −153.95436 |
| FX | 35.67606 |
| FY | 35.81662 |
| FXn/FX | −4.43159 |
| FYn/FY | −4.29841 |
| FY/FX | 1.00394 |

Example 5

| Surface No. | Radius of curvature | Surface separation | | Refractive index (Displacement) | | Abbe's No. (Tilt angle) |
|---|---|---|---|---|---|---|
| 1 | ∞ (pupil) | 23.667 | | | | |
| 2 | Three-dimensional surface(1) | −33.473 | Y | 0.000 | θ | −20.00° |
| 3 | ∞ (display plane) | | Y | 12.183 | θ | −29.79° |

Three-dimensional surface(1)

| $C_5$ | $-6.6312 \times 10^{-3}$ | $C_7$ | $-7.3816 \times 10^{-3}$ | $C_8$ | $1.3051 \times 10^{-4}$ |
|---|---|---|---|---|---|
| $C_{10}$ | $3.5104 \times 10^{-4}$ | $C_{12}$ | $-1.7318 \times 10^{-6}$ | $C_{14}$ | $1.4418 \times 10^{-6}$ |
| $C_{16}$ | $1.0842 \times 10^{-6}$ | $C_{17}$ | $-2.2182 \times 10^{-6}$ | $C_{19}$ | $-1.3828 \times 10^{-6}$ |
| $C_{21}$ | $-6.8971 \times 10^{-6}$ | | | | |

| CXn | −0.01476 |
|---|---|
| CYn | −0.01326 |
| FXn | −33.87534 |
| FYn | −37.70739 |
| FX | 35.52397 |
| FY | 35.37319 |
| FXn/FX | −0.95359 |
| FYn/FY | −1.06599 |
| FY/FX | 0.99576 |

-continued

Example 7

| Surface No. | Radius of curvature | Surface separation | | Refractive index (Displacement) | | Abbe's No. (Tilt angle) |
|---|---|---|---|---|---|---|
| 1 | ∞ (pupil) | | | | | |
| 2 Three-dimensional surface(1) | | | | 1.5163 | | 64.15 |
| | | | Y | 0.000 | θ | −17.45° |
| | | | Z | 17.611 | | |
| 3 Three-dimensional surface(2) | | | | 1.5163 | | 64.15 |
| | | | Y | −0.529 | θ | −20.00° |
| | | | Z | 22.611 | | |
| 4 Three-dimensional surface(1) | | | Y | 0.000 | θ | −17.45° |
| | | | Z | 17.611 | | |
| 5 | ∞ (image plane) | | Y | 24.425 | θ | −47.96° |
| | | | Z | −7.952 | | |

Three-dimensional surface(1)

| $C_5$ | $1.8423 \times 10^{-2}$ | $C_7$ | $3.2520 \times 10^{-2}$ |
|---|---|---|---|

Three-dimensional surface(2)

| $C_5$ | $2.3788 \times 10^{-3}$ | $C_7$ | $7.6150 \times 10^{-3}$ |
|---|---|---|---|

Three-dimensional surface(2)

| CXn | 0.01523 |
|---|---|
| CYn | 0.00476 |
| FXn | 21.65092 |
| FYn | 69.27385 |
| FX | 28.80566 |
| FY | 28.36382 |
| FXn/FX | 0.75162 |
| FYn/FY | 2.44233 |
| FY/FX | 0.98466 |

Example 8

| Surface No. | Radius of curvature | Surface separation | | Refractive index (Displacement) | | Abbe's No. (Tilt angle) |
|---|---|---|---|---|---|---|
| 1 | ∞ (pupil) | | | | | |
| 2 Three-dimensional surface(1) | | | | 1.5163 | | 64.15 |
| | | | Y | 0.000 | θ | −11.28° |
| | | | Z | 1.758 | | |
| 3 Three-dimensional surface(2) | | | | 1.5163 | | 64.15 |
| | | | Y | −1.816 | θ | −20.00° |
| | | | Z | 28.620 | | |
| 4 Three-dimensional surface(3) | | | Y | 17.796 | θ | −28.72° |
| | | | Z | 1.758 | | |
| 5 | ∞ (image plane) | | Y | 41.948 | θ | −49.40° |
| | | | Z | −27.025 | | |

Three-dimensional surface(1)

| $C_5$ | $-2.9815 \times 10^{-2}$ | $C_7$ | $5.8788 \times 10^{-3}$ | $C_{10}$ | $-1.9434 \times 10^{-4}$ |
|---|---|---|---|---|---|

Three-dimensional surface(2)

| $C_5$ | $-5.6421 \times 10^{-3}$ | $C_7$ | $3.0794 \times 10^{-3}$ | $C_{10}$ | $-6.3954 \times 10^{-5}$ |
|---|---|---|---|---|---|

Three-dimensional surface(3)

| $C_5$ | $2.7620 \times 10^{-3}$ | $C_7$ | $3.3894 \times 10^{-2}$ | $C_{10}$ | $2.5637 \times 10^{-5}$ |
|---|---|---|---|---|---|

Three-dimensional surface(2)

| CXn | 0.00616 |
|---|---|
| CYn | −0.01128 |
| FXn | 53.52979 |
| FYn | −29.23258 |
| FX | 33.52330 |
| FY | 34.95281 |
| FXn/FX | 1.59679 |
| FYn/FY | −0.83634 |
| FY/FX | 1.04264 |

-continued

Example 9

| Surface No. | Radius of curvature | Surface separation | | Refractive index (Displacement) | | Abbe's No. (Tilt angle) |
|---|---|---|---|---|---|---|
| 1 | ∞ (pupil) | | | | | |
| 2 Three-dimensional surface(1) | | | | 1.5163 | | 64.15 |
| | | | Y | 0.000 | θ | 0.00° |
| | | | Z | 10.000 | | |
| 3 Three-dimensional surface(2) | | | | 1.5163 | | 64.15 |
| | | | Y | 0.000 | θ | −45.00° |
| | | | Z | 20.000 | | |
| 4 Three-dimensional surface(3) | | | | 1.5163 | | 64.15 |
| | | | Y | 10.000 | θ | 45.00° |
| | | | Z | 20.000 | | |
| 5 Three-dimensional surface(4) | | | Y | 10.000 | θ | 0.00° |
| | | | Z | 10.000 | | |
| 6 | ∞ (image plane) | | Y | 10.000 | θ | −13.68° |
| | | | Z | −10.000 | | |

Three-dimensional surface(1)

| | | | | | |
|---|---|---|---|---|---|
| $C_5$ | $-2.5583 \times 10^{-3}$ | $C_7$ | $-1.1629 \times 10^{-3}$ | $C_8$ | $3.6340 \times 10^{-4}$ |
| $C_{10}$ | 0 | $C_{12}$ | $3.2535 \times 10^{-5}$ | $C_{14}$ | $3.1012 \times 10^{-5}$ |
| $C_{16}$ | $8.2196 \times 10^{-5}$ | | | | |

Three-dimensional surface(2)

| | | | | | |
|---|---|---|---|---|---|
| $C_5$ | $-2.5807 \times 10^{-3}$ | $C_7$ | $-5.9100 \times 10^{-3}$ | $C_8$ | $-7.4253 \times 10^{-6}$ |
| $C_{10}$ | $3.3196 \times 10^{-5}$ | $C_{12}$ | $3.2466 \times 10^{-7}$ | $C_{14}$ | $-3.5149 \times 10^{-7}$ |
| $C_{16}$ | $1.9988 \times 10^{-5}$ | | | | |

Three-dimensional surface(3)

| | | | | | |
|---|---|---|---|---|---|
| $C_5$ | $-2.9513 \times 10^{-3}$ | $C_7$ | $-4.5073 \times 10^{-3}$ | $C_8$ | $-1.0598 \times 10^{-4}$ |
| $C_{10}$ | $-1.0663 \times 10^{-5}$ | $C_{12}$ | $-2.8568 \times 10^{-6}$ | $C_{14}$ | $7.7238 \times 10^{-7}$ |
| $C_{16}$ | $-9.1435 \times 10^{-6}$ | | | | |

Three-dimensional surface(4)

| | | | | | |
|---|---|---|---|---|---|
| $C_5$ | $-1.9093 \times 10^{-2}$ | $C_7$ | $-1.9783 \times 10^{-2}$ | $C_8$ | $-7.3494 \times 10^{-4}$ |
| $C_{10}$ | 0 | $C_{12}$ | $-9.6786 \times 10^{-5}$ | $C_{14}$ | $-5.5417 \times 10^{-5}$ |
| $C_{16}$ | $-4.5951 \times 10^{-6}$ | | | | |

| | Three-dimensional surface | | | |
|---|---|---|---|---|
| | (1) | (2) | (3) | (4) |
| CXn | −0.00233 | −0.01182 | −0.00901 | −0.03957 |
| CYn | −0.00512 | −0.00516 | −0.00590 | −0.03819 |
| FXn | −831.2214 | 27.8970 | 36.5975 | −48.9448 |
| FYn | −378.2706 | 63.9037 | 55.8887 | −50.7134 |
| FX | 33.59086 | | | |
| FY | 31.39717 | | | |
| FXn/FX | −24.7455 | 0.8305 | 1.0895 | −1.4571 |
| FYn/FY | −12.0479 | 2.0353 | 1.7801 | −1.6152 |
| FY/FX | 0.9347 | | | |

Example 10

| Surface No. | Radius of curvature | Surface separation | | Refractive index (Displacement) | | Abbe's No. (Tilt angle) |
|---|---|---|---|---|---|---|
| 1 Three-dimensional surface(1) | | | | 1.5163 | | 64.15 |
| 2 Three-dimensional surface(2) | | | | 1.5163 | | 64.15 |
| | | | Y | 0.000 | θ | −22.50° |
| | | | Z | 26.000 | | |
| 3 Three-dimensional surface(3) | | | | 1.5163 | | 64.15 |
| | | | Y | 14.000 | θ | −67.50° |
| | | | Z | 12.000 | | |
| 4 Three-dimensional surface(4) | | 2.000 | Y | −10.000 | θ | 90.00° |
| | | | Z | 10.000 | | |
| 5 | ∞ (image plane) | | | | | |

Three-dimensional surface(1)

| | | | | | |
|---|---|---|---|---|---|
| $C_5$ | $1.3733 \times 10^{-2}$ | $C_7$ | $1.8225 \times 10^{-2}$ | $C_8$ | $-9.4288 \times 10^{-5}$ |
| $C_{10}$ | $-1.3336 \times 10^{-4}$ | | | | |

-continued

Three-dimensional surface(2)

| | | | | | |
|---|---|---|---|---|---|
| $C_5$ | $-7.9366 \times 10^{-4}$ | $C_7$ | $-1.1721 \times 10^{-3}$ | $C_8$ | $-2.5491 \times 10^{-5}$ |
| $C_{10}$ | $-5.6154 \times 10^{-5}$ | | | | |

Three-dimensional surface(3)

| | | | | | |
|---|---|---|---|---|---|
| $C_5$ | $2.8039 \times 10^{-3}$ | $C_7$ | $-8.7180 \times 10^{-4}$ | $C_8$ | $-7.6318 \times 10^{-5}$ |
| $C_{10}$ | $-1.4966 \times 10^{-4}$ | | | | |

Three-dimensional surface(4)

| | | | | | |
|---|---|---|---|---|---|
| $C_5$ | $8.4385 \times 10^{-3}$ | $C_7$ | $-6.4925 \times 10^{-3}$ | $C_8$ | $-2.7582 \times 10^{-4}$ |
| $C_{10}$ | $3.1268 \times 10^{-4}$ | | | | |

| | Three-dimensional surface | | | |
|---|---|---|---|---|
| | (1) | (2) | (3) | (4) |
| CXn | 0.03645 | −0.00234 | −0.00174 | −0.01299 |
| CYn | 0.02747 | −0.00159 | 0.00561 | 0.01688 |
| FXn | 53.13432 | 140.9160 | −189.5078 | −149.0951 |
| FYn | 70.50404 | 207.3859 | 58.7778 | 114.7361 |
| FX | 49.19207 | | | |
| FY | 34.94060 | | | |
| FXn/FX | 1.0801 | 2.8646 | −3.8524 | −3.03087 |
| FYn/FY | 2.0178 | 5.9354 | 1.6822 | 3.28374 |
| FY/FX | 0.7102 | | | |

Example 11

| Surface No. | Radius of curvature | Surface separation | | Refractive index | | Abbe's No. |
|---|---|---|---|---|---|---|
| 1 | ∞ (pupil) | | | | | |
| 2 Three-dimensional surface(1) | | | | 1.5163 | | 64.15 |
| | | Y | −22.988 | | θ | −8.98° |
| | | Z | 50.530 | | | |
| 3 Three-dimensional surface(2) | | | | 1.5163 | | 64.15 |
| | | Y | −1.449 | | θ | 17.73° |
| | | Z | 76.977 | | | |
| 4 Three-dimensional surface(1) | | | | 1.5163 | | 64.15 |
| | | Y | −22.988 | | θ | −8.98° |
| | | Z | 50.530 | | | |
| 5 Three-dimensional surface(3) | | Y | −48.948 | | θ | −78.43° |
| | | Z | 67.306 | | | |
| 6 | ∞ (image plane) | Y | −58.973 | | θ | −45.00° |
| | | Z | 77.331 | | | |

Three-dimensional surface(1)

| | | | | | |
|---|---|---|---|---|---|
| $C_5$ | $6.7120 \times 10^{-4}$ | $C_7$ | $-1.1797 \times 10^{-4}$ | $C_8$ | 0 |
| $C_{10}$ | $2.1250 \times 10^{-5}$ | | | | |

Three-dimensional surface(2)

| | | | | | |
|---|---|---|---|---|---|
| $C_5$ | $-2.0716 \times 10^{-3}$ | $C_7$ | $-3.2040 \times 10^{-3}$ | $C_8$ | 0 |
| $C_{10}$ | $1.8112 \times 10^{-5}$ | | | | |

Three-dimensional surface(3)

| | | | | | |
|---|---|---|---|---|---|
| $C_5$ | $1.3932 \times 10^{-3}$ | $C_7$ | $1.2275 \times 10^{-2}$ | $C_8$ | 0 |
| $C_{10}$ | $6.8065 \times 10^{-5}$ | | | | |

| | Three-dimensional surface | | | |
|---|---|---|---|---|
| | (1) | (2) | (1) | (3) |
| CXn | 0.00076 | −0.00641 | −0.00024 | 0.02455 |
| CYn | 0.00134 | −0.00414 | 0.00134 | 0.00279 |
| FXn | 2548.34984 | 51.44205 | 1373.93135 | −78.8898 |
| FYn | 1445.3327 | 79.6482 | −246.07726 | −777.80959 |
| FX | 66.22517 | | | |
| FY | 50.40322 | | | |
| FXn/FX | 38.4801 | 0.7768 | 20.7464 | −3.03087 |
| FYn/FY | 28.6754 | 1.5802 | 1.6822 | 3.28374 |
| FY/FX | 0.7102 | | | |

-continued

Example 12

| Surface No. | Radius of curvature | Surface separation | | Refractive index | | Abbe's No. |
|---|---|---|---|---|---|---|
| 1 | ∞ (pupil) | | | | | |
| 2 | Three-dimensional surface(1) | | | 1.5163 | | 64.15 |
| | | | Y | 0.000 | θ | 4.56° |
| | | | Z | 48.036 | | |
| 3 | Three-dimensional surface(2) | | | 1.5163 | | 64.15 |
| | | | Y | 0.781 | θ | 54.56° |
| | | | Z | 76.770 | | |
| 4 | Three-dimensional surface(3) | | | 1.5163 | | 64.15 |
| | | | Y | −28.138 | θ | 83.15° |
| | | | Z | 85.930 | | |
| 5 | Three-dimensional surface(2) | | Y | 0.781 | θ | 54.56° |
| | | | Z | 76.770 | | |
| 6 | ∞ (image plane) | | Y | 14.258 | θ | 50.00° |
| | | | Z | 111.028 | | |

Three-dimensional surface(1)

| $C_5$ | $6.1734 \times 10^{-3}$ | $C_7$ | $9.9567 \times 10^{-3}$ | $C_8$ | $2.2653 \times 10^{-5}$ |
|---|---|---|---|---|---|
| $C_{10}$ | $5.7752 \times 10^{-5}$ | | | | |

Three-dimensional surface(2)

| $C_5$ | $9.6423 \times 10^{-4}$ | $C_7$ | $3.0939 \times 10^{-3}$ | $C_8$ | $4.2479 \times 10^{-6}$ |
|---|---|---|---|---|---|
| $C_{10}$ | $1.8481 \times 10^{-5}$ | | | | |

Three-dimensional surface(3)

| $C_5$ | $3.8994 \times 10^{-3}$ | $C_7$ | $4.1772 \times 10^{-3}$ | $C_8$ | $-4.2157 \times 10^{-6}$ |
|---|---|---|---|---|---|
| $C_{10}$ | $1.7324 \times 10^{-6}$ | | | | |

| | Three-dimensional surface | | | |
|---|---|---|---|---|
| | (1) | (2) | (3) | (2) |
| CXn | 0.01991 | 0.00619 | 0.00835 | 0.00534 |
| CYn | 0.01235 | 0.00193 | 0.00780 | 0.00134 |
| FXn | 97.2750 | −53.2704 | 39.4902 | −362.6865 |
| FYn | 156.8215 | −170.8516 | 42.2748 | −1445.3327 |
| FX | 55.61735 | | | |
| FY | 45.53734 | | | |
| FXn/FX | 1.7490 | −0.9578 | 0.7100 | −6.52110 |
| FYn/FY | 3.4438 | −3.7519 | 0.9284 | −31.7395 |
| FY/FX | 0.81876 | | | |

Example 13

| Surface No. | Radius of curvature | Surface separation | | Refractive index | | Abbe's No. |
|---|---|---|---|---|---|---|
| 1 | ∞ (pupil) | | | | | |
| 2 | Three-dimensional surface(1) | | | 1.5254 | | 56.25 |
| | | | Y | 0.000 | θ | 0.00° |
| | | | Z | 4.230 | | |
| 3 | Three-dimensional surface(2) | | | 1.5254 | | 56.25 |
| | | | Y | 0.000 | θ | −53.34° |
| | | | Z | 14.245 | | |
| 4 | ∞ | | | 1.5254 | | 56.25 |
| | | | Y | 47.807 | θ | 57.45° |
| | | | Z | 28.564 | | |
| 5 | Three-dimensional surface(1) | | | 1.5254 | | 56.25 |
| | | | Y | 0.000 | θ | 0.00° |
| | | | Z | 4.230 | | |
| 6 | Three-dimensional surface(2) | | Y | 0.000 | θ | −53.34° |
| | | | Z | 14.245 | | |
| 7 | ∞ (image plane) | | Y | 0.000 | θ | −19.11° |
| | | | Z | 26.296 | | |

Three-dimensional surface(1)

| $C_5$ | $1.0924 \times 10^{-3}$ | $C_7$ | $7.2551 \times 10^{-3}$ | $C_8$ | $-1.1681 \times 10^{-5}$ |
|---|---|---|---|---|---|
| $C_{10}$ | $1.0202 \times 10^{-5}$ | $C_{12}$ | $1.0606 \times 10^{-6}$ | $C_{14}$ | $-8.1164 \times 10^{-7}$ |
| $C_{16}$ | $-5.8312 \times 10^{-7}$ | $C_{17}$ | $-9.2779 \times 10^{-9}$ | $C_{19}$ | $1.0029 \times 10^{-8}$ |
| $C_{21}$ | $2.5790 \times 10^{-8}$ | | | | |

-continued

| Three-dimensional surface(2) | | | | | |
|---|---|---|---|---|---|
| $C_5$ | $-6.7102 \times 10^{-4}$ | $C_7$ | $3.6136 \times 10^{-4}$ | $C_8$ | $-1.3035 \times 10^{-5}$ |
| $C_{10}$ | $-5.9967 \times 10^{-6}$ | $C_{12}$ | $2.8639 \times 10^{-7}$ | $C_{14}$ | $1.1362 \times 10^{-6}$ |
| $C_{16}$ | $1.4776 \times 10^{-7}$ | $C_{17}$ | $3.7664 \times 10^{-9}$ | $C_{19}$ | $-3.4413 \times 10^{-8}$ |
| $C_{21}$ | $-2.3892 \times 10^{-7}$ | | | | |

| | Three-dimensional surface | | | |
|---|---|---|---|---|
| | (1) | (2) | (1) | (2) |
| CXn | 0.01451 | 0.00070 | 0.01421 | 0.00075 |
| CYn | 0.00218 | −0.00134 | 0.00586 | −0.00171 |
| FXn | 133.4766 | −471.0622 | 23.2050 | −2582.3278 |
| FYn | 888.4155 | 246.0773 | 56.2702 | 1132.5999 |
| FX | 34.36426 | | | |
| FY | 31.49606 | | | |
| FXn/FX | 3.8842 | 13.7079 | 0.6753 | 75.1457 |
| FYn/FY | 28.2072 | 7.8130 | 1.7866 | 35.9601 |
| FY/FX | 0.9165 | | | |

The following is a description of examples concerning the arrangement of surfaces of a decentered optical system according to the present invention which has at least one rotationally asymmetric surface that satisfies at least one of the-above-described conditions (1-1) to (3-3). In the following description, the object plane and the image plane are relative to each other; it will be apparent that the object and image planes may be replaced by each other to use the optical path reversely.

EXAMPLE 14

Figure 14:
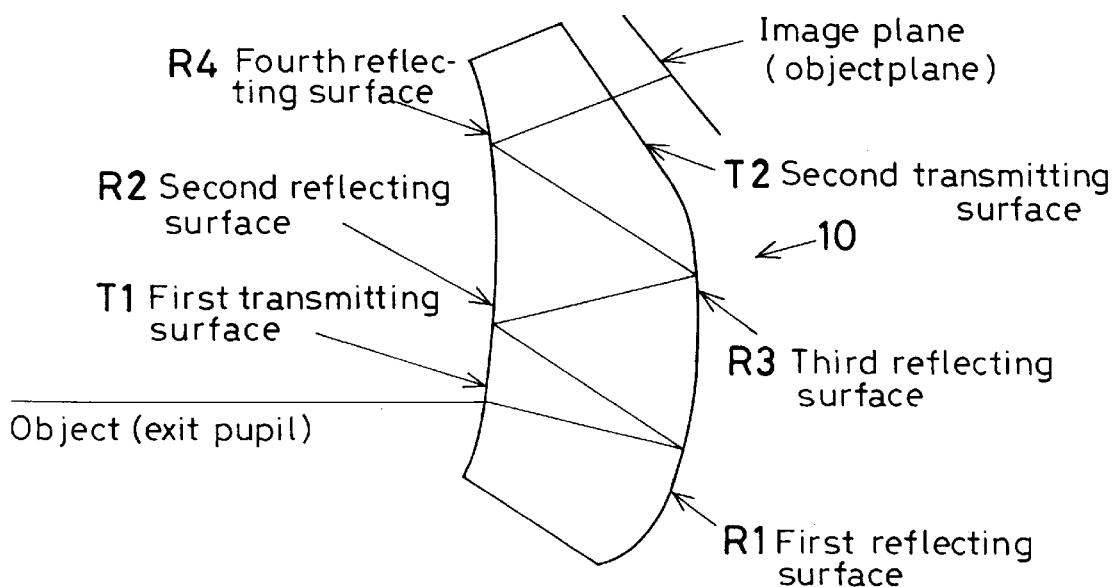
FIG. 14 illustrates an optical ray trace of an optical system according to Example 14 of the present invention.

As shown in FIG. 14, a decentered optical system 10 according to this example comprises, in order in which incident light rays from an object pass, a first transmitting surface T1, a first reflecting surface R1, a second reflecting surface R2, a third reflecting surface R3, a fourth reflecting surface R4, and a second transmitting surface T2. The light rays enter the optical system through the first transmitting surface T1 and are reflected successively by the first reflecting surface R1, the second reflecting surface R2, the third reflecting surface R3, and the fourth reflecting surface R4. The reflected light rays exit from the optical system through the second transmitting surface T2 in a direction different from a direction in which the light rays are incident on the first transmitting surface T1 to reach the image plane. The image plane may be replaced by the object plane to use the optical path reversely.

EXAMPLE 15

Figure 15:
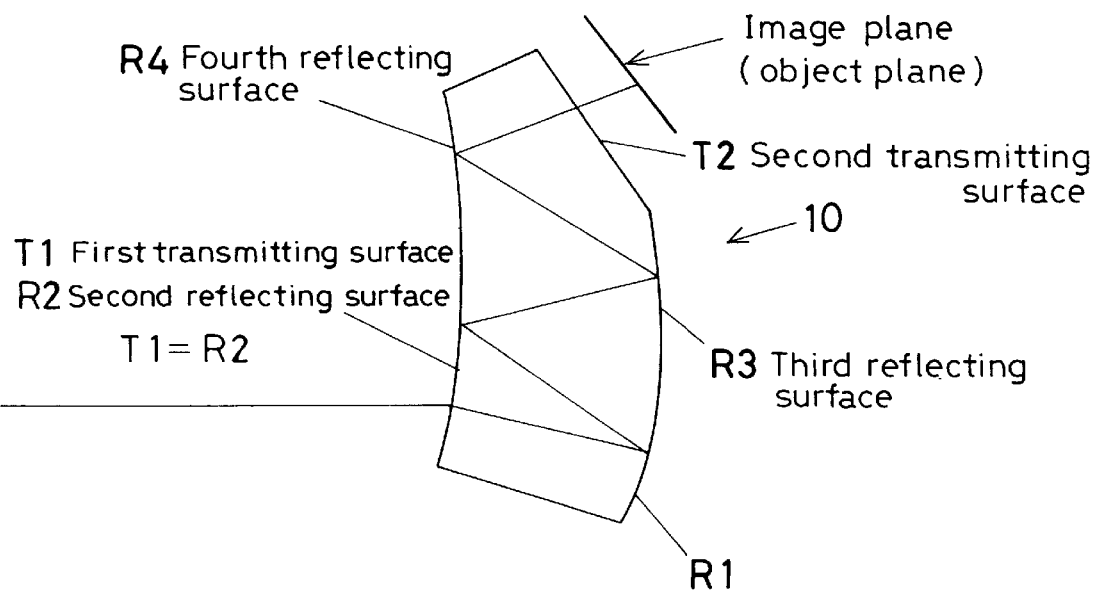
FIG. 15 illustrates an optical ray trace of an optical system according to Example 15 of the present invention.

As shown in FIG. 15, a decentered optical system 10 according to this example is the same as that shown in FIG. 14 except that the first transmitting surface T1 and the second reflecting surface R2 are the identical surface.

EXAMPLE 16

Figure 16:
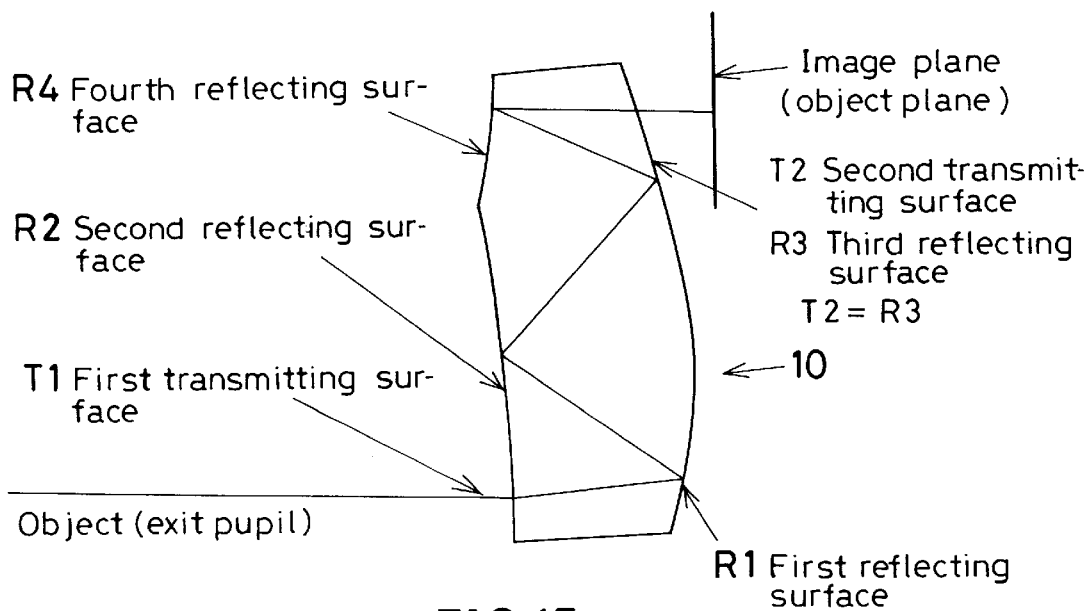
FIG. 16 illustrates an optical ray trace of an optical system according to Example 16 of the present invention.

As shown in FIG. 16, a decentered optical system 10 according to this example is the same as that shown in FIG. 14 except that the second transmitting surface T2 and the third reflecting surface R3 are the identical surface.

EXAMPLE 17

Figure 17:
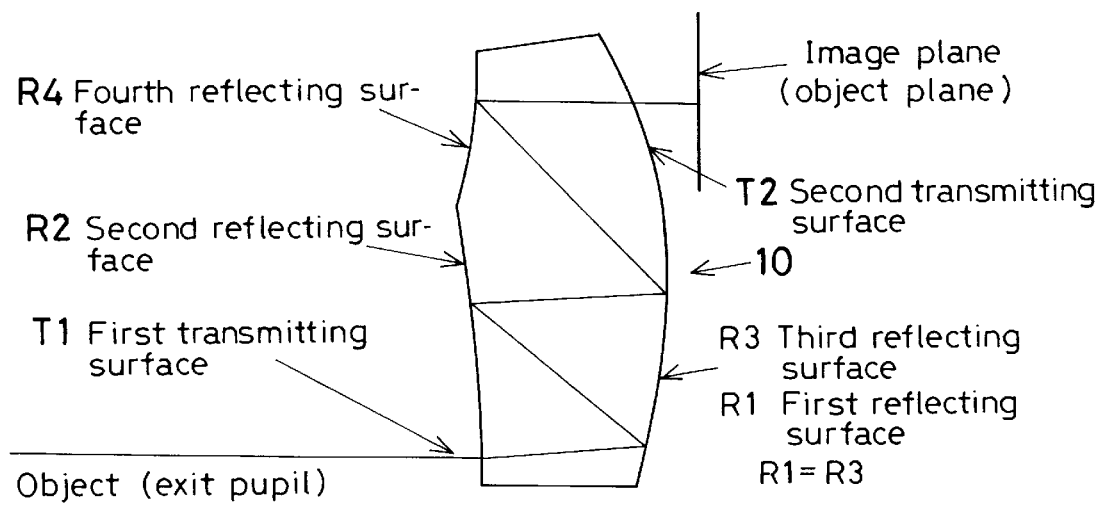
FIG. 17 illustrates an optical ray trace of an optical system according to Example 17 of the present invention.

As shown in FIG. 17, a decentered optical system 10 according to this example is the same as that shown in FIG. 14 except that the first reflecting surface R1 and the third reflecting surface R3 are the identical surface.

EXAMPLE 18

Figure 18:
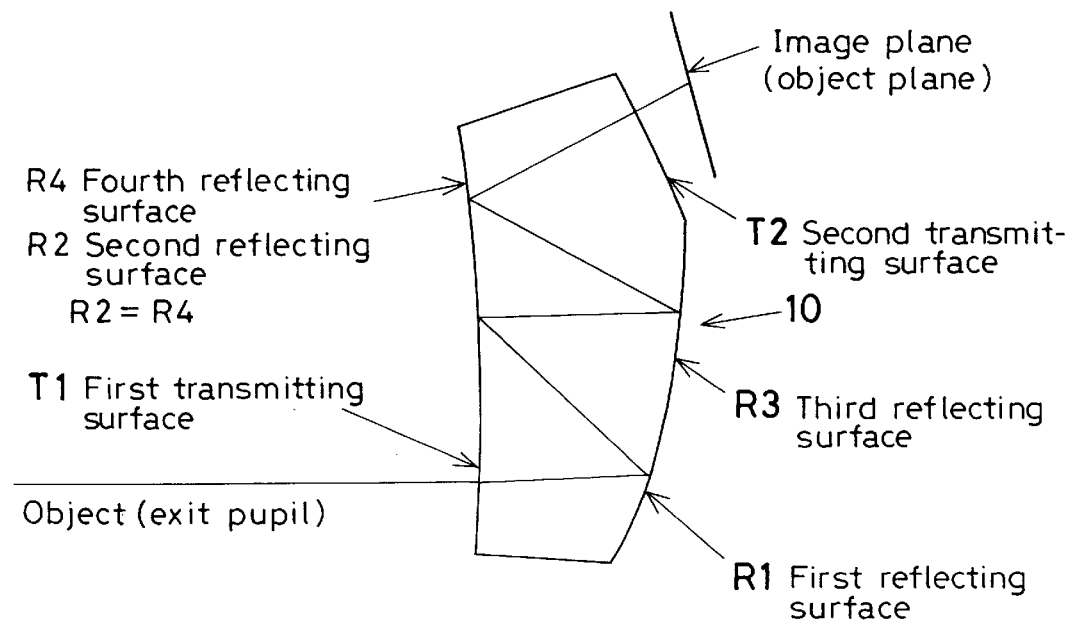
FIG. 18 illustrates an optical ray trace of an optical system according to Example 18 of the present invention.

As shown in FIG. 18, a decentered optical system 10 according to this example is the same as that shown in FIG. 14 except that the second reflecting surface R2 and fourth reflecting surface R4 are the identical surface.

EXAMPLE 19

Figure 19:
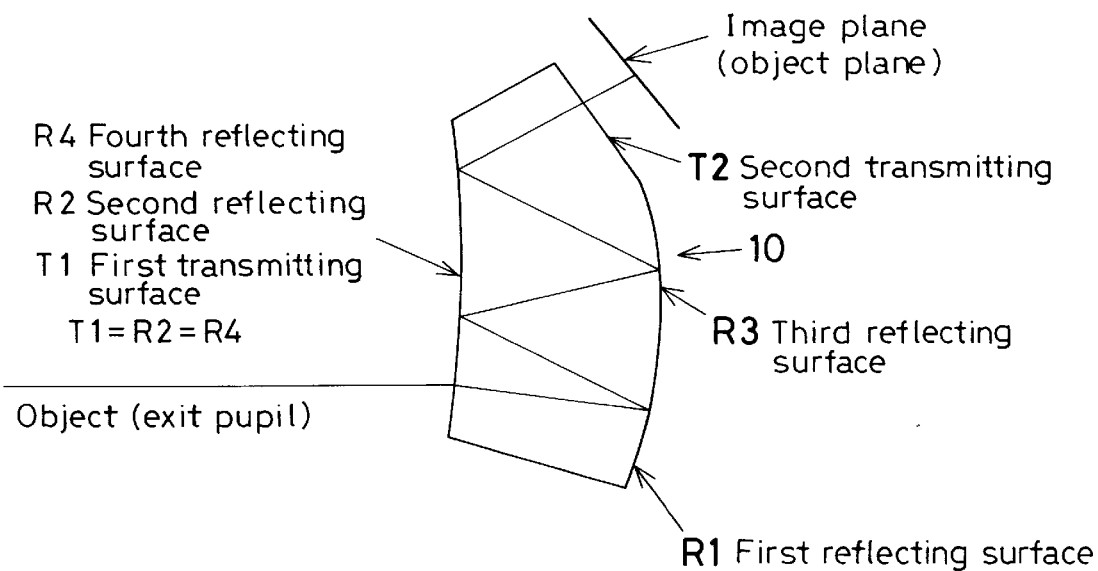
FIG. 19 illustrates an optical ray trace of an optical system according to Example 19 of the present invention.

As shown in FIG. 19, a decentered optical system 10 according to this example is the same as that shown in FIG. 14 except that the first transmitting surface T1, the second reflecting surface R2, and the fourth reflecting surface R4 are the identical surface.

EXAMPLE 20

Figure 20:
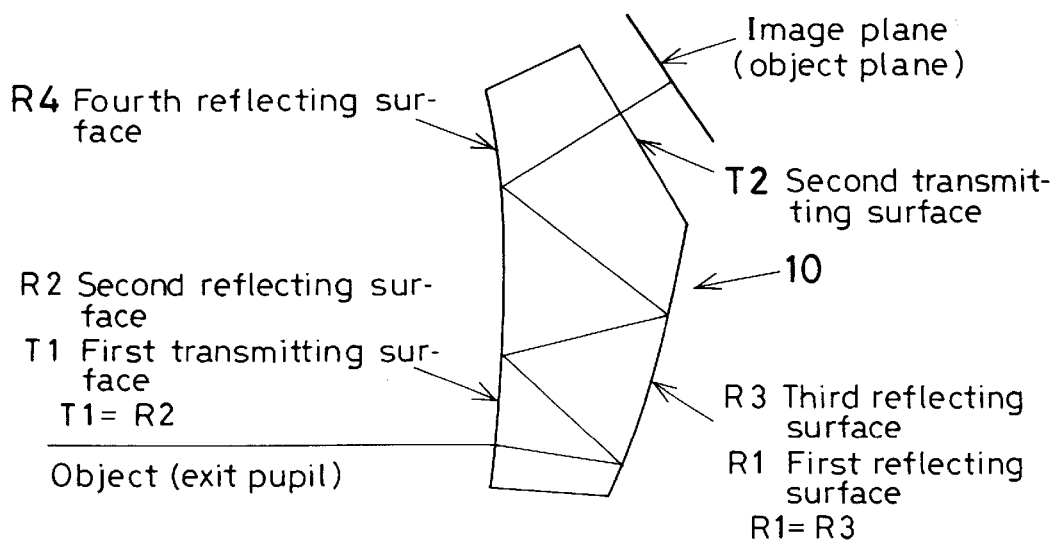
FIG. 20 illustrates an optical ray trace of an optical system according to Example 20 of the present invention.

As shown in FIG. 20, a decentered optical system 10 according to this example is the same as that shown in FIG. 14 except that the first transmitting surface T1 and the second reflecting surface R2 are the identical surface, and the first reflecting surface R1 and the third reflecting surface R3 are the identical surface.

EXAMPLE 21

Figure 21:
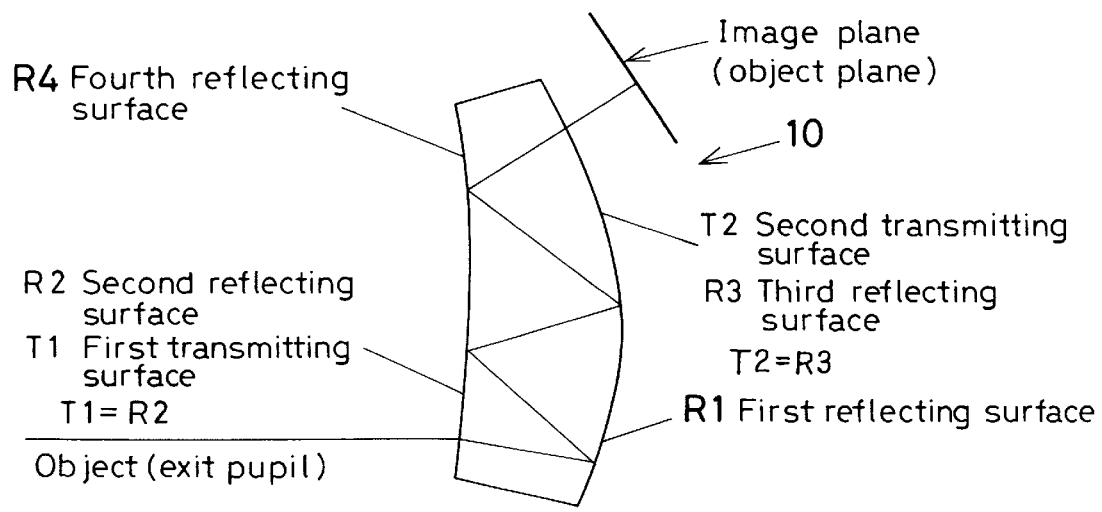
FIG. 21 illustrates an optical ray trace of an optical system according to Example 21 of the present invention.

As shown in FIG. 21, a decentered optical system 10 according to this example is the same as that shown in FIG. 14 except that the first transmitting surface T1 and the second reflecting surface R2 are the identical surface, and the second transmitting surface T2 and the third reflecting surface R3 are the identical surface.

EXAMPLE 22

Figure 22:
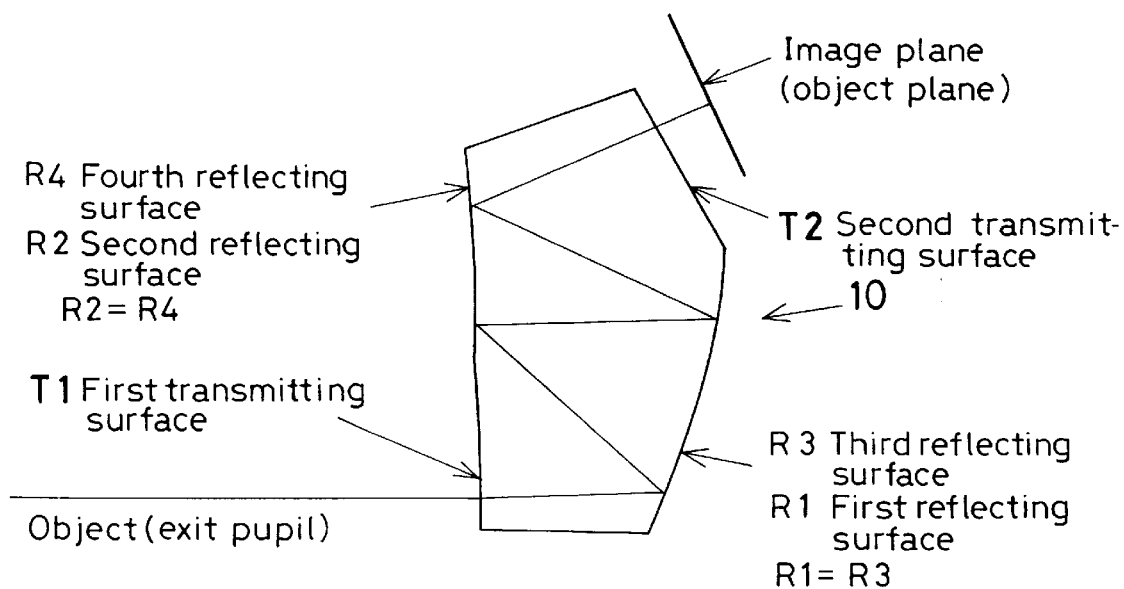
FIG. 22 illustrates an optical ray trace of an optical system according to Example 22 of the present invention.

As shown in FIG. 22, a decentered optical system 10 according to this example is the same as that shown in FIG. 14 except that the first reflecting surface R1 and the third reflecting surface R3 are the identical surface, and the second reflecting surface R2 and the fourth reflecting surface R4 are the identical surface.

EXAMPLE 23

Figure 23:
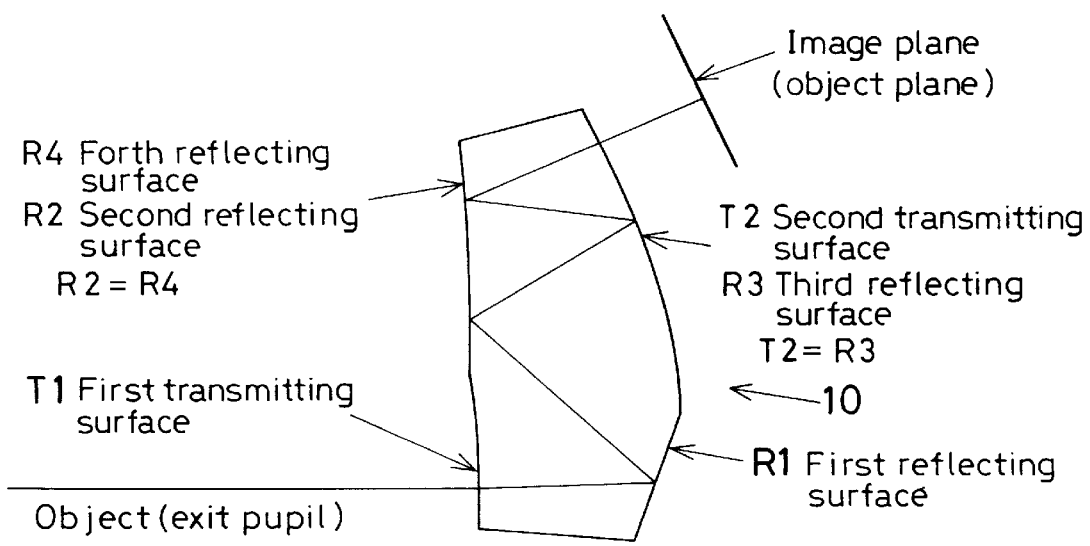
FIG. 23 illustrates an optical ray trace of an optical system according to Example 23 of the present invention.

As shown in FIG. 23, a decentered optical system 10 according to this example is the same as that shown in FIG. 14 except that the second reflecting surface R2 and the fourth reflecting surface R4 are the identical surface, and the second transmitting surface T2 and the third reflecting surface R3 are the identical surface.

EXAMPLE 24

Figure 24:
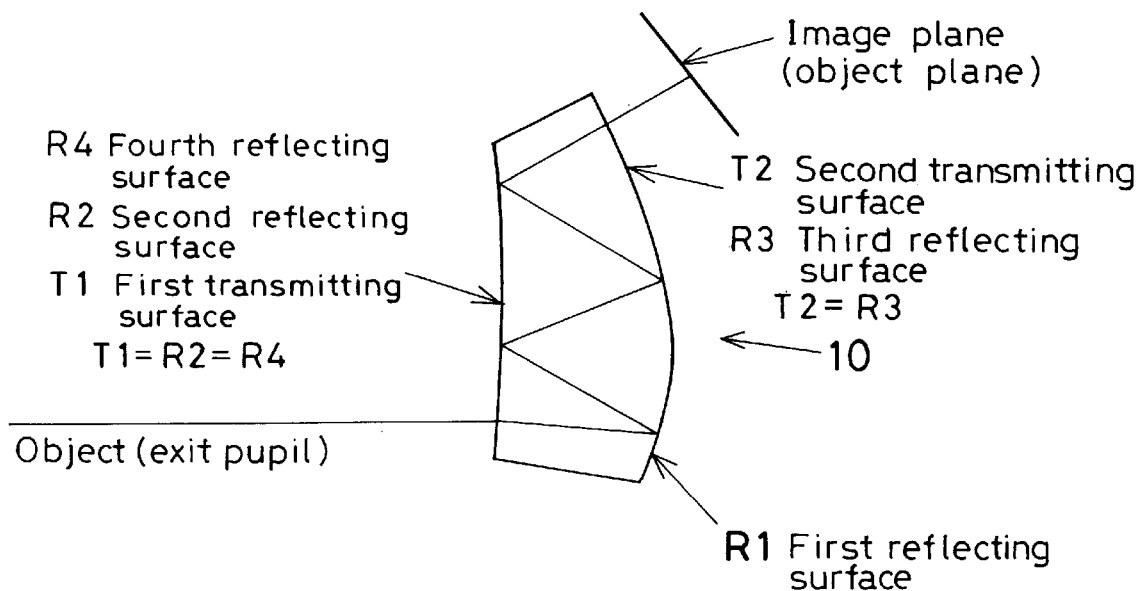
FIG. 24 illustrates an optical ray trace of an optical system according to Example 24 of the present invention.

As shown in FIG. 24, a decentered optical system 10 according to this example is the same as that shown in FIG. 14 except that the first transmitting surface T1, the second reflecting surface R2, and the fourth reflecting surface R4 are the identical surface, and the second transmitting surface T2 and the third reflecting surface R3 are the identical surface.

EXAMPLE 25

Figure 25:
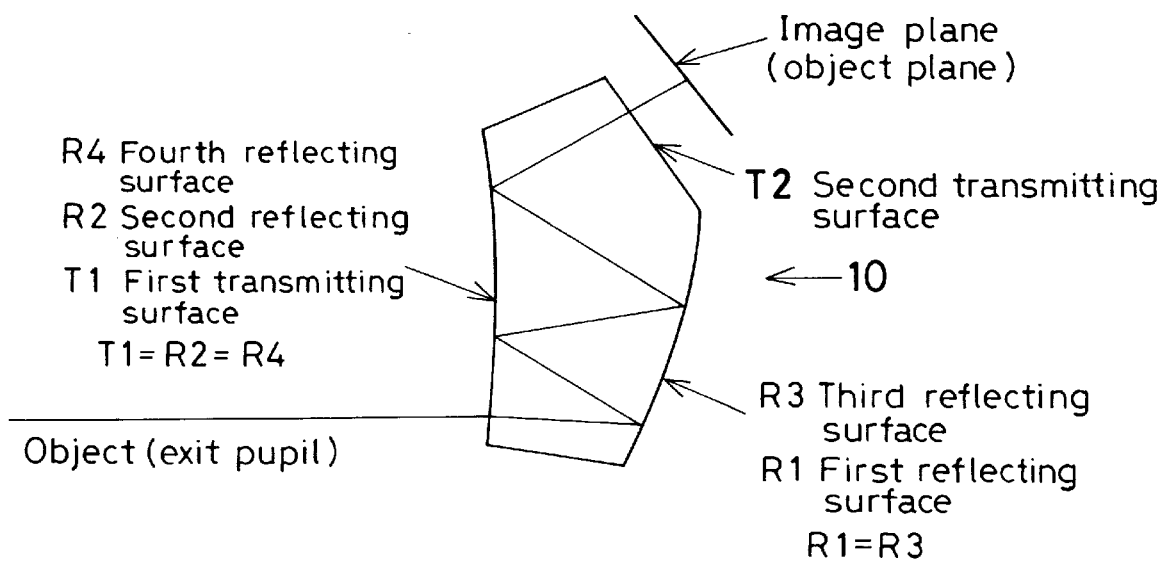
FIG. 25 illustrates an optical ray trace of an optical system according to Example 25 of the present invention.

As shown in FIG. 25, a decentered optical system 10 according to this example is the same as that shown in FIG. 14 except that the first transmitting surface T1, the second reflecting surface R2, and the fourth reflecting surface R4 are the identical surface, and the first reflecting surface R1 and the third reflecting surface R3 are the identical surface.

EXAMPLE 26

Figure 26:
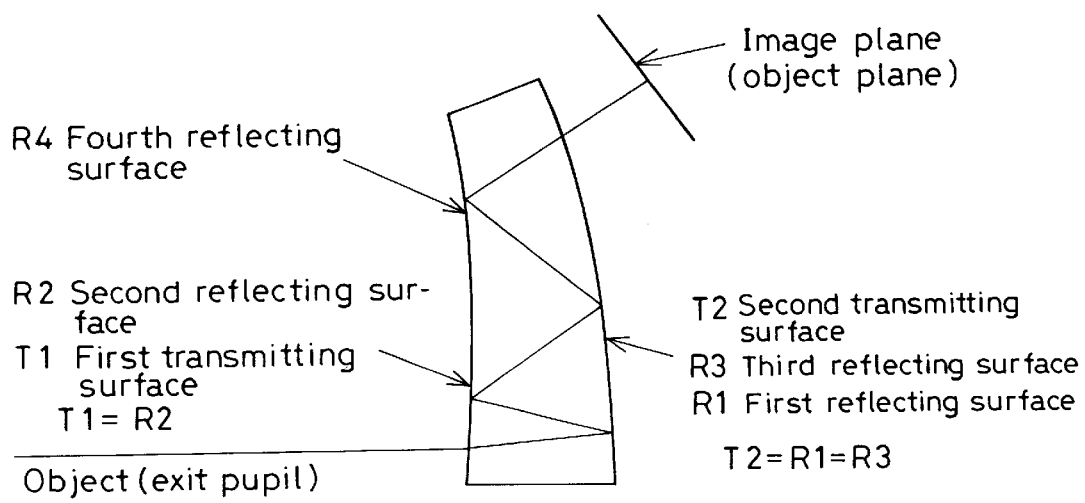
FIG. 26 illustrates an optical ray trace of an optical system according to Example 26 of the present invention.

As shown in FIG. 26, a decentered optical system 10 according to this example is the same as that shown in FIG. 14 except that the first transmitting surface T1 and the second reflecting surface R2 are the identical surface, and the second transmitting surface T2, the first reflecting surface R1 and the third reflecting surface R3 are the identical surface.

EXAMPLE 27

Figure 27:
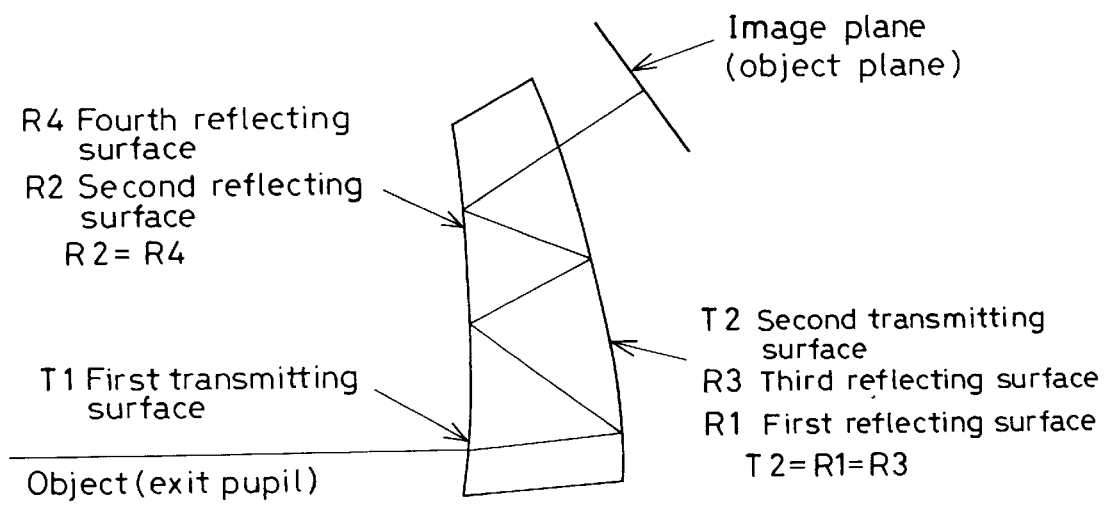
FIG. 27 illustrates an optical ray trace of an optical system according to Example 27 of the present invention.

As shown in FIG. 27, a decentered optical system 10 according to this example is the same as that shown in FIG. 14 except that the second reflecting surface R2 and the fourth reflecting surface R4 are the identical surface, and the second transmitting surface T2, the first reflecting surface R1, and the third reflecting surface R3 are the identical surface.

EXAMPLE 28

Figure 28:
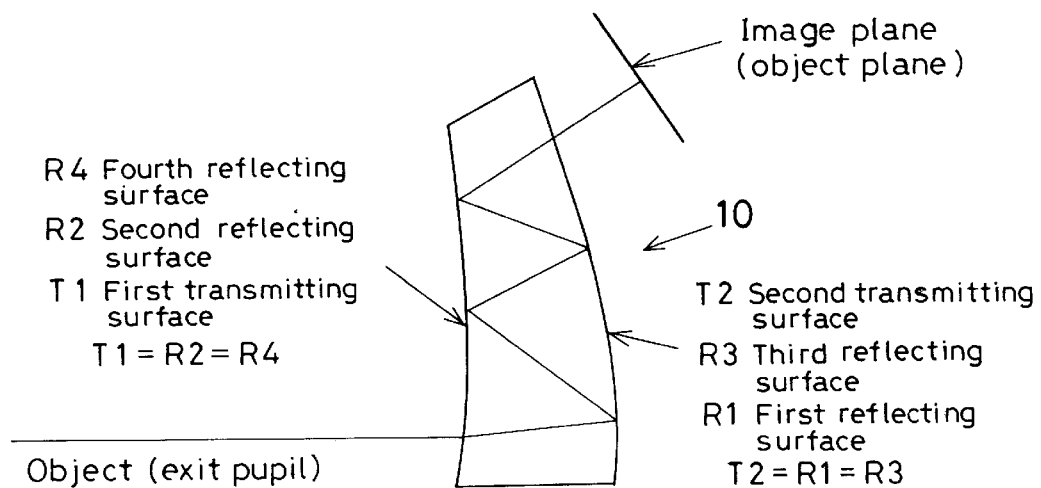
FIG. 28 illustrates an optical ray trace of an optical system according to Example 28 of the present invention.

As shown in FIG. 28, a decentered optical system 10 according to this example is the same as that shown in FIG. 14 except that the first transmitting surface T1, the second reflecting surface R2, and the fourth reflecting surface R4 are the identical surface, and the second transmitting surface T2, the first reflecting surface R1, and the third reflecting surface R3 are the identical surface.

EXAMPLE 29

Figure 29:
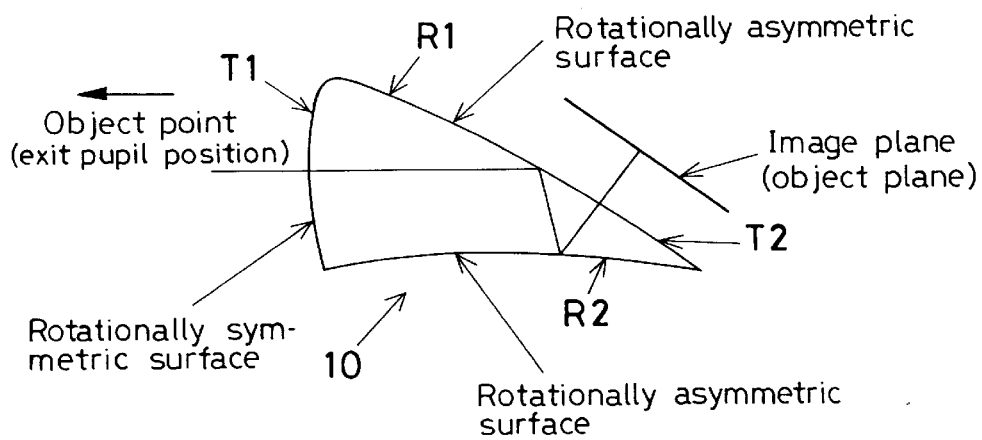
FIG. 29 is a diagram for describing a machining method for forming an optical system according to Example 29 of the present invention.

This example relates to a machining method usable in a case where a decentered optical system according to the present invention consists essentially of a rotationally asymmetric surface and a rotationally symmetric surface. As shown in FIG. 29, a decentered optical system according to this example comprises, in order in which incident light rays from an object pass, a first transmitting surface T1, a first reflecting surface R1, a second reflecting surface R2, and a second transmitting surface T2. The light rays enter the optical system through the first transmitting surface T1 and are reflected successively by the first reflecting surface R1 and the second reflecting surface R2. The reflected light rays exit from the optical system through the second transmitting surface T2 in a direction different from a direction in which the light rays are incident on the first transmitting surface T1 to reach an image plane. The second transmitting surface T2 and the first reflecting surface R1 are the identical surface. In a case where the first transmitting surface T1 is a rotationally symmetric surface, and the first reflecting surface R1 and the second reflecting surface R2 are rotationally asymmetric surfaces, first the rotationally asymmetric surfaces R1 and R2 are machined, and thereafter, the rotationally symmetric surface T1 is machined. Such a machining sequence facilitates positioning of each surface, and the manufacturing accuracy improves.

EXAMPLE 30

Figure 30:
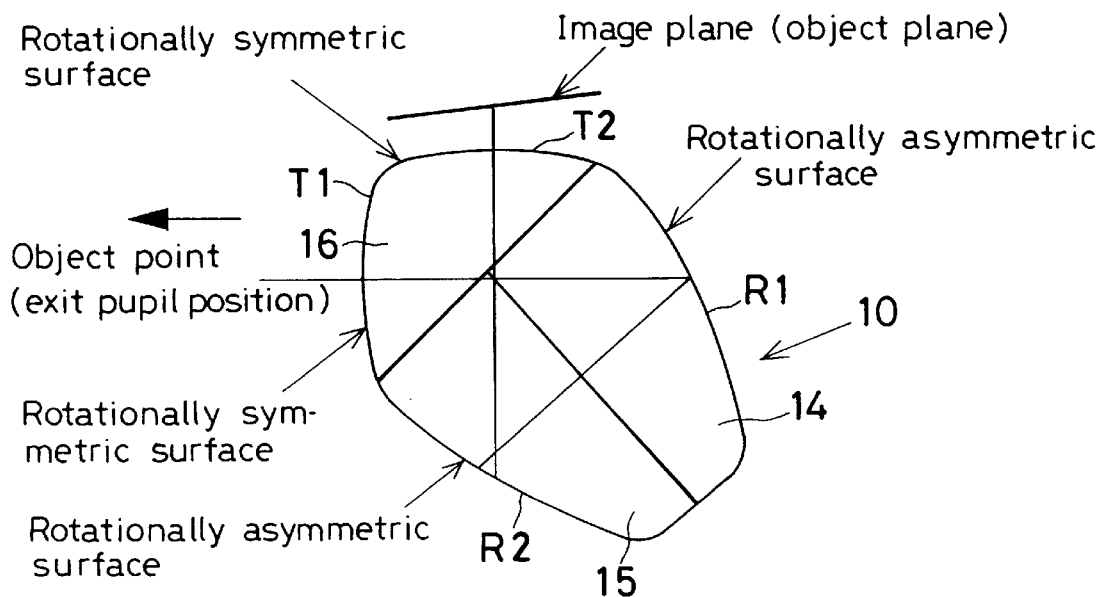
FIG. 30 is a diagram for describing a method of producing an optical system according to Example 30 of the present invention.

This example relates to a method of producing a decentered optical system according to the present invention in such a manner that the decentered optical system is divided into portions including a rotationally asymmetric surface and some other portions, and that each portion is first machined, and thereafter, the machined portions are cemented together to form a decentered optical system. As shown in FIG. 30, the decentered optical system comprises a first transmitting surface T1, a first reflecting surface R1, a second reflecting surface R2, and a second transmitting surface T2 as in the case of FIG. 10. Light rays enter the optical system through the first transmitting surface T1 and are reflected successively by the first reflecting surface R1 and the second reflecting surface R2. The reflected light rays exit from the optical system through the second transmitting surface T2 in a direction different from a direction in which the light rays are incident on the first transmitting surface T1 to reach an image plane. In a case where the first transmitting surface T1 is a rotationally symmetric surface, while the first reflecting surface R1 and the second reflecting surface R2 are rotationally asymmetric surfaces, and the second transmitting surface T2 is a rotationally symmetric surface, the optical system is divided into a first portion 14 including the first reflecting surface R1, a second portion 15 including the second reflecting surface R2, and a third portion 16 including both the first transmitting surface T1 and the second transmitting surface T2. After surfaces of each portion have been machined, the three portions 14, 15 and 16 are cemented together to produce the decentered optical system 10. With such a production method, rotationally asymmetric surfaces are formed by machining plane thin members. Accordingly, it is possible to avoid degradation of the machining accuracy due to distortion or the like of components during machining. It should be noted that in a case where a rotationally asymmetric surface is produced by injection molding, the optical component is preferably as thin as possible. The thinner the optical component, the further the distortion of the resin after the injection molding can be reduced.

EXAMPLE 31

Figure 31:
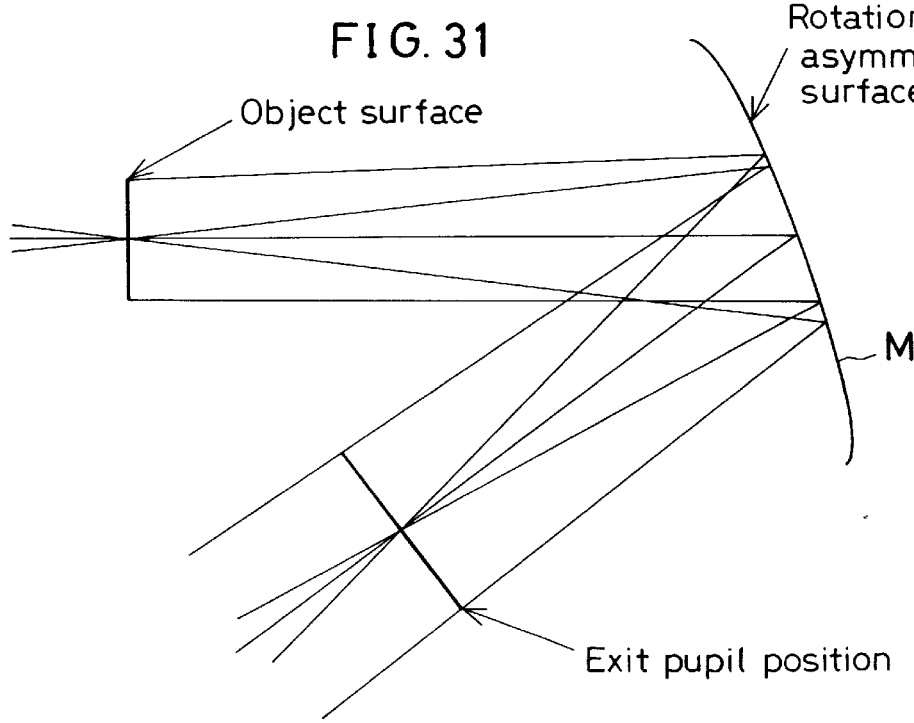
FIG. 31 illustrates an optical ray trace of Example 31 in which an optical system according to the present invention is used in an ocular optical system.

As shown in FIG. 31, this example relates to an ocular optical system having a folded optical path including a reflecting surface M, wherein the reflecting surface M is formed from a rotationally asymmetric surface so as to have power. By doing so, it is possible to omit a transmission lens in the ocular optical system. Moreover, the folded optical path enables the ocular optical system to be constructed in a compact form. It should be noted that an inversion prism in an ocular optical system can also be given power by the same way as the above.

Figure 32:
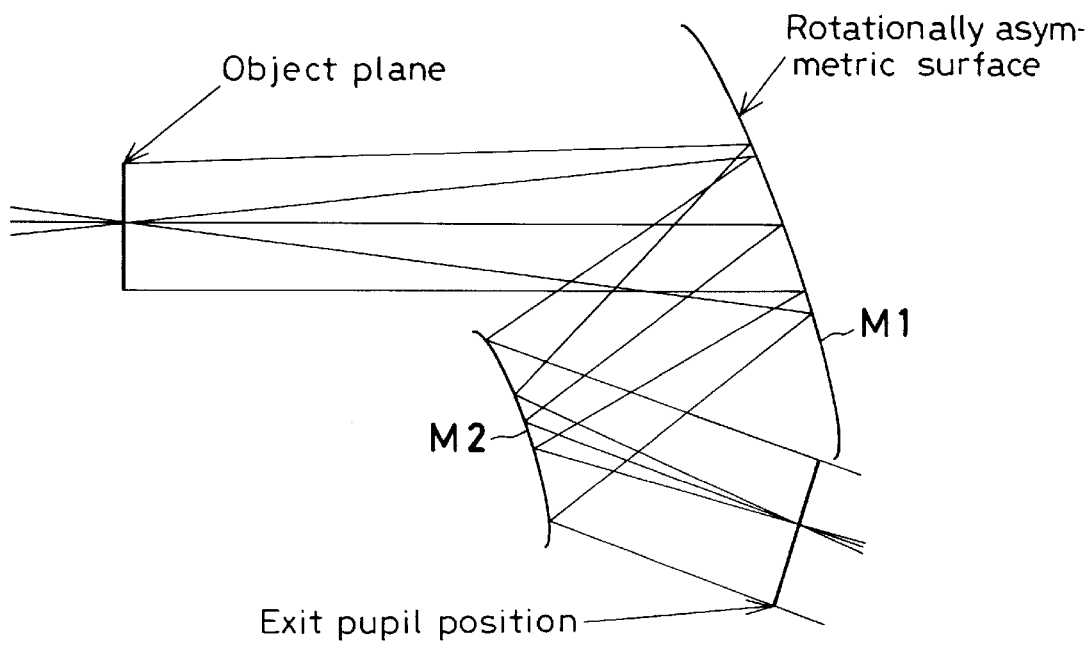
FIG. 32 illustrates an optical ray trace of an arrangement in which another optical system according to the present invention is used in Example 31.

Similarly, as shown in FIG. 32, in the case of an ocular optical system having a folded optical path including two reflecting surfaces M1 and M2, at least one reflecting surface M1 can be formed from a rotationally asymmetric surface so as to have power.

EXAMPLE 32

Figure 33:
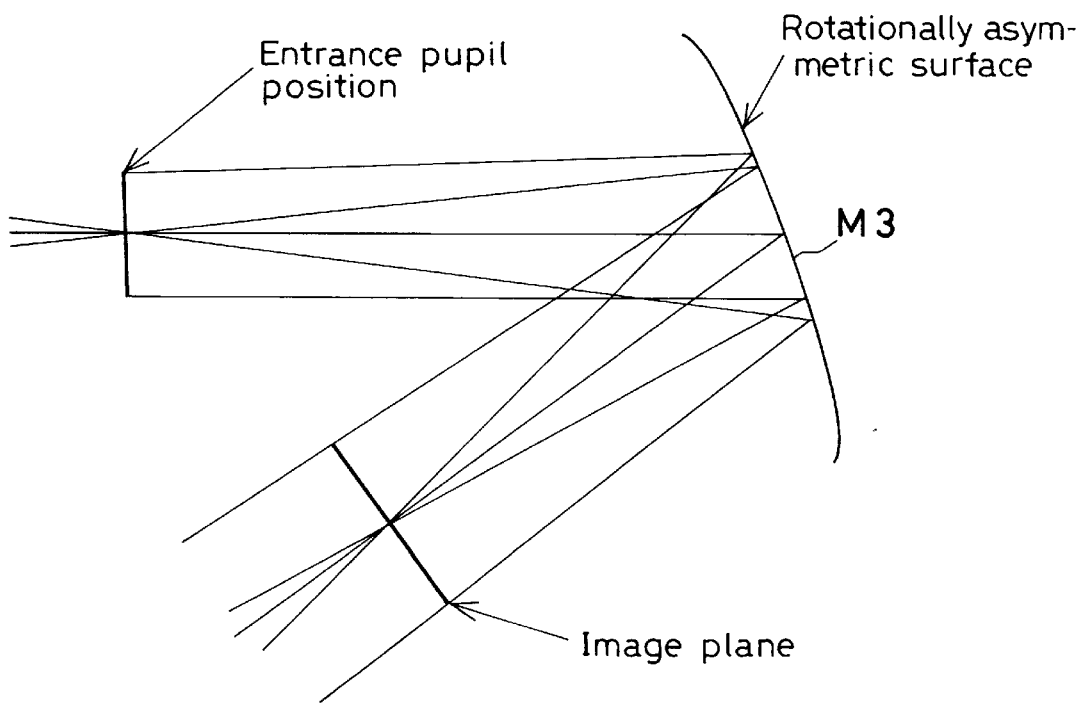
FIG. 33 illustrates an optical ray trace of Example 32 in which an optical system according to the present invention is used in an image-forming optical system.

As shown in FIG. 33, this example relates to an image-forming optical system having a folded optical path including a reflecting surface M3, wherein the reflecting surface M3 is formed from a rotationally asymmetric surface so as to have power. By doing so, it is possible to omit a transmission lens in the image-forming optical system. Moreover, the folded optical path enables the image-forming optical system to be constructed in a compact form. It should be noted that an inversion prism in an image-forming optical system can also be given power by the same way as the above.

Figure 34:
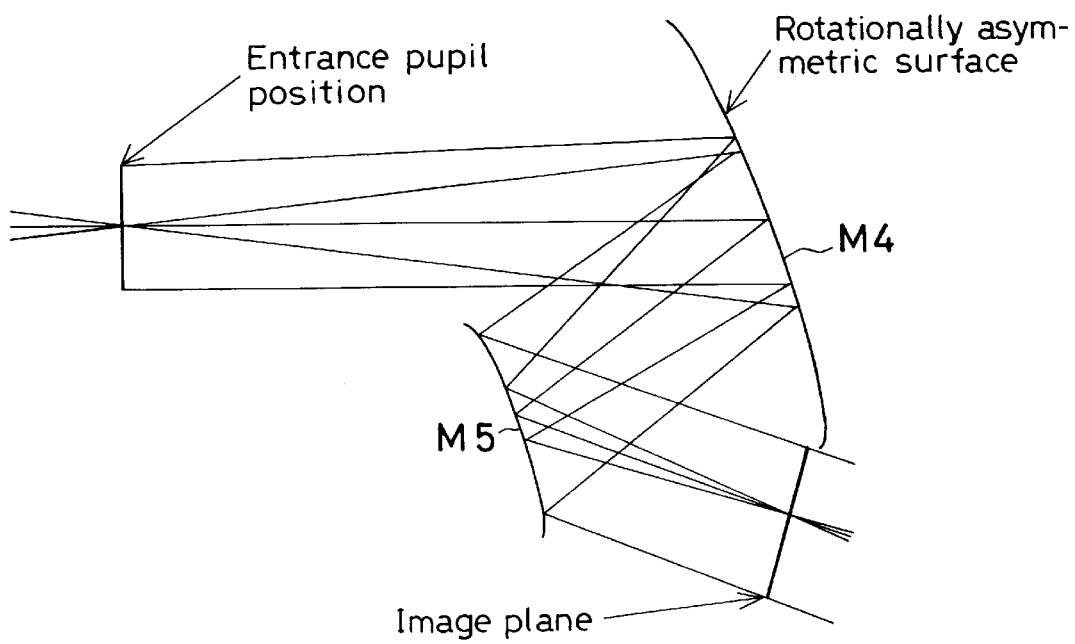
FIG. 34 illustrates an optical ray trace of an arrangement in which another optical system according to the present invention is used in Example 32.

Similarly, as shown in FIG. 34, in the case of an image-forming optical system having a folded optical path including two reflecting surfaces M4 and M5, at least one reflecting surface M4 can be formed from a rotationally asymmetric surface so as to have power.

EXAMPLE 33

Figure 35:
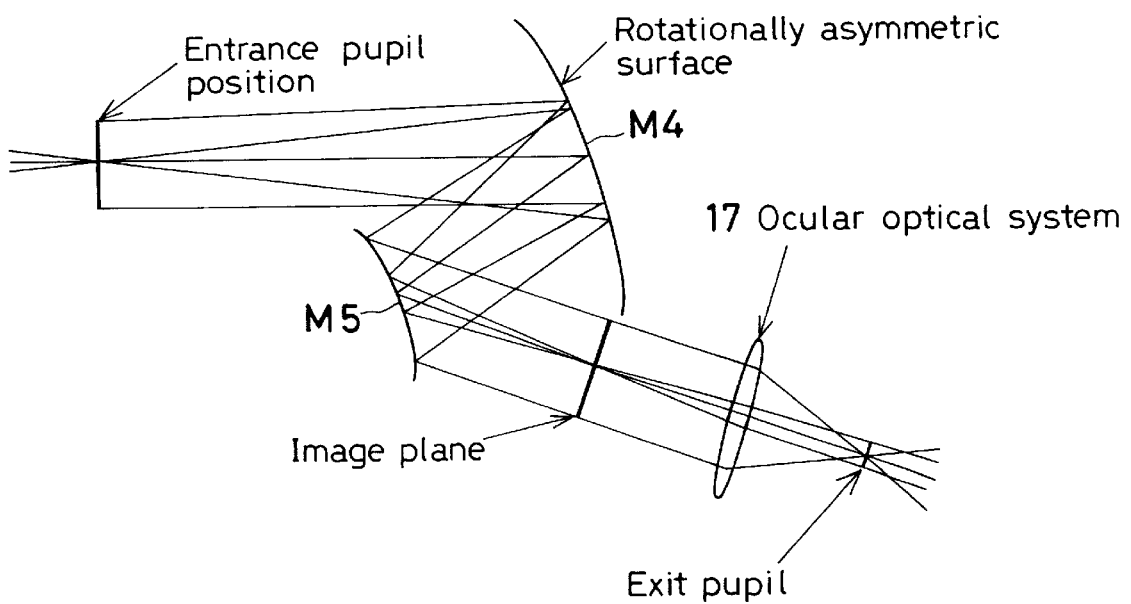
FIG. 35 illustrates an optical ray trace of Example 33 in which an optical system according to the present invention is used in an afocal optical system.

In this example, as shown in FIG. 35, an image-forming optical system such as that shown in FIG. 34 is used as an objective optical system, and this is combined with an ocular optical system 17 consisting essentially of an ordinary transmission lens to form an afocal optical system for a telescope, a real-image finder, etc. If an objective optical system is formed by giving power to a prism optical system for obtaining an inverted image, for example, it is possible to construct a compact optical system. If an objective lens of a real-image finder for a camera is constructed of an optical system in which a rotationally asymmetric surface is used in an inversion prism, it is possible to obtain a compact camera finder having a simple structure. It should be noted that an erect image can be obtained by an even number of reflections, as shown in FIG. 35.

EXAMPLE 34

Figure 36:
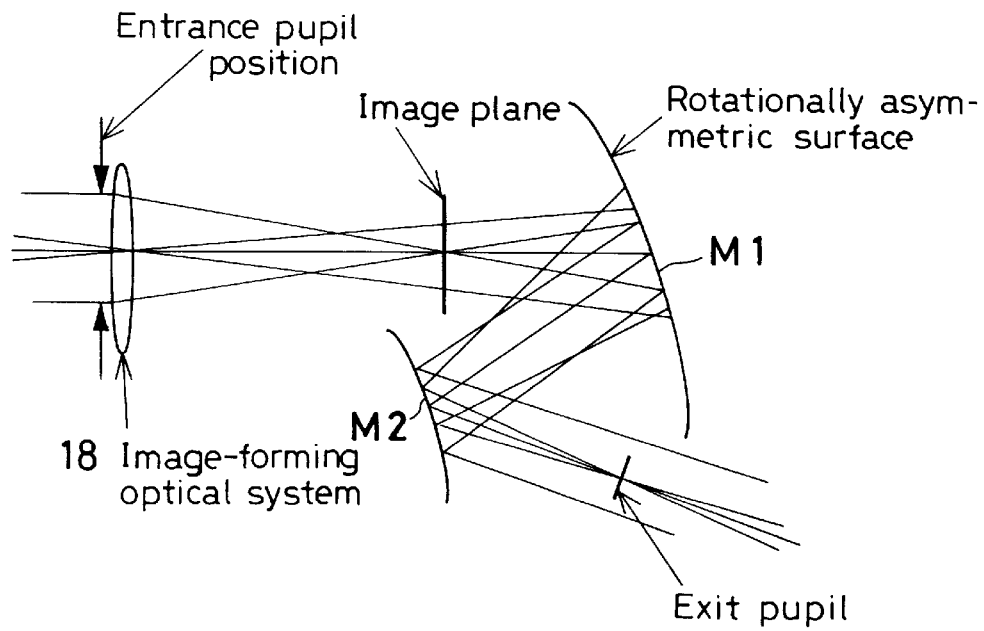
FIG. 36 illustrates an optical ray trace of Example 34 in which another optical system according to the present invention is used in an afocal optical system.

In this example, as shown in FIG. 36, an ocular optical system such as that shown in FIG. 32 is combined with an image-forming optical system 18 consisting essentially of an ordinary transmission lens, which is used as an objective optical system, to form an afocal optical system for a telescope, a real-image finder, etc. Thus, it becomes possible to reduce the size of an afocal optical system of short focal length in particular, which is complicated in arrangement, to thereby obtain a compact optical system. The effect of reducing the size is particularly remarkable in an ocular optical system having a focal length of 100 millimeters or less. It should be noted that an erect image can be obtained by even number of reflections, as shown in FIG. 36.

EXAMPLE 35

Figure 37:
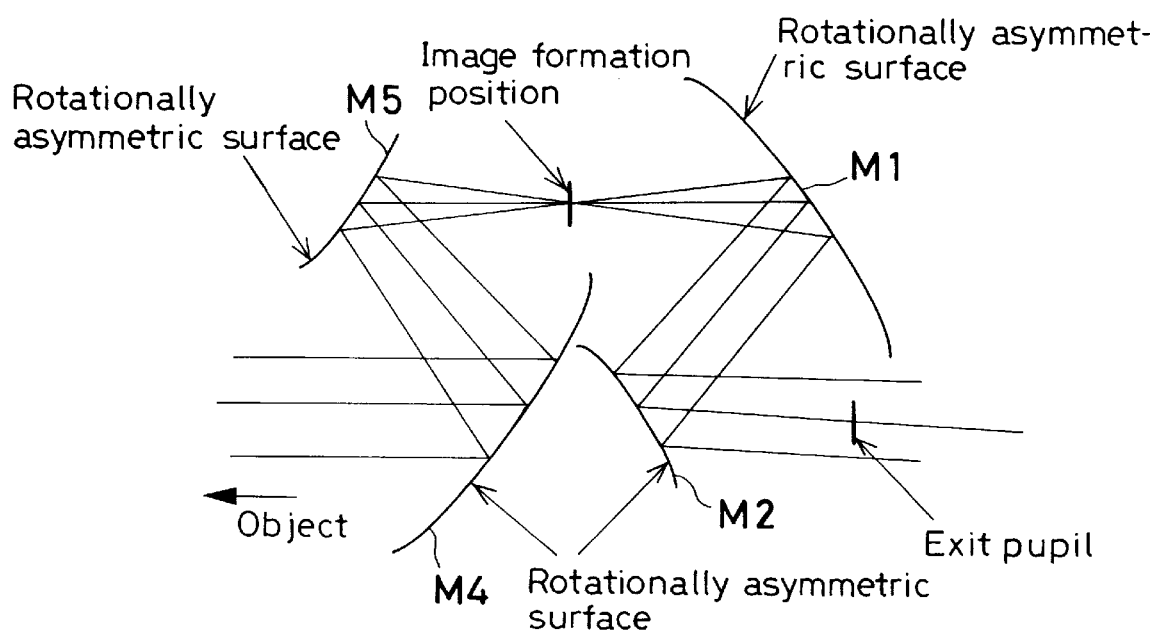
FIG. 37 illustrates an optical ray trace of Example 35 in which still another optical system according to the present invention is used in an afocal optical system.

In this example, as shown in FIG. 37, an image-forming optical system such as that shown in FIG. 34 is used as an objective optical system, and this is combined with an ocular optical system such as that shown in FIG. 32 to form an afocal optical system for a telescope, a real-image finder, etc. The combination makes it possible to achieve a further reduction in the size of the afocal optical system. It should be noted that if a rotationally asymmetric surface is used in an inversion prism, and thus the prism optical system is given power, it is possible to simplify the structure of an objective lens or an ocular lens or to omit it. In this case also, the afocal optical system may be arranged to obtain an erect image by an even number of reflections.

The following is a description of examples of optical systems for various optical apparatuses which use decentered optical systems having at least one rotationally asymmetric surface that satisfies at least one of the conditions (1-1) to (3-3) according to the present invention.

EXAMPLE 36

Figure 38:
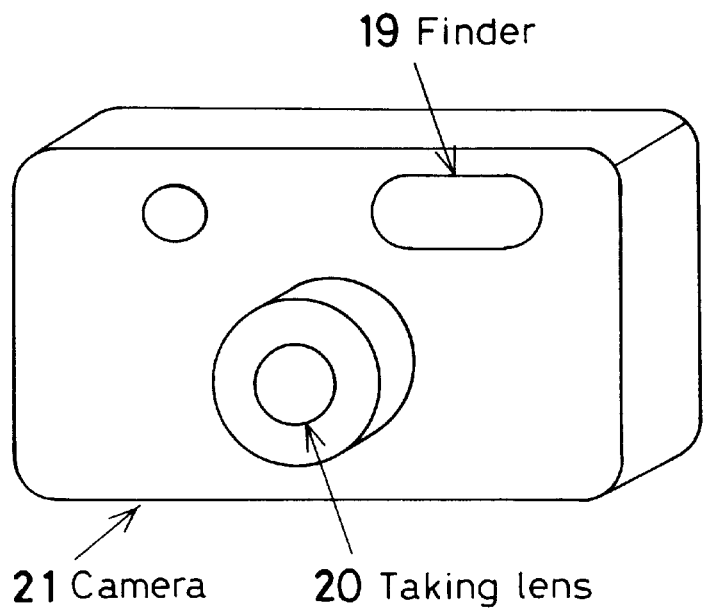
FIG. 38 is a perspective view schematically showing the arrangement of a camera.
Figure 39:
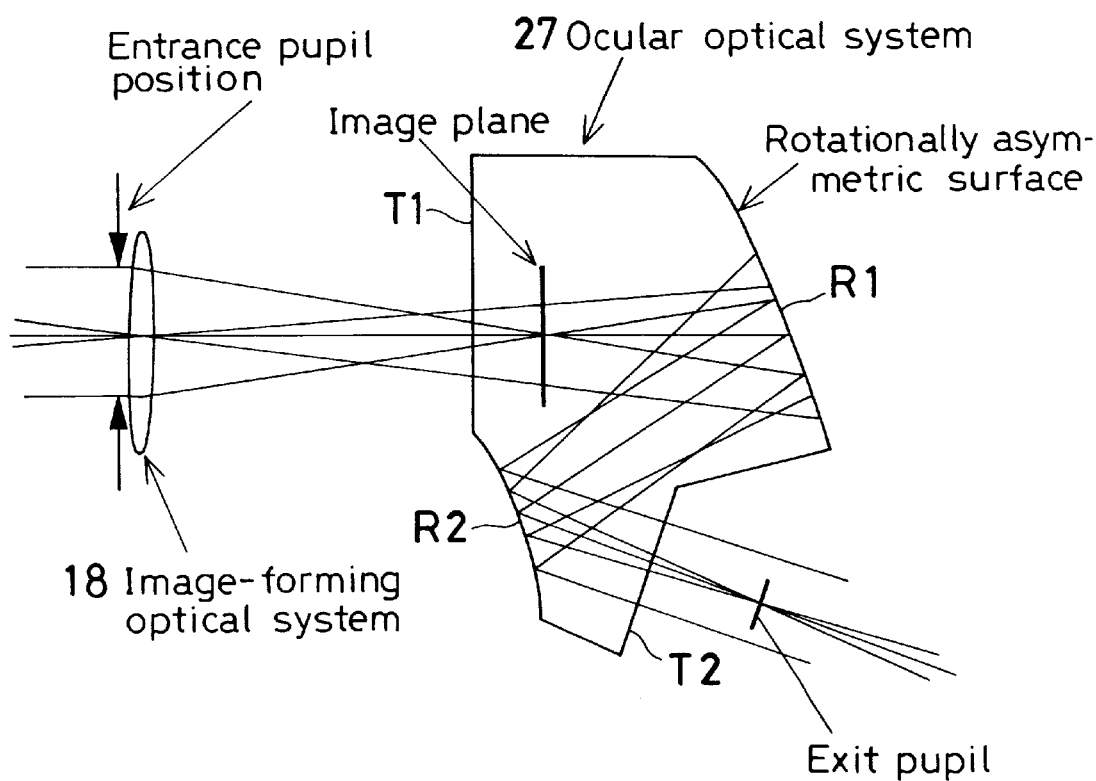
FIG. 39 illustrates an optical ray trace of Example 36 in which an optical system according to the present invention is used in an ocular optical system of a finder for a camera.

In this example, as shown in the perspective view of FIG. 38, a decentered optical system according to the present invention is used as an ocular optical system of a finder 19 in a camera 21 comprising a finder 19, a taking lens 20, and an imaging device (not shown) such as a photographic film or a CCD. As shown in FIG. 39, the finder according to this example uses as an objective optical system an image-forming optical system 18 consisting essentially of an ordinary transmission lens, and further uses as an ocular optical system 27 a decentered optical system according to the present invention which comprises a first transmitting surface T1, a first reflecting surface R1, a second reflecting surface R2, and a second transmitting surface T2, wherein the first reflecting surface R1 is a rotationally asymmetric surface. In this example, an image plane formed by the image-forming optical system 18 lies between the first transmitting surface T1 and first reflecting surface R1 of the ocular optical system 27.

EXAMPLE 37

Figure 40:
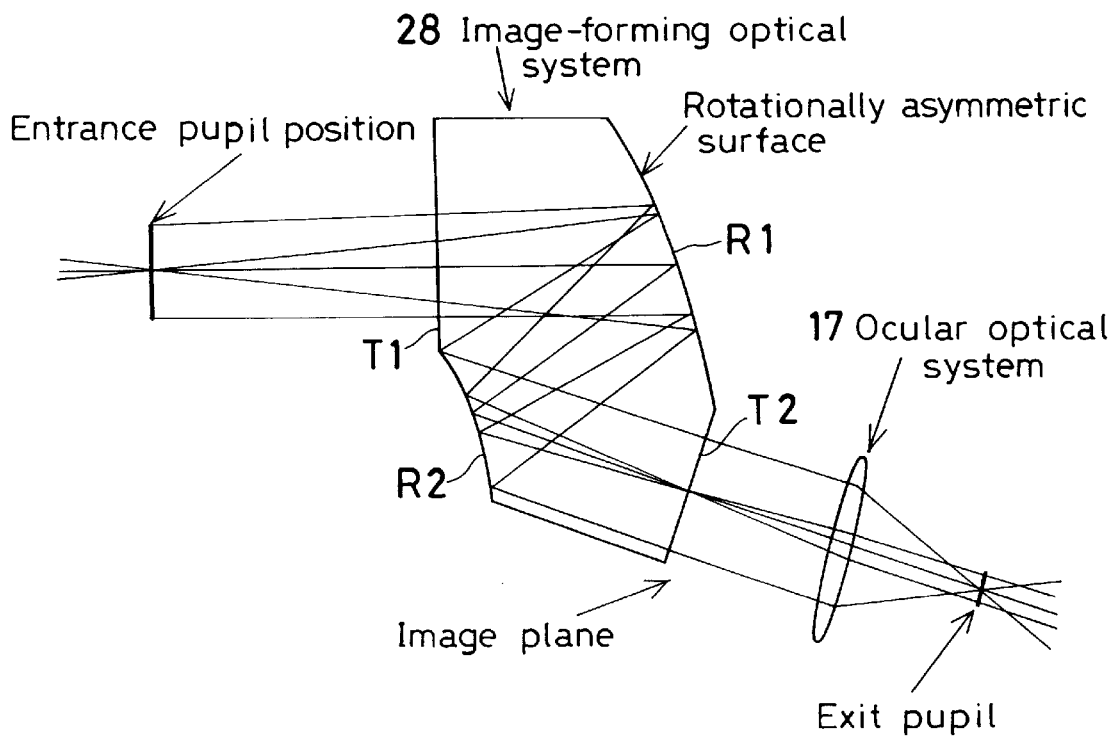
FIG. 40 illustrates an optical ray trace of Example 37 in which an optical system according to the present invention is used in an objective optical system of a finder for a camera.

In this example, a decentered optical system according to the present invention is used as the objective optical system of the finder 19 in the camera 21 shown in FIG. 38. As shown in FIG. 40, the finder according to this example uses as an objective (image-forming) optical system 28 a decentered optical system according to the present invention which comprises a first transmitting surface T1, a first reflecting surface R1, a second reflecting surface R2, and a second transmitting surface T2, wherein the first reflecting surface R1 is a rotationally asymmetric surface. The finder further uses an ordinary transmission lens as an ocular optical system 17. In this example, an image plane formed by the image-forming optical system 28 is coincident with the second transmitting surface T2.

EXAMPLE 38

Figure 41:
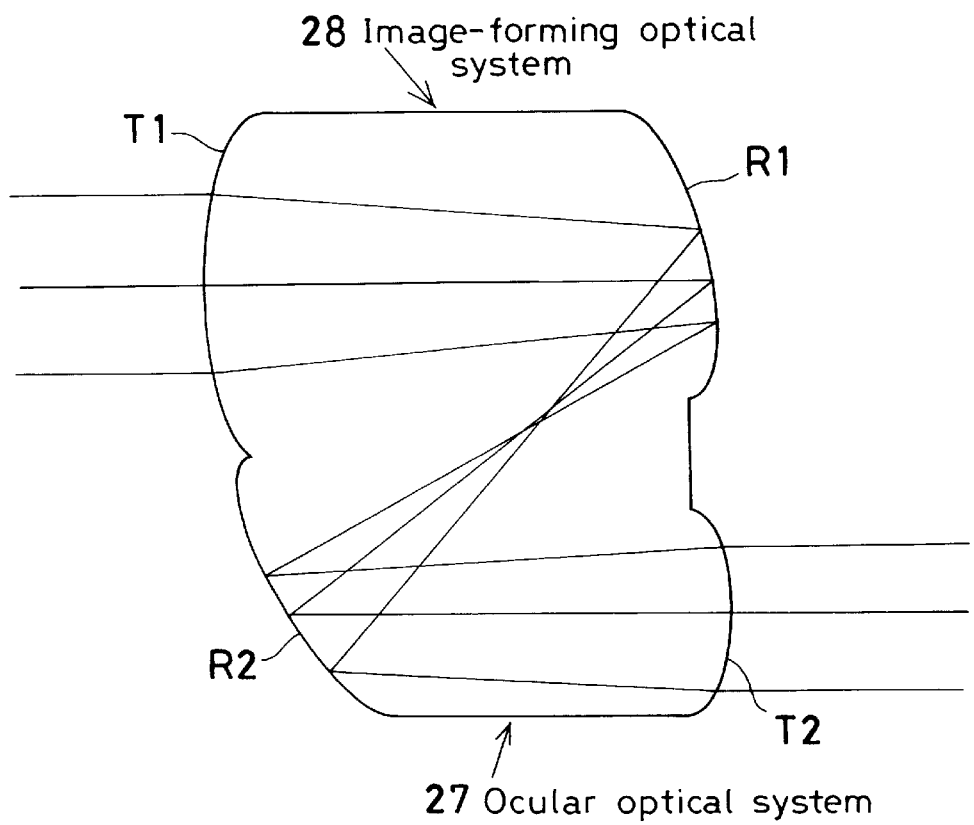
FIG. 41 illustrates an optical ray trace of Example 38 in which an optical system according to the present invention is used for the whole of an optical system of a finder for a camera.

In this example, a decentered optical system according to the present invention is used as the whole of the optical system of the finder 19 in the camera 21 shown in FIG. 38. As shown in FIG. 41, the finder according to this example has an objective (image-forming) optical system 28 and an ocular optical system 27, which are integrally formed from a transparent member. The finder comprises a first transmitting surface T1, a first reflecting surface R1, a second reflecting surface R2, and a second transmitting surface T2. The first transmitting surface T1 and the first reflecting surface R1 constitute the image-forming optical system 28, and the second reflecting surface R2 and the second transmitting surface T2 constitute the ocular optical system 27. At least one of the four surfaces T1, R1, R2 and T2 is formed from a rotationally asymmetric surface.

EXAMPLE 39

Figure 42:
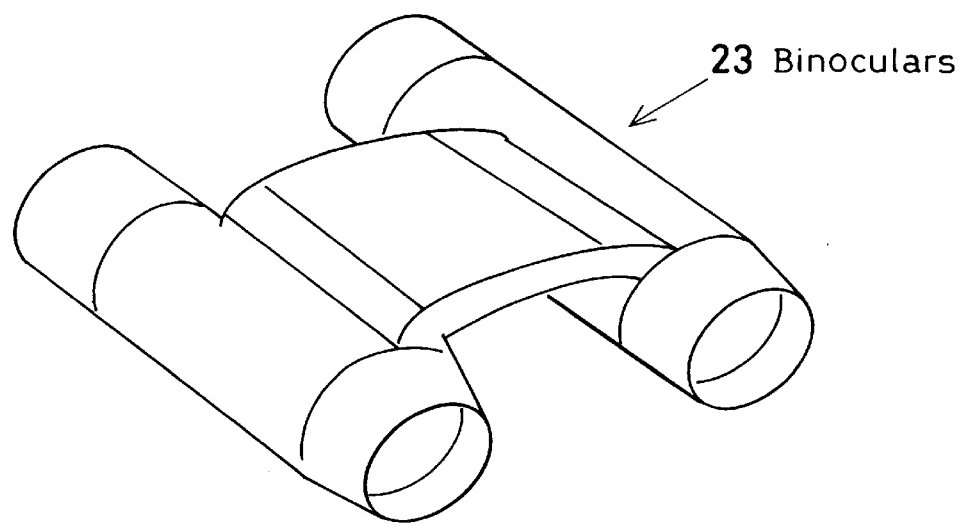
FIG. 42 is a perspective view of binoculars.
Figure 43:
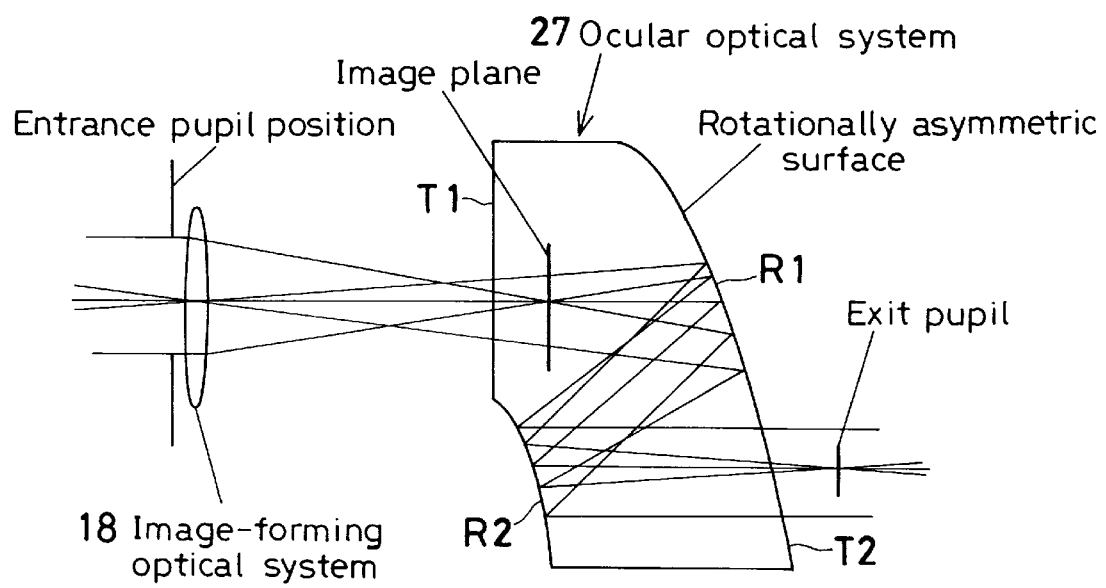
FIG. 43 illustrates an optical ray trace of Example 39 in which an optical system according to the present invention is used in an ocular optical system of binoculars.

In this example, a decentered optical system according to the present invention is used as an ocular optical system of an optical system for each eye, which is provided in binoculars 23 such as that shown in the perspective view of FIG. 42. As shown in FIG. 43, the binocular optical system according to this example uses as an objective optical system an image-forming optical system 18 consisting essentially of an ordinary transmission lens. The binocular optical system further uses as an ocular optical system 27 a decentered optical system according to the present invention which comprises a first transmitting surface T1, a first reflecting surface R1, a second reflecting surface R2, and a second transmitting surface T2, wherein the first reflecting surface R1 and the second transmitting surface T2 are the identical surface, and the first reflecting surface R1 is a rotationally asymmetric surface. In this example, an image plane formed by the image-forming optical system 18 lies between the first transmitting surface T1 and first reflecting surface R1 of the ocular optical system 27.

EXAMPLE 40

Figure 44:
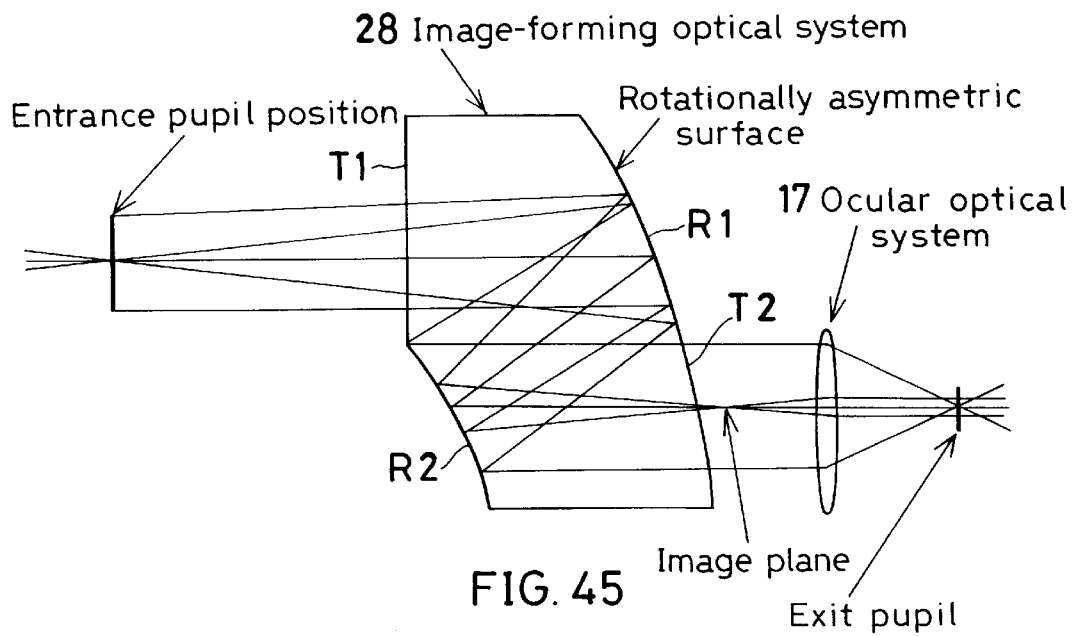
FIG. 44 illustrates an optical ray trace of Example 40 in which an optical system according to the present invention is used in an objective optical system of binoculars.

In this example, a decentered optical system according to the present invention is used as an objective optical system of an optical system for each eye, which is provided in the binoculars 23 shown in FIG. 42. As shown in FIG. 44, the binocular optical system according to this example uses as an objective (image-forming) optical system 28 a decentered optical system according to the present invention which comprises a first transmitting surface T1, a first reflecting surface R1, a second reflecting surface R2, and a second transmitting surface T2, wherein the first reflecting surface R1 and the second transmitting surface T2 are the identical surface, and the first reflecting surface R1 is a rotationally asymmetric surface. The binocular optical system further uses an ocular optical system 17 consisting essentially of an ordinary transmission lens. In this example, an image plane formed by the image-forming optical system 28 is approximately coincident with the second transmitting surface T2.

EXAMPLE 41

Figure 45:
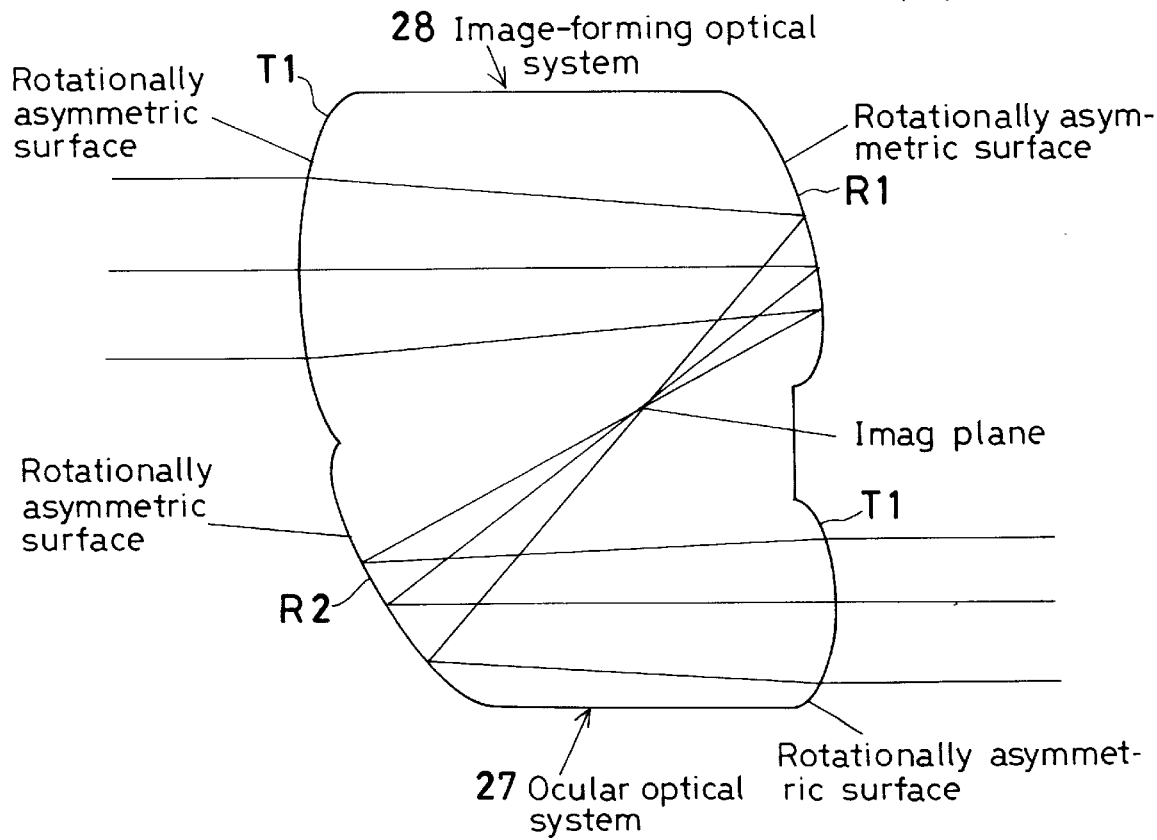
FIG. 45 illustrates an optical ray trace of Example 41 in which an optical system according to the present invention is used for the whole of an optical system of binoculars.

In this example, a decentered optical system according to the present invention is used as the whole of an optical system for each eye, which is provided in the binoculars 23 shown in FIG. 42. As shown in FIG. 45, the optical system for a single eye according to this example has an objective (image-forming) optical system 28 and an ocular optical system 27, which are integrally formed from a transparent member. The optical system comprises a first transmitting surface T1, a first reflecting surface R1, a second reflecting surface R2, and a second transmitting surface T2. The first transmitting surface T1 and the first reflecting surface R1 constitute the image-forming optical system 28, and the second reflecting surface R2 and the second transmitting surface T2 constitute the ocular optical system 27. All the four surfaces T1, R1, R2 and T2 are formed from rotationally asymmetric surfaces.

EXAMPLE 42

Figure 46:
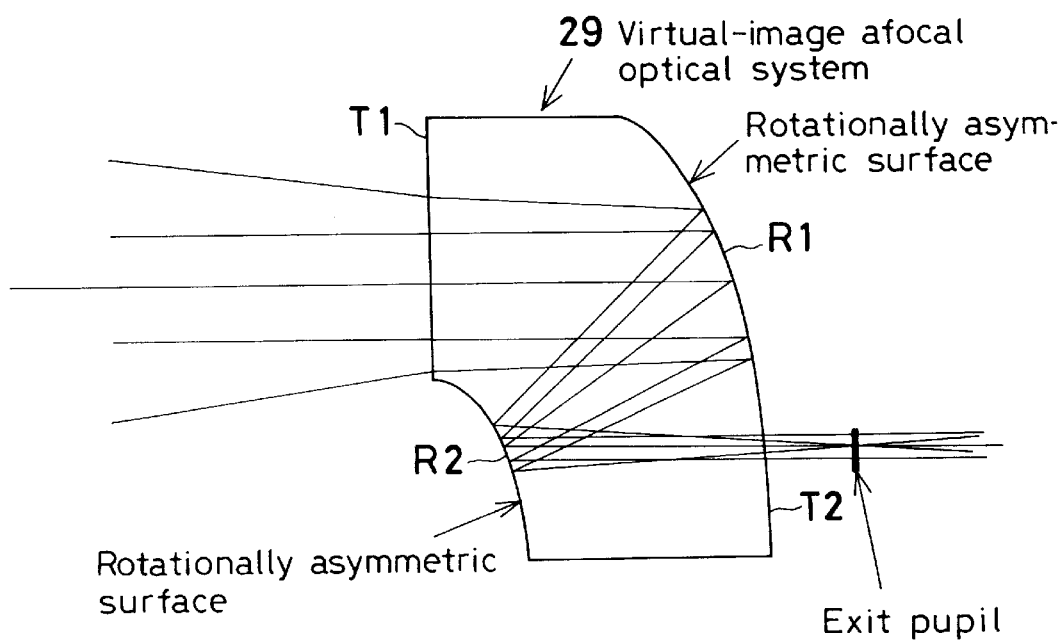
FIG. 46 illustrates an optical ray trace of Example 42 in which an optical system according to the present invention is used in an optical system of a virtual-image finder.

This example relates to a virtual-image finder having a virtual-image afocal optical system as a finder 19 of a camera 21 such as that shown in the perspective view of FIG. 38. As shown in FIG. 46, the finder optical system in this example is formed from a virtual-image afocal optical system 29 comprising a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces, and wherein the first reflecting surface R1 assumes to be a principal surface having a positive power, and the second reflecting surface R2 assumes to be a principal surface having a negative power.

EXAMPLE 43

Figure 47:
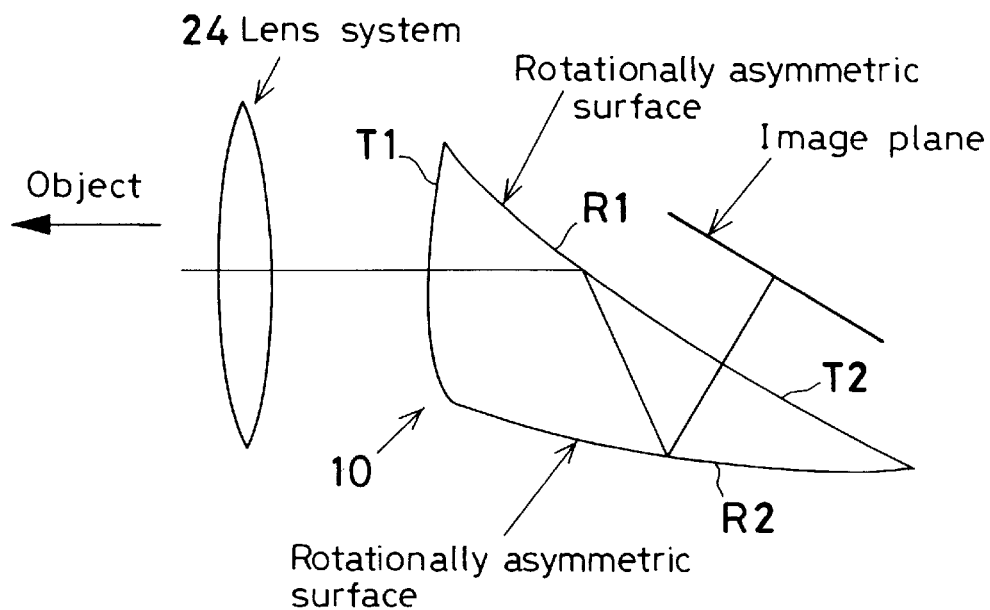
FIG. 47 illustrates an optical ray trace of Example 43 in which an optical system according to the present invention is used in a camera photographic optical system.

This example relates to a taking lens 20 of a camera 21 such as that shown in the perspective view of FIG. 38. As shown in FIG. 47, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes an ordinary lens system 24 disposed on the object side of the decentered optical system 10.

EXAMPLE 44

Figure 48:
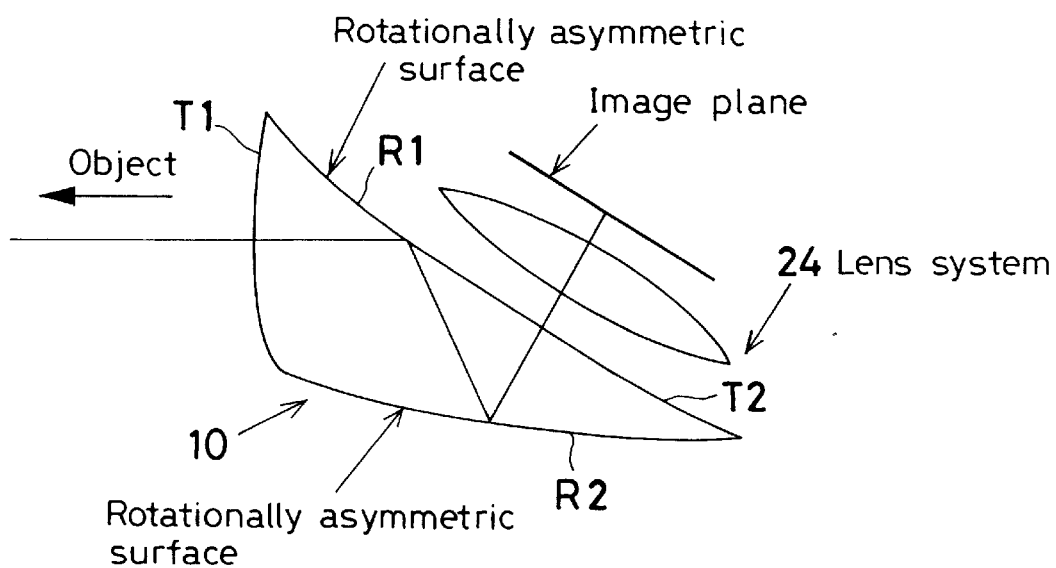
FIG. 48 illustrates an optical ray trace of Example 44 in which an optical system according to the present invention is used in a camera photographic optical system.

This example relates to a taking lens 20 of a camera 21 such as that shown in the perspective view of FIG. 38. As shown in FIG. 48, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes an ordinary lens system 24 disposed on the image side of the decentered optical system 10.

EXAMPLE 45

Figure 49:
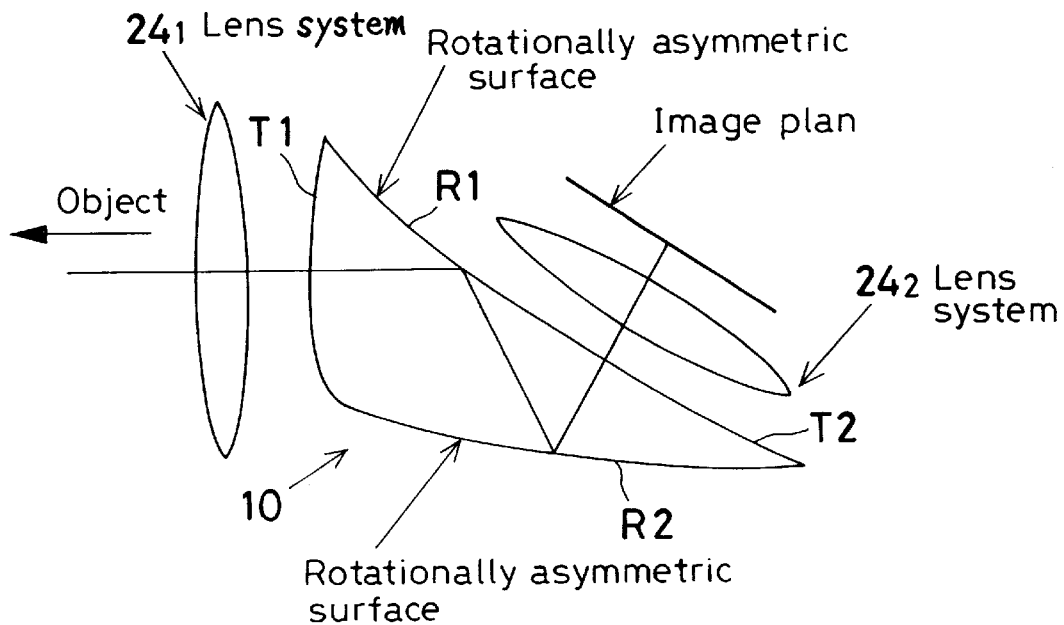
FIG. 49 illustrates an optical ray trace of Example 45 in which an optical system according to the present invention is used in a camera photographic optical system.

This example relates to a taking lens 20 of a camera 21 such as that shown in the perspective view of FIG. 38. As shown in FIG. 49, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes an ordinary lens system $24_1$ disposed on the object side of the decentered optical system 10, and an ordinary lens system $24_2$ disposed on the image side of the decentered optical system 10.

EXAMPLE 46

Figure 50:
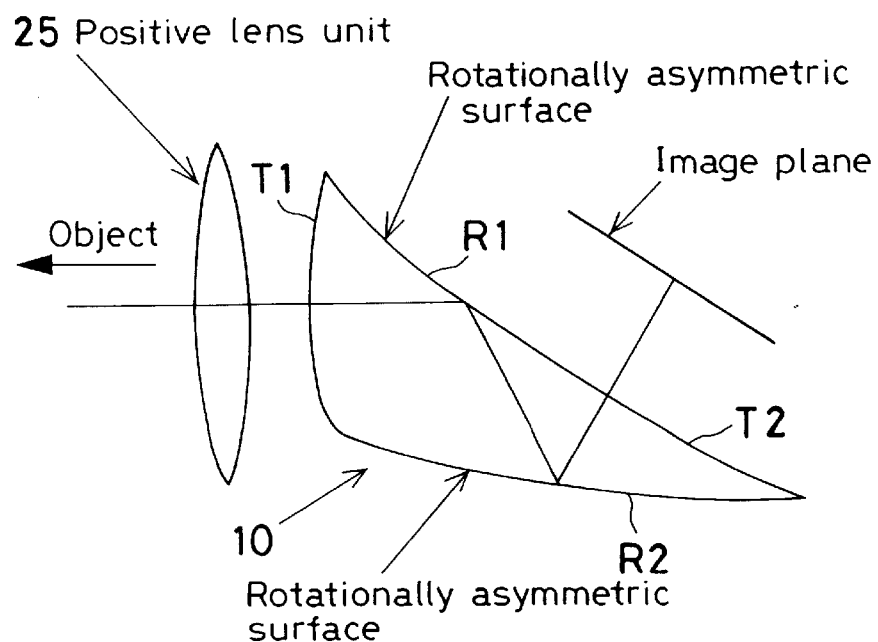
FIG. 50 illustrates an optical ray trace of Example 46 in which an optical system according to the present invention is used in a camera photographic optical system.

This example relates to a taking lens 20 of a camera 21 such as that shown in the perspective view of FIG. 38. As shown in FIG. 50, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes an ordinary positive lens unit 25 disposed on the object or image side (on the object side in the case of the illustrated example) of the decentered optical system 10.

EXAMPLE 47

Figure 51:
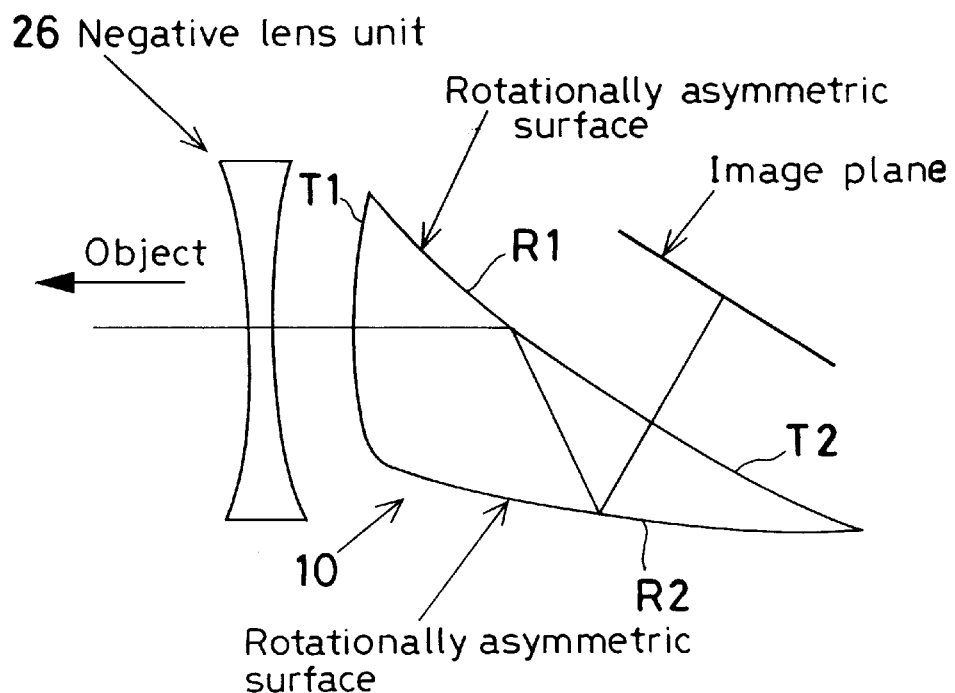
FIG. 51 illustrates an optical ray trace of Example 47 in which an optical system according to the present invention is used in a camera photographic optical system.

This example relates to a taking lens 20 of a camera 21 such as that shown in the perspective view of FIG. 38. As shown in FIG. 51, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes an ordinary negative lens unit 26 disposed on the object or image side (on the object side in the case of the illustrated example) of the decentered optical system 10.

EXAMPLE 48

Figure 52:
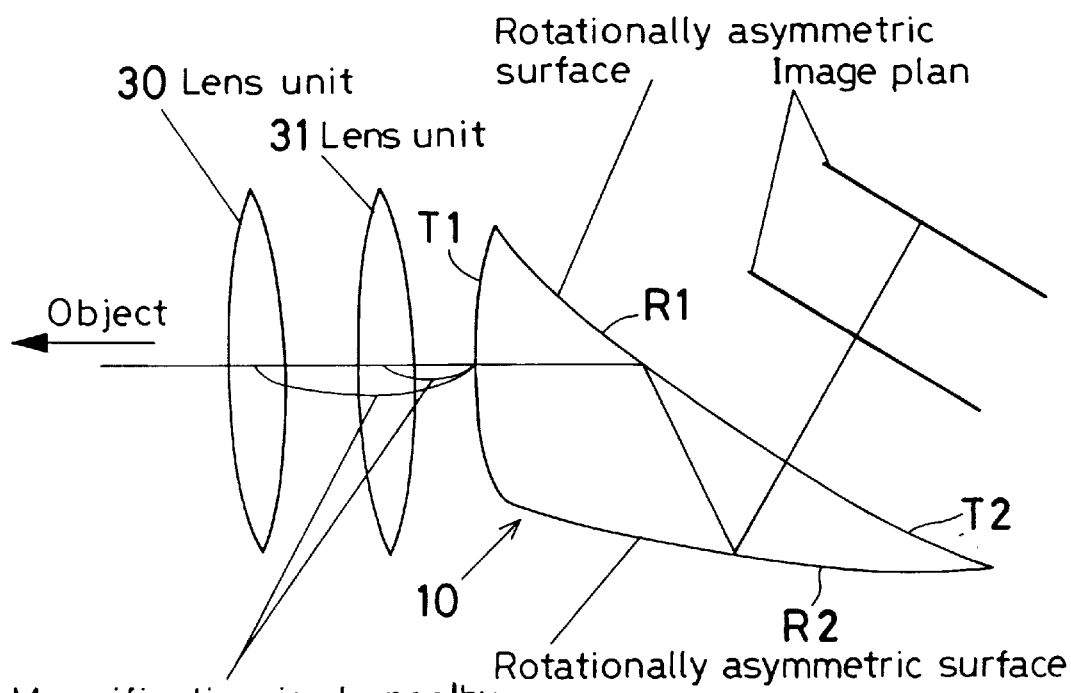
FIG. 52 illustrates an optical ray trace of Example 48 in which an optical system according to the present invention is used in a camera photographic optical system.

This example relates to a taking lens 20 of a camera 21 such as that shown in the perspective view of FIG. 38. As shown in FIG. 52, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes two or more lens units 30 and 31 (two in the case of the illustrated example) disposed on either or both of the object and image sides (on the object side in the case of the illustrated example) of the decentered optical system 10. With this arrangement, the magnification is changed by varying the spacing between the lens units 30 and 31 and the spacing between the lens units 30 and 31 on the one hand and the decentered optical system 10 on the other. In this case, the image plane, generally, moves according as the magnification changes.

EXAMPLE 49

Figure 53:
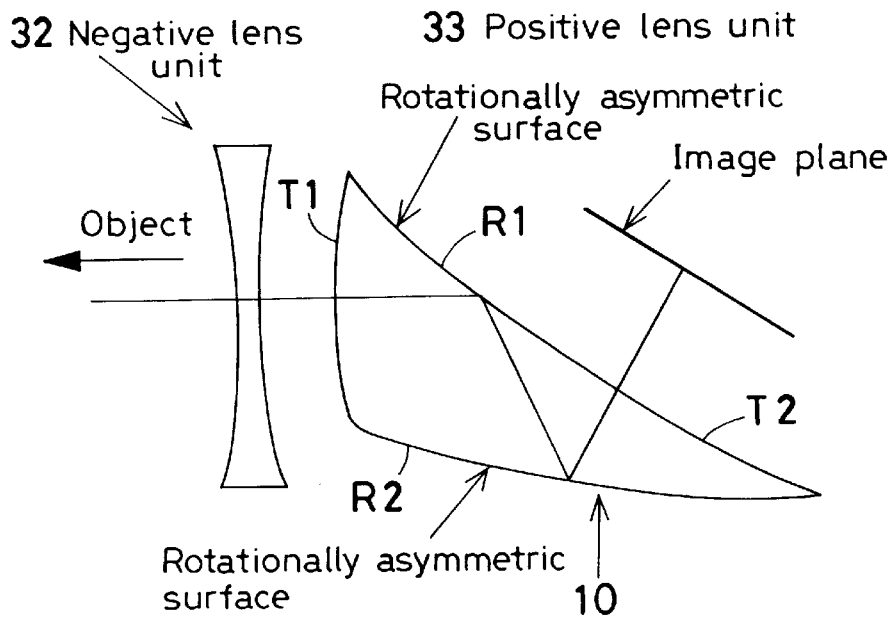
FIG. 53 illustrates an optical ray trace of Example 49 in which an optical system according to the present invention is used in a camera photographic optical system.

This example relates to a taking lens 20 of a camera 21 such as that shown in the perspective view of FIG. 38. As shown in FIG. 53, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes a lens unit disposed on the object or image side (on the object side in the case of the illustrated example) of the decentered optical system 10. One of the two lens units is arranged to be a negative lens unit (the object-side lens unit in the case of the illustrated example) 32, and the other lens unit is arranged to be a positive lens unit (the lens unit on the object side of the decentered optical system 10 in the case of the illustrated example) 33. With this arrangement, the magnification is changed by varying the spacing between the two lens units 32 and 33. In this case, the image plane can be fixed.

EXAMPLE 50

Figure 54:
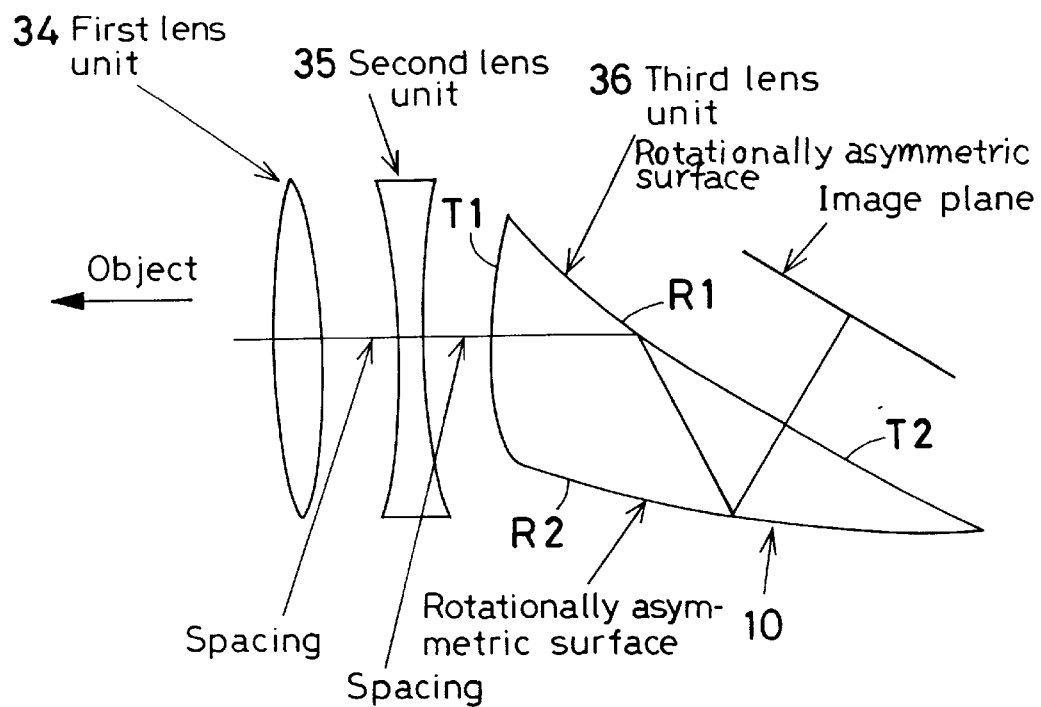
FIG. 54 illustrates an optical ray trace of Example 50 in which an optical system according to the present invention is used in a camera photographic optical system.

This example relates to a taking lens 20 of a camera 21 such as that shown in the perspective view of FIG. 38. As shown in FIG. 54, a photographic optical system according to this example includes a decentered optical system 10 according to the present invention which comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The photographic optical system further includes two lens units disposed on either the object or image side (on the object side in the case of the illustrated example) or on both the object and image sides, respectively, of the decentered optical system 10, thereby constructing the optical system of a total of three lens units 34, 35 and 36. With this arrangement, the magnification is changed by varying the spacing between the two lens units 34 and 35 and the spacing between the lens units 35 and 36. In this case, the image plane can be fixed.

EXAMPLE 51

Figure 55:
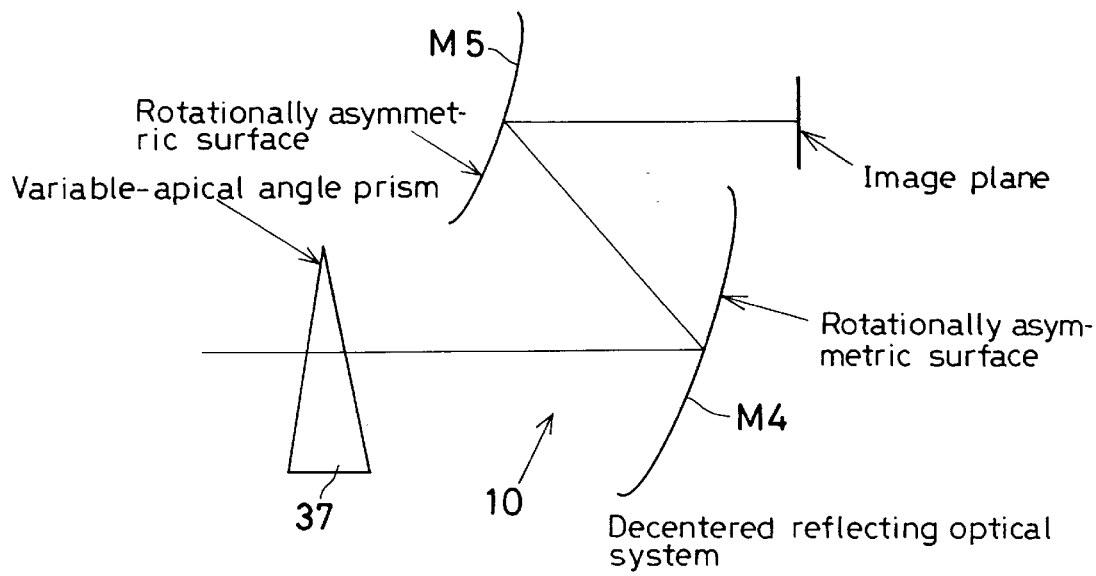
FIG. 55 illustrates an optical ray trace of Example 51 in which an optical system according to the present invention is used in an antivibration optical system.

In this example, a decentered optical system 10 according to the present invention is used as a part of an antivibration optical system used in an objective lens system of a camera or the like, as shown in FIG. 55. In the illustrated example, the decentered optical system 10 shown in FIG. 34, which consists essentially of two reflecting surfaces M4 and M5 to form a folded optical path, is used as an objective lens disposed on the image side of a variable-apical angle prism 37 constituting a principal part of the antivibration optical system.

EXAMPLE 52

Figure 56:
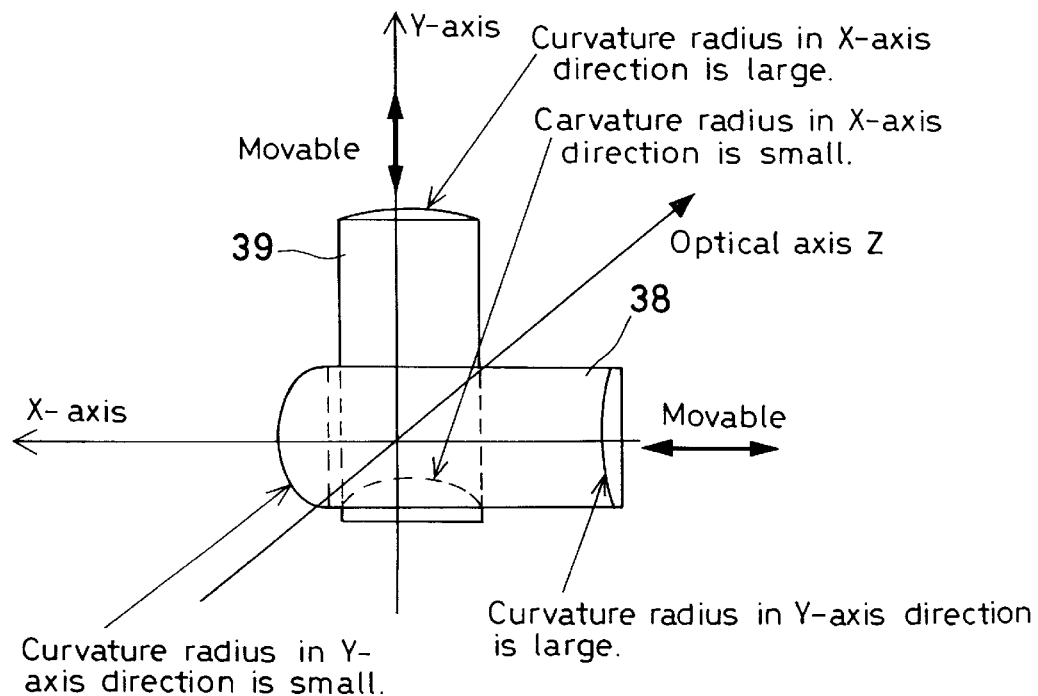
FIG. 56 illustrates an optical ray trace of Example 52 in which an optical system according to the present invention is used in a variable-refracting power optical system.

In this example, a decentered optical system according to the present invention is used as a lens constituting a variable-refracting power optical system which is used, for example, in an objective lens system of a camera or the like. As shown in FIG. 56, an optical system according to this example has a first decentered optical system 38 having a rotationally asymmetric curved surface whose refracting power varies in a direction of X-axis perpendicular to an optical axis lying perpendicular to the plane of the figure, and a second decentered optical system 39 having a rotationally asymmetric curved surface whose refracting power varies in a direction of Y-axis perpendicular to both the optical axis and the X-axis. Thus, the refracting power of the composite optical system can be changed by moving the first decentered optical system 38 along the X-axis and also moving the second decentered optical system 39 along the Y-axis. In the arrangement shown in FIG. 56, the entrance-side surface of the first decentered optical system 38 is a rotationally asymmetric curved surface in which the radius of curvature in the Y-axis direction decreases along the X-axis, and the exit-side surface of the second decentered optical system 39 is a rotationally asymmetric curved surface in which the radius of curvature in the X-axis direction increases along the Y-axis.

EXAMPLE 53

Figure 57:
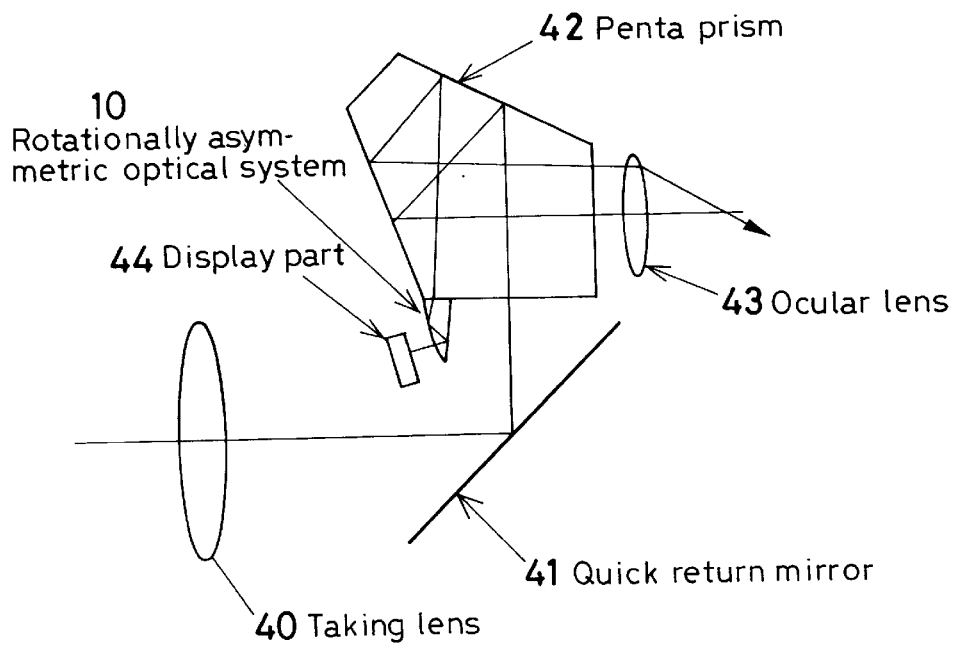
FIG. 57 illustrates an optical ray trace of Example 53 in which an optical system according to the present invention is used in an indication-within-finder optical system of a camera.

In this example, a decentered optical system according to the present invention is used as a part of an indication-within-finder optical system in a camera. As shown in FIG. 57, a single-lens reflex camera consists essentially of a taking lens 40, a quick return mirror 41, a penta prism 42, an ocular lens 43, and a photographic film (not shown). A decentered optical system 10 according to the present invention is used to display, within the finder of the single-lens reflex camera, data, e.g. an exposure value, displayed on a display part 44. The decentered optical system 10 comprises three surfaces as shown in FIG. 11, wherein the first transmitting surface and the second reflecting surface are formed from a single surface common to the two surfaces, and reflection takes place twice. Light form an object displayed on the display part 44 passes successively through the decentered optical system 10, the penta prism 42, and the ocular lens 43 to display, within the field of view or at the periphery of the visual field, an enlarged image of the object displayed on the display part 44.

EXAMPLE 54

Figure 58:
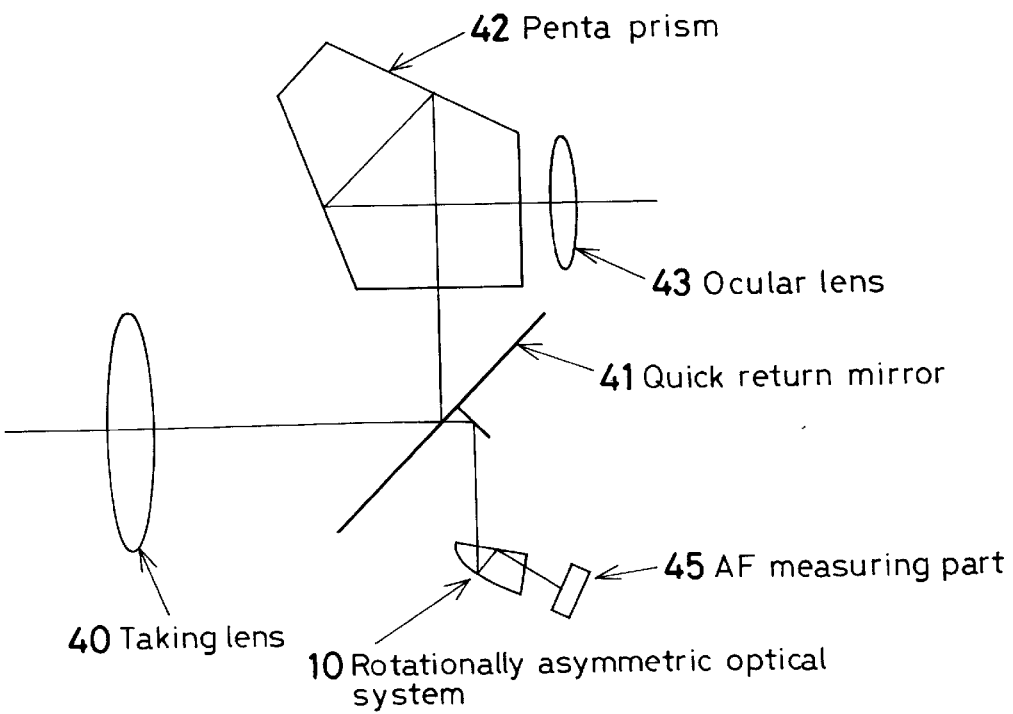
FIG. 58 illustrates an optical ray trace of Example 54 in which an optical system according to the present invention is used in an AF optical system of a camera.

In this example, a decentered optical system according to the present invention is used as a part of an autofocus (AF) optical system in a camera. As shown in FIG. 58, a single-lens reflex camera consists essentially of a taking lens 40, a quick return mirror 41, a penta prism 42, an ocular lens 43, and a photographic film (not shown). Light from an object which enters the single-lens reflex camera through the taking lens 40 passes through the quick return mirror 41 to reach an AF distance-measuring part 45 through a decentered optical system 10 according to the present invention. The decentered optical system 10 comprises three surfaces as shown in FIG. 11, wherein the first transmitting surface and the second reflecting surface are formed from a single surface common to the two surfaces, and reflection takes place twice.

EXAMPLE 55

Figure 59:
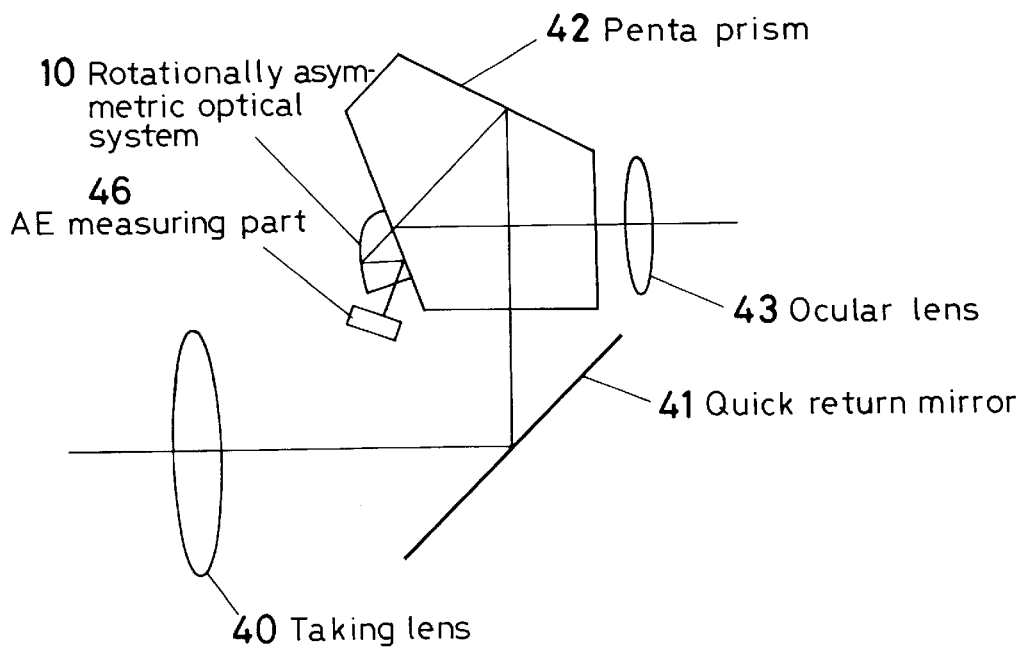
FIG. 59 illustrates an optical ray trace of Example 55 in which an optical system according to the present invention is used in an AE optical system of a camera.

In this example, a decentered optical system according to the present invention is used as a part of an automatic exposure control (AE) optical system in a camera. As shown in FIG. 59, a single-lens reflex camera consists essentially of a taking lens 40, a quick return mirror 41, a penta prism 42, an ocular lens 43, and a photographic film (not shown). Light from an object which enters the single-lens reflex camera through the taking lens 40 reaches the penta prism 42 via the quick return mirror 41. A part of the light is led to a decentered optical system 10 according to the present invention through a reflecting surface of the penta prism 42 and reaches an AE measuring part 46. The decentered optical system 10 comprises three surfaces as shown in FIG. 11, wherein the first transmitting surface and the second reflecting surface are formed from a single surface common to the two surfaces, and reflection takes place twice.

EXAMPLE 56

Figure 60:
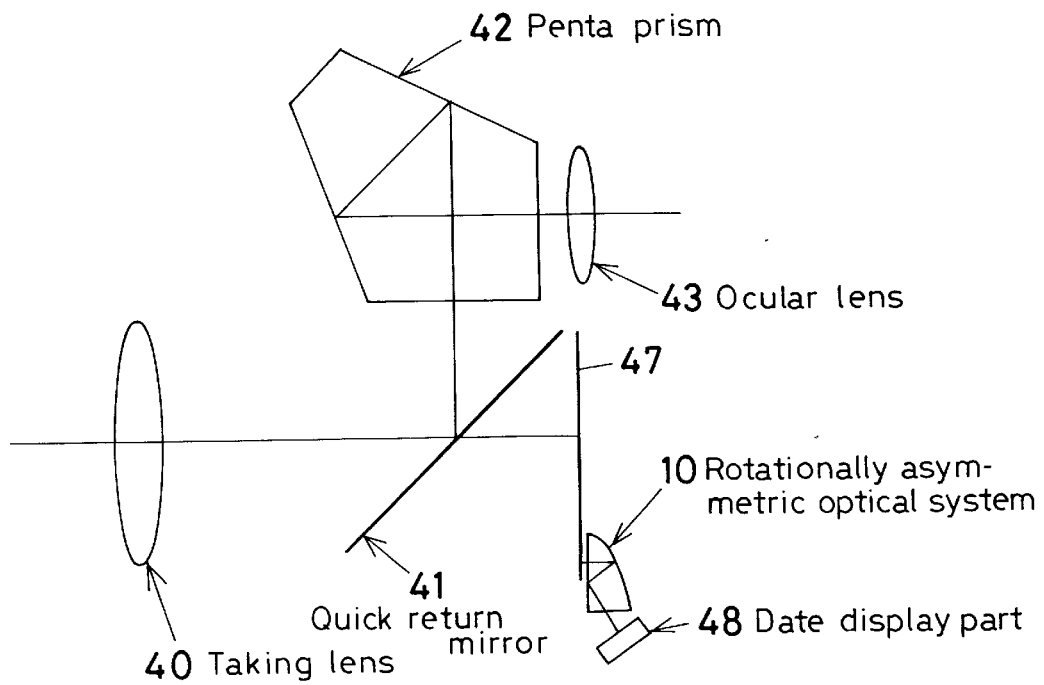
FIG. 60 illustrates an optical ray trace of Example 56 in which an optical system according to the present invention is used in a data-imprinting optical system of a camera.

In this example, a decentered optical system according to the present invention is used as an optical system for imprinting data, e.g. a date, in a camera. As shown in FIG. 60, a single-lens reflex camera consists essentially of a taking lens 40, a quick return mirror 41, a penta prism 42, an ocular lens 43, and a photographic film 47. Data, e.g. a date, displayed on a date display part 48 in the single-lens reflex camera is imaged in a peripheral portion of the film 47 by a decentered optical system 10 according to the present invention. The decentered optical system 10 comprises three surfaces as shown in FIG. 11, wherein the first transmitting surface and the second reflecting surface are formed from a single surface common to the two surfaces, and reflection takes place twice.

EXAMPLE 57

Figure 61:
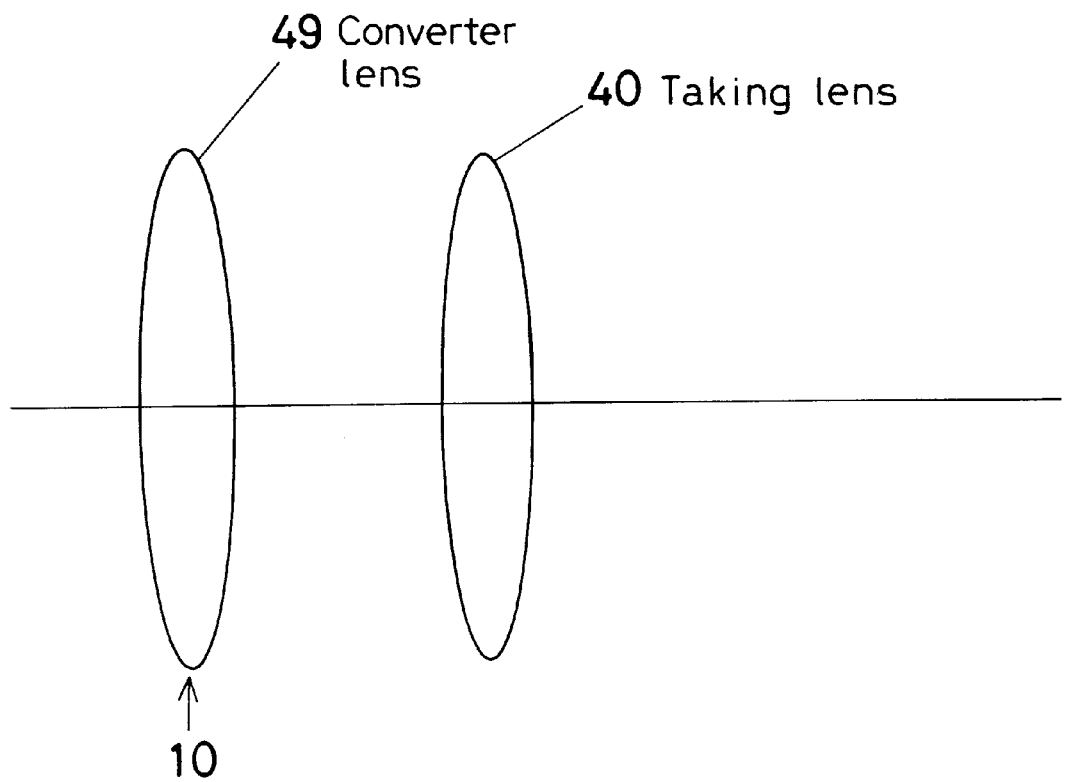
FIG. 61 illustrates an optical ray trace of Example 57 in which an optical system according to the present invention is used as a converter lens for a taking lens.

In this example, as shown in FIG. 61, a decentered optical system 10 according to the present invention is used as a converter lens 49 which is mounted in front of or behind a taking lens 40 (in front of the lens 40 in the illustrated example) in a camera of the like to change the focal length of the lens 40. In the illustrated example, a refracting decentered optical system such as those shown in FIGS. 1 to 4 is used.

EXAMPLE 58

Figure 62:
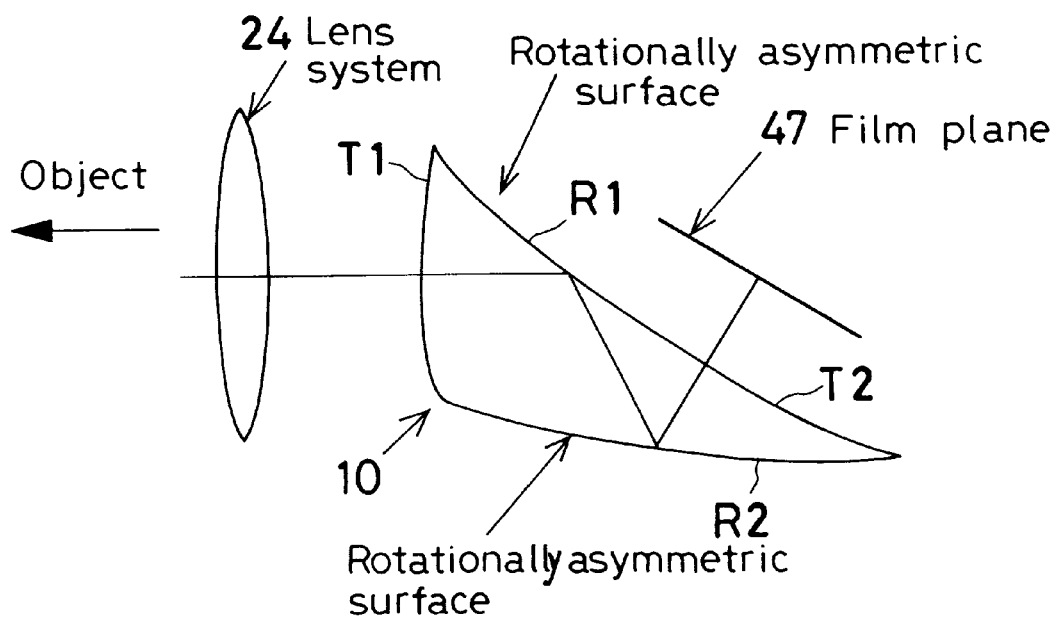
FIG. 62 illustrates an optical ray trace of Example 58 in which an optical system according to the present invention is used in a camera having a silver halide film disposed therein.

This example relates to a camera wherein, as shown in FIG. 62, a silver halide film 47 is disposed at the image plane of the photographic optical system shown in FIG. 47, which uses the decentered optical system 10 according to the present invention.

EXAMPLE 59

Figure 63:
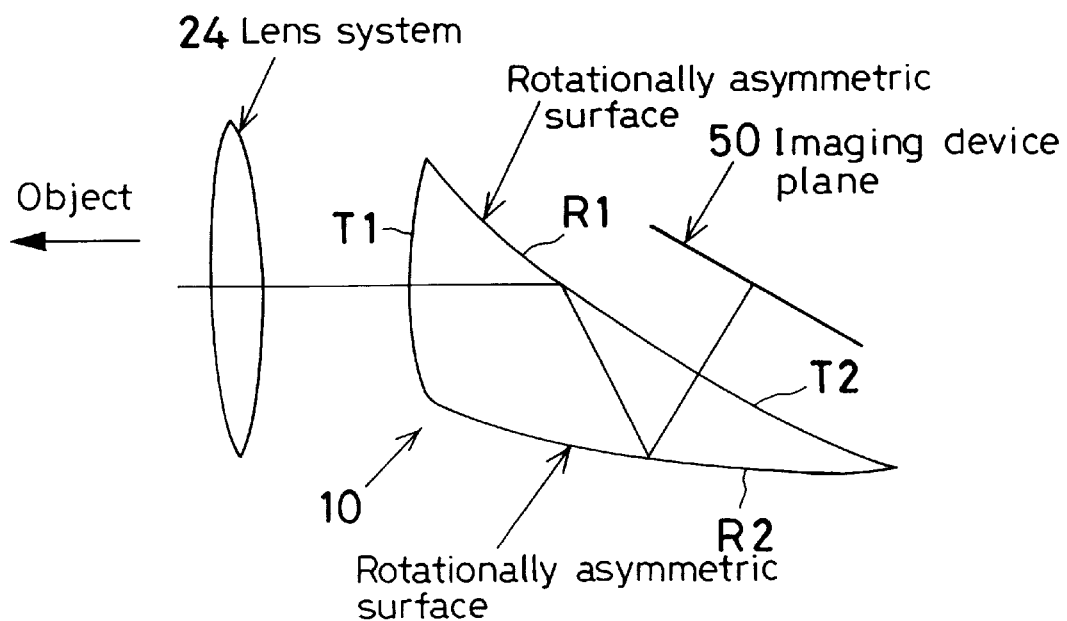
FIG. 63 illustrates an optical ray trace of Example 59 in which an optical system according to the present invention is used in a camera having an imaging device disposed therein.

This example relates to a camera wherein, as shown in FIG. 63, an imaging device 50 is disposed at the image plane of the photographic optical system shown in FIG. 47, which uses the decentered optical system 10 according to the present invention.

EXAMPLE 60

Figure 64:
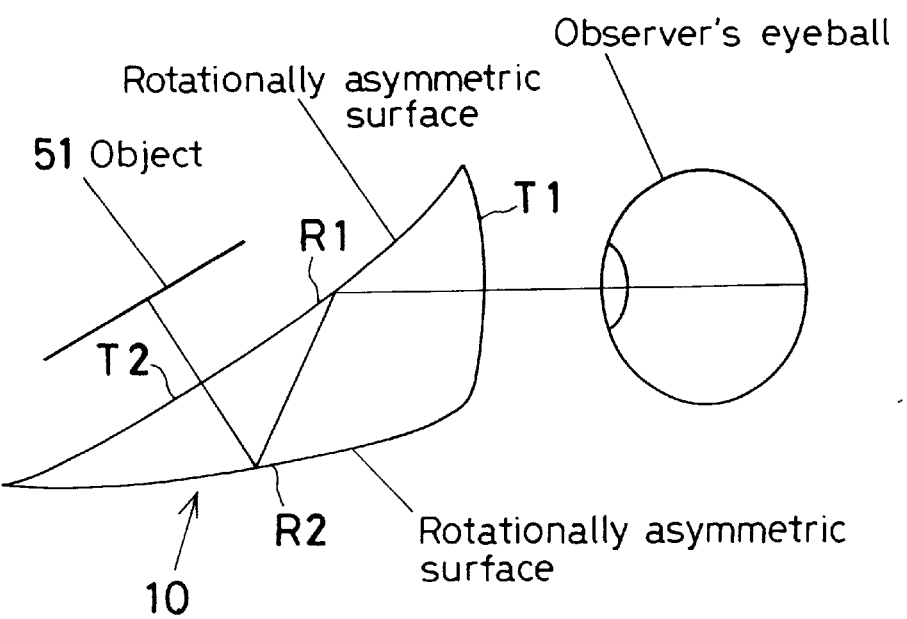
FIG. 64 illustrates an optical ray trace of Example 60 in which an optical system according to the present invention is used in an optical system for observation.

In this example, as shown in FIG. 64, a decentered optical system 10 according to the present invention is used as an optical system for observation. The decentered optical system 10 comprises a first transmitting surface T1, a first reflecting surface R1, a second reflecting surface R2, and a second transmitting surface T2, wherein the first reflecting surface R1 and the second transmitting surface T2 are the identical surface, and both the first and second reflecting surfaces R1 and R2 are rotationally asymmetric surfaces. The optical path is reversed to observe, with an eye, an enlarged image of an object 51 disposed in front of the second transmitting surface T2 through the decentered optical system 10.

EXAMPLE 61

Figure 65:
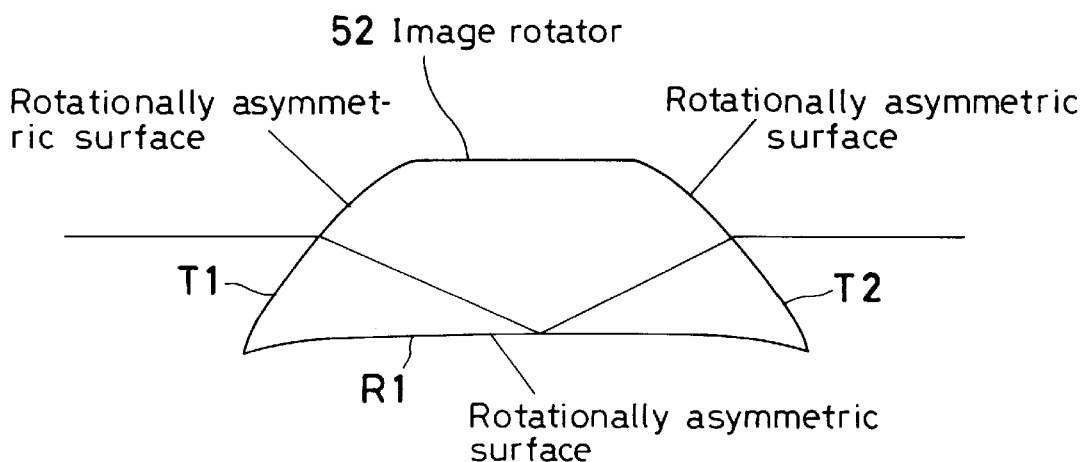
FIG. 65 illustrates an optical ray trace of Example 61 in which an optical system according to the present invention is used in an image rotator.

In this example, as shown in FIG. 65, a decentered optical system 10 according to the present invention is arranged in the form of an image rotator 52. The decentered optical system 10 has a dove prism-like shape and comprises a first transmitting surface TI, a first reflecting surface R1, and a second transmitting surface T2, wherein all the three surfaces are formed from rotationally asymmetric surfaces. The image rotator can be provided with image-formation properties or the like.

EXAMPLE 62

Figure 66:
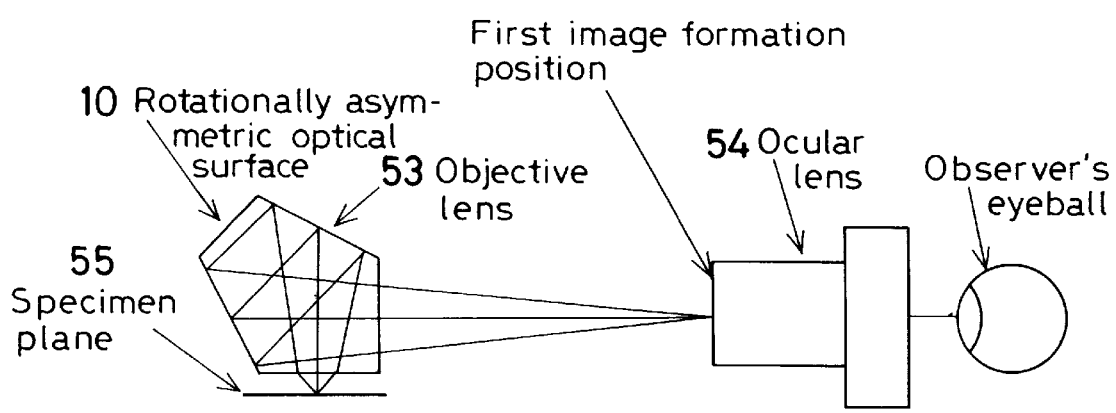
FIG. 66 illustrates an optical ray trace of Example 62 in which an optical system according to the present invention is used in an objective lens of a microscope.

In this example, as shown in FIG. 66, a decentered optical system 10 according to the present invention is used as an objective lens 53 of a microscope which consists essentially of an objective lens 53 and an ocular lens 54 to observe an enlarged image of a specimen on a specimen plane 55. In the illustrated example, the decentered optical system 10 comprises a penta prism including at least one rotationally asymmetric surface having power.

EXAMPLE 63

Figure 67:
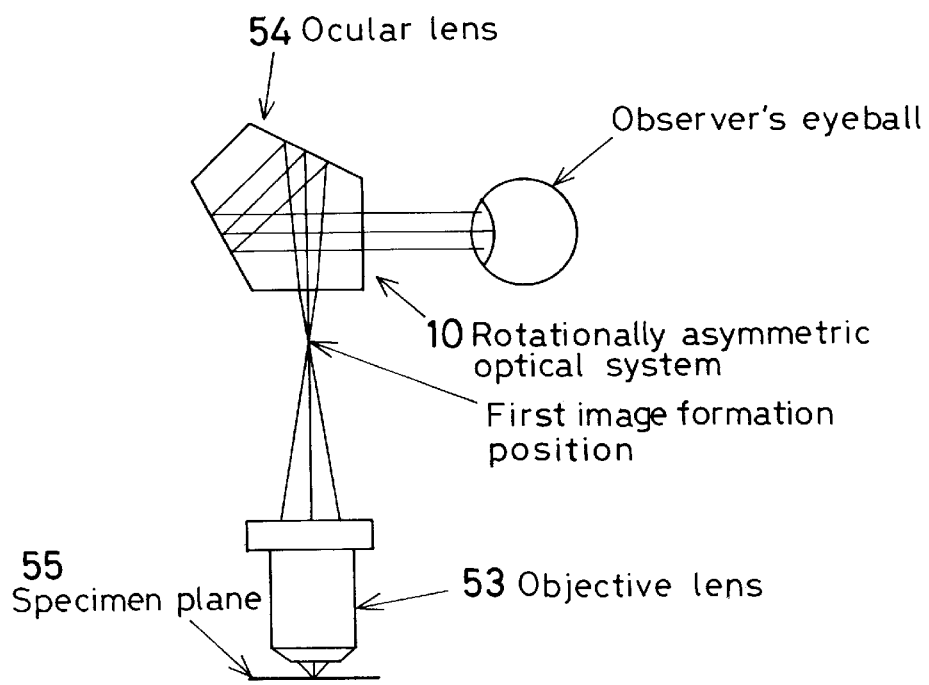
FIG. 67 illustrates an optical ray trace of Example 63 in which an optical system according to the present invention is used in an ocular lens of a microscope.

In this example, as shown in FIG. 67, a decentered optical system 10 according to the present invention is used as an ocular lens 54 of a microscope consisting essentially of an objective lens 53 and an ocular lens 54 to observe an enlarged image of a specimen on a specimen plane 55. In the illustrated example, the decentered optical system 10 comprises a penta prism including at least one rotationally asymmetric surface having power.

EXAMPLE 64

Figure 68:
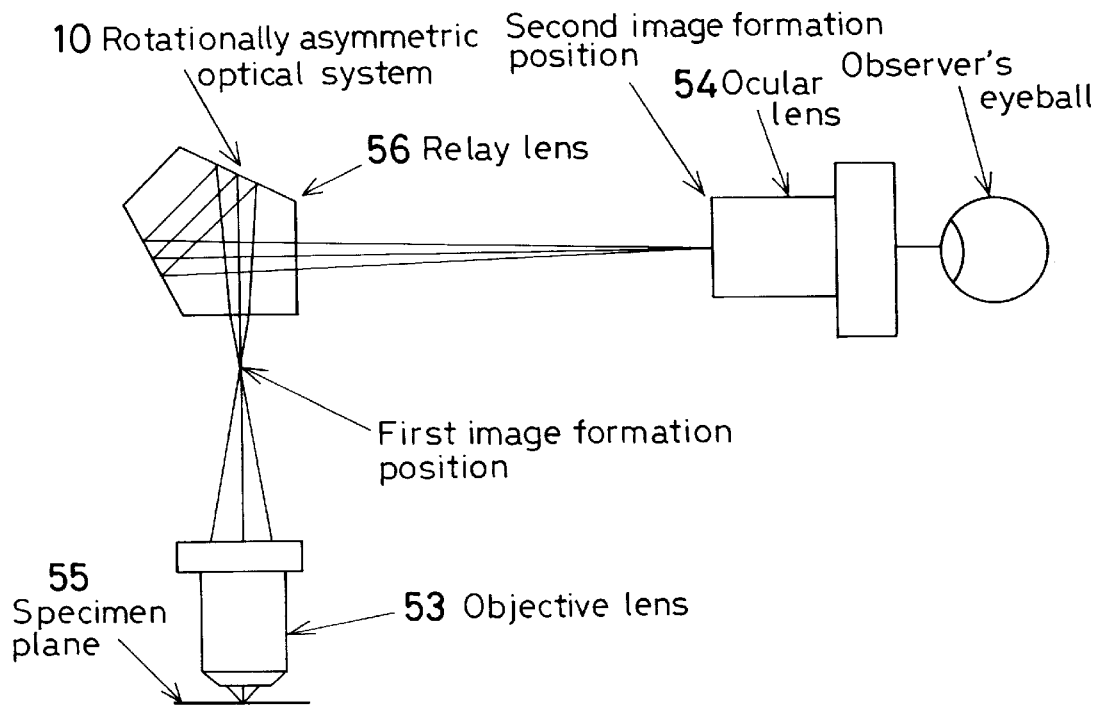
FIG. 68 illustrates an optical ray trace of Example 64 in which an optical system according to the present invention is used in a relay lens of a microscope.

In this example, as shown in FIG. 68, a decentered optical system 10 according to the present invention is used as a relay lens 56 of a microscope consisting essentially of an objective lens 53, a relay lens 56 for relaying an intermediate image, and an ocular lens 54 to observe an enlarged image of a specimen on a specimen plane 55. In the illustrated example, the decentered optical system 10 comprises a penta prism including at least one rotationally asymmetric surface having power.

EXAMPLE 65

Figure 69:
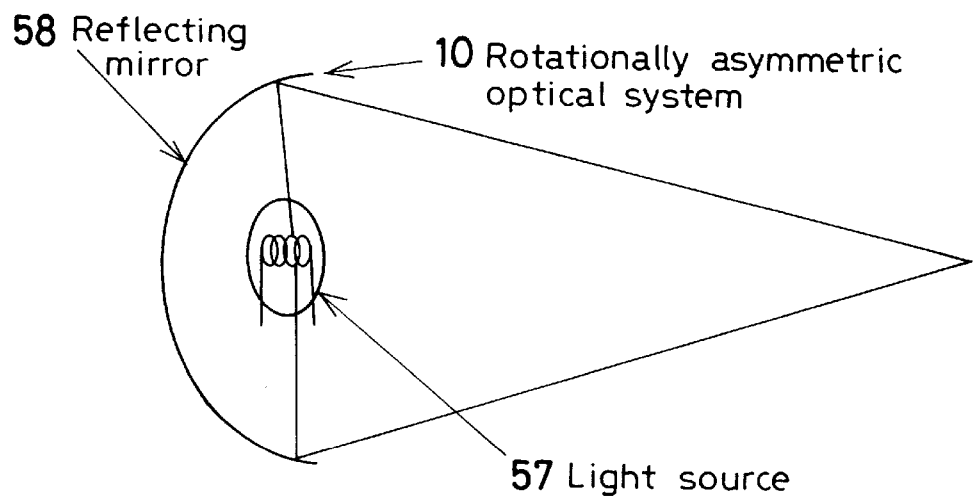
FIG. 69 illustrates an optical ray trace of Example 65 in which an optical system according to the present invention is used in an illumination optical system for a microscope.

In this example, as shown in FIG. 69, a decentered optical system 10 according to the present invention which consists essentially of a single reflecting surface is used as a reflecting mirror 58 for converting a divergent bundle of rays from a light source 57 into a convergent bundle of rays in an illumination optical system for a microscope.

EXAMPLE 66

Figure 70:
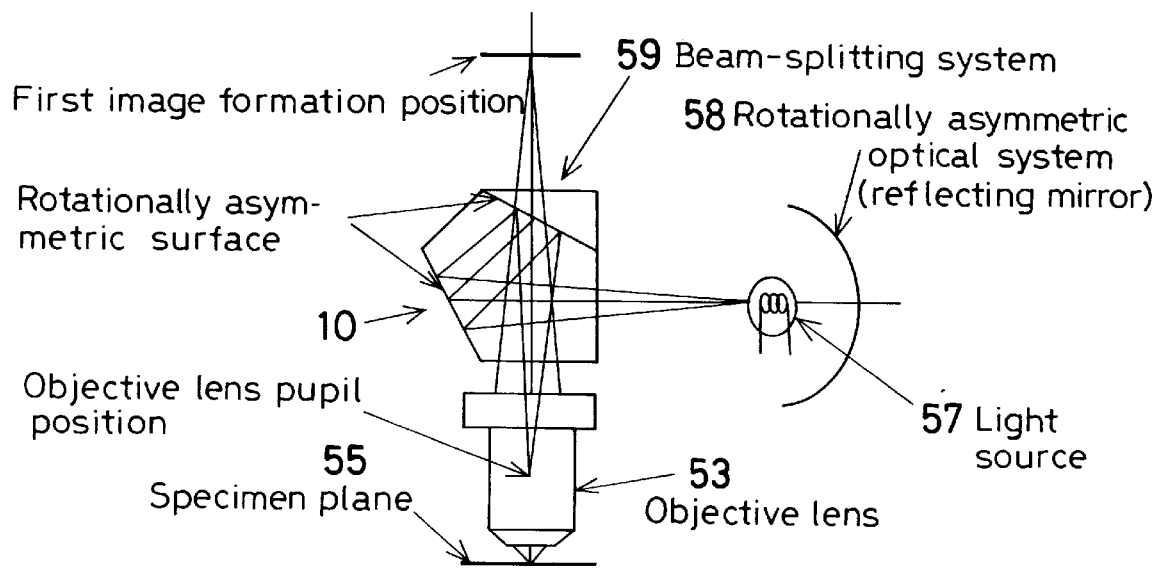
FIG. 70 illustrates an optical ray trace of Example 66 in which an optical system according to the present invention is used in an incident-light illumination optical system for a microscope.

In this example, as shown in FIG. 70, a rotationally asymmetric surface according to the present invention is applied to a beam-splitting surface, a reflecting surface, etc. of a beam-splitting system 59 in an incident-light illumination optical system for a microscope consisting essentially of a light source 57 and a beam-splitting system 59, wherein a bundle of light rays from the light source 57 is reflected by the beam-splitting system 59, and the reflected ray bundle is directed onto a specimen plane 55 by an objective lens 53, and then light reflected and scattered by a specimen on the specimen plane 55 is made to enter an ocular lens (not shown) through the objective lens 53 and the beam-splitting system 59. It should be noted that, in the illustrated example, a rotationally asymmetric surface according to the present invention is also used as a reflecting mirror 58 for converting a divergent bundle of rays from the light source 57 into a convergent bundle of rays.

EXAMPLE 67

Figure 71:
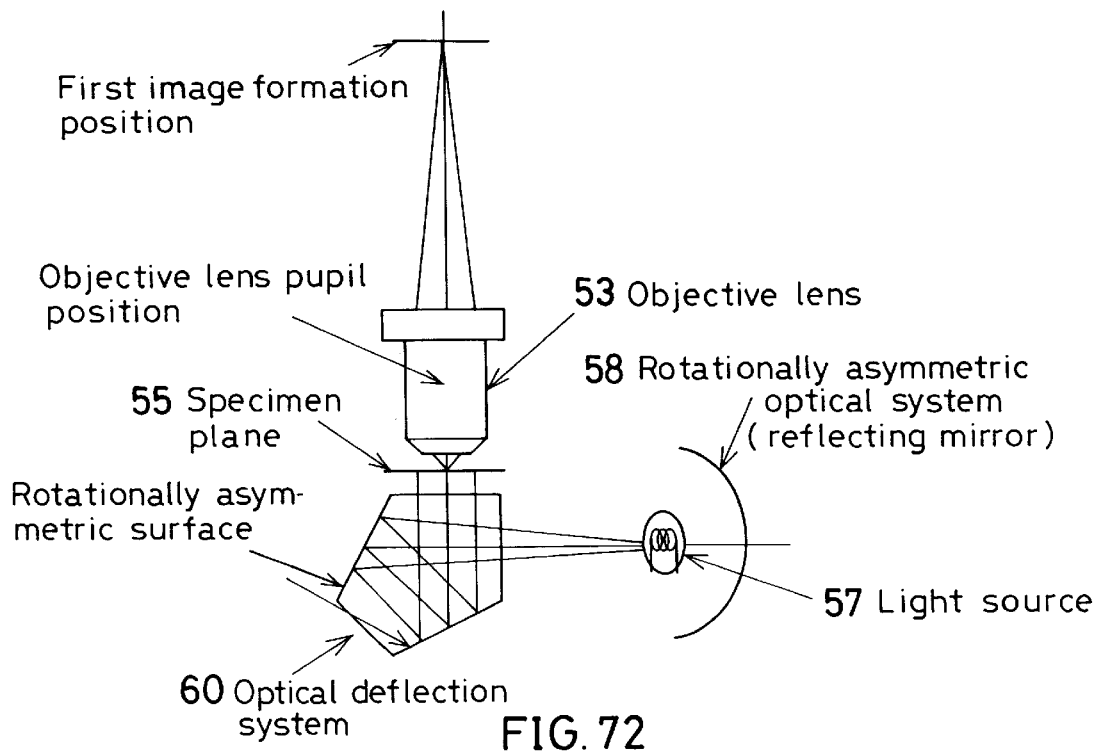
FIG. 71 illustrates an optical ray trace of Example 67 in which an optical system according to the present invention is used in a transmission illumination optical system for a microscope.

In this example, as shown in FIG. 71, a rotationally asymmetric surface according to the present invention is applied to reflecting surfaces, etc. of a penta prism constituting an optical deflection system 60 in a transmission illumination system for a microscope which consists essentially of a light source 57 and an optical deflection system 60 to illuminate a specimen plane 55 from below it. It should be noted that, in the illustrated example, a rotationally asymmetric surface according to the present invention is also used as a reflecting mirror 58 for converting a divergent bundle of rays from the light source 57 into a convergent bundle of rays.

EXAMPLE 68

Figure 72:
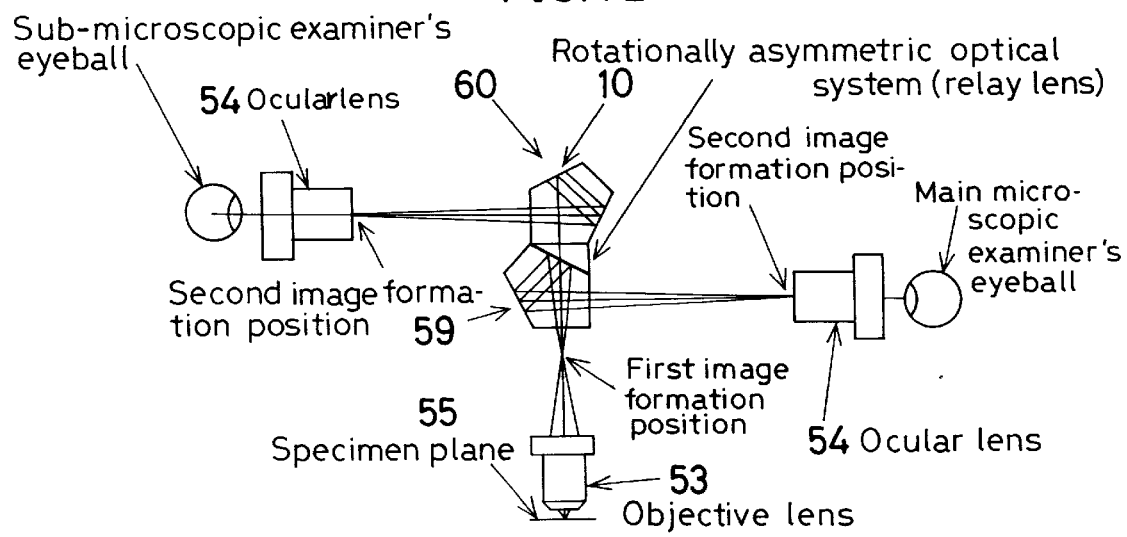
FIG. 72 illustrates an optical ray trace of Example 68 in which an optical system according to the present invention is used in a multi-discussion microscope.

In this example, as shown in FIG. 72, a decentered optical system 10 according to the present invention is applied to a multi-discussion microscope. In the multi-discussion microscope, a bundle of light rays from an objective lens 53 is divided into two ray bundles by a beam-splitting system 59. One ray bundle is led directly to one ocular lens 54 to enable a main microscopic examiner to perform observation. The other ray bundle divided by the beam-splitting system 59 is led to another ocular lens 54 through an optical deflection system 60 to enable a sub-microscopic examiner to perform observation. The beam-splitting system 59 and the optical deflection system 60 are each constructed of a decentered optical system 10 according to the present invention.

EXAMPLE 69

Figure 73:
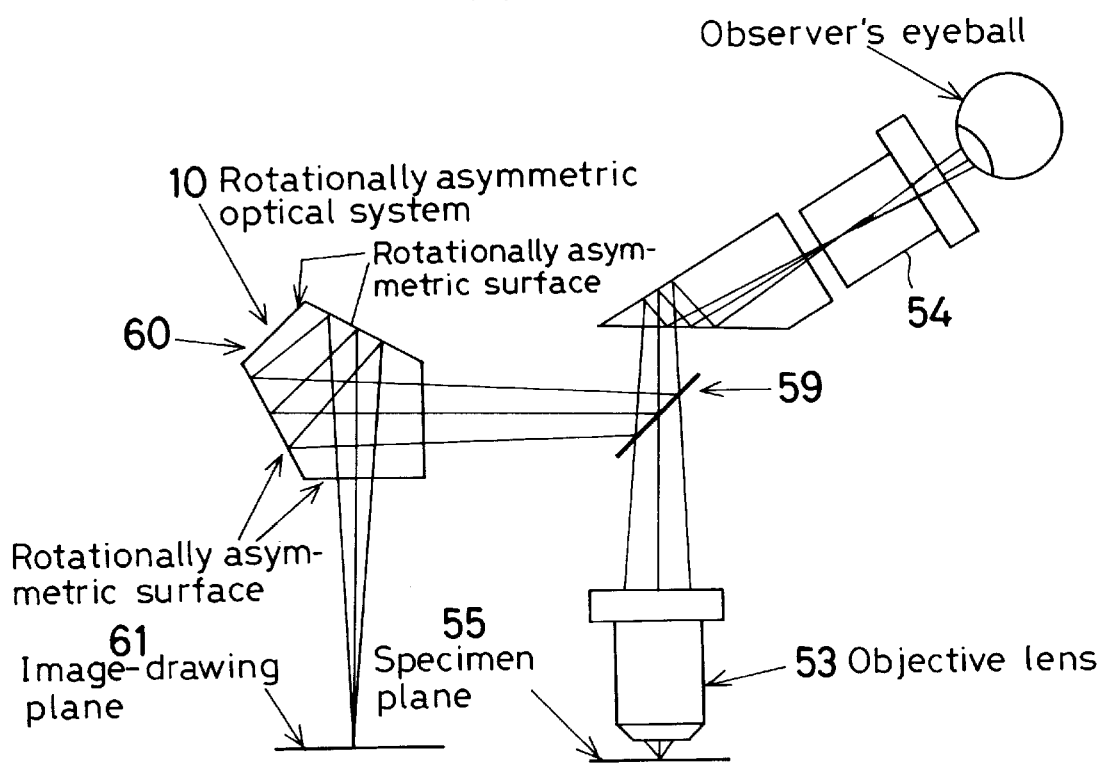
FIG. 73 illustrates an optical ray trace of Example 69 in which an optical system according to the present invention is used in an image-drawing device for a microscope.

In this example, as shown in FIG. 73, a decentered optical system 10 according to the present invention is applied to an image-drawing device for a microscope, in which an image of a sample on a specimen plane 55 which is observed through an objective lens 53 and an image which is being drawn on an image-drawing plane 61 are combined together by a beam-splitting system 59 so as to be capable of being simultaneously observed through an ocular lens 54. A decentered optical system 10 according to the present invention is used as an optical deflection system 60 disposed in the image-drawing optical path. In the illustrated example, the decentered optical system 10 comprises a penta prism including at least one rotationally asymmetric surface having power.

EXAMPLE 70

Figure 74:
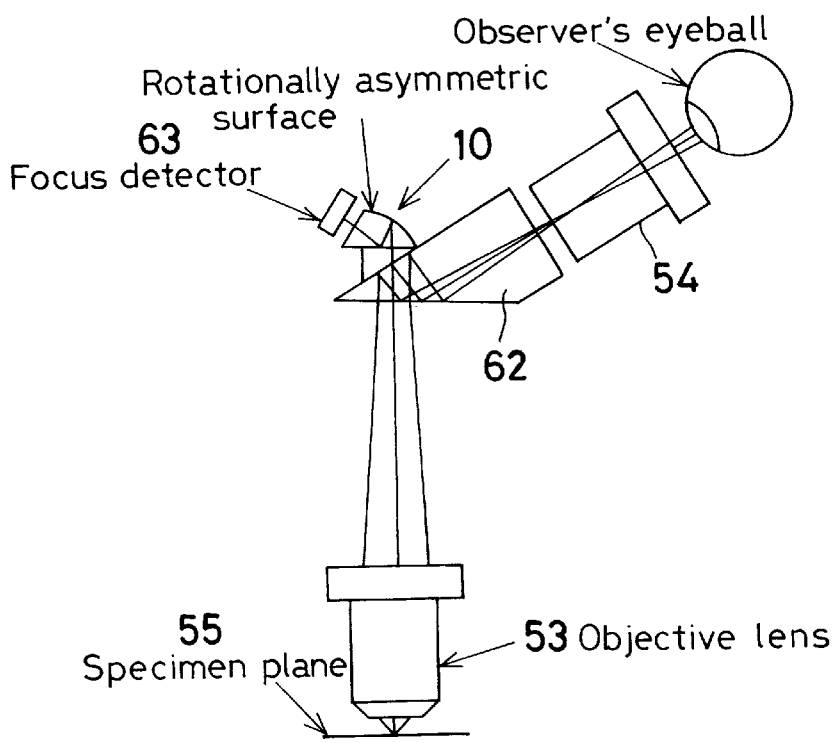
FIG. 74 illustrates an optical ray trace of Example 70 in which an optical system according to the present invention is used in an autofocus microscope.

As shown in FIG. 74, this example relates to an optical system of an autofocus microscope consisting essentially of an objective lens 53, an optical deflection reflecting prism 62, and an ocular lens 54, wherein a decentered optical system 10 according to the present invention is pasted on a reflecting surface of the optical deflection reflecting prism 62, and a bundle of light rays from a sample on a specimen plane 55 is made to enter a focus detector 63 through the decentered optical system 10, thereby performing automatic focusing. The decentered optical system 10 comprises three surfaces as shown in FIG. 11, wherein the first transmitting surface and the second reflecting surface are formed from a single surface common to the two surfaces, and reflection takes place twice.

EXAMPLE 71

Figure 75:
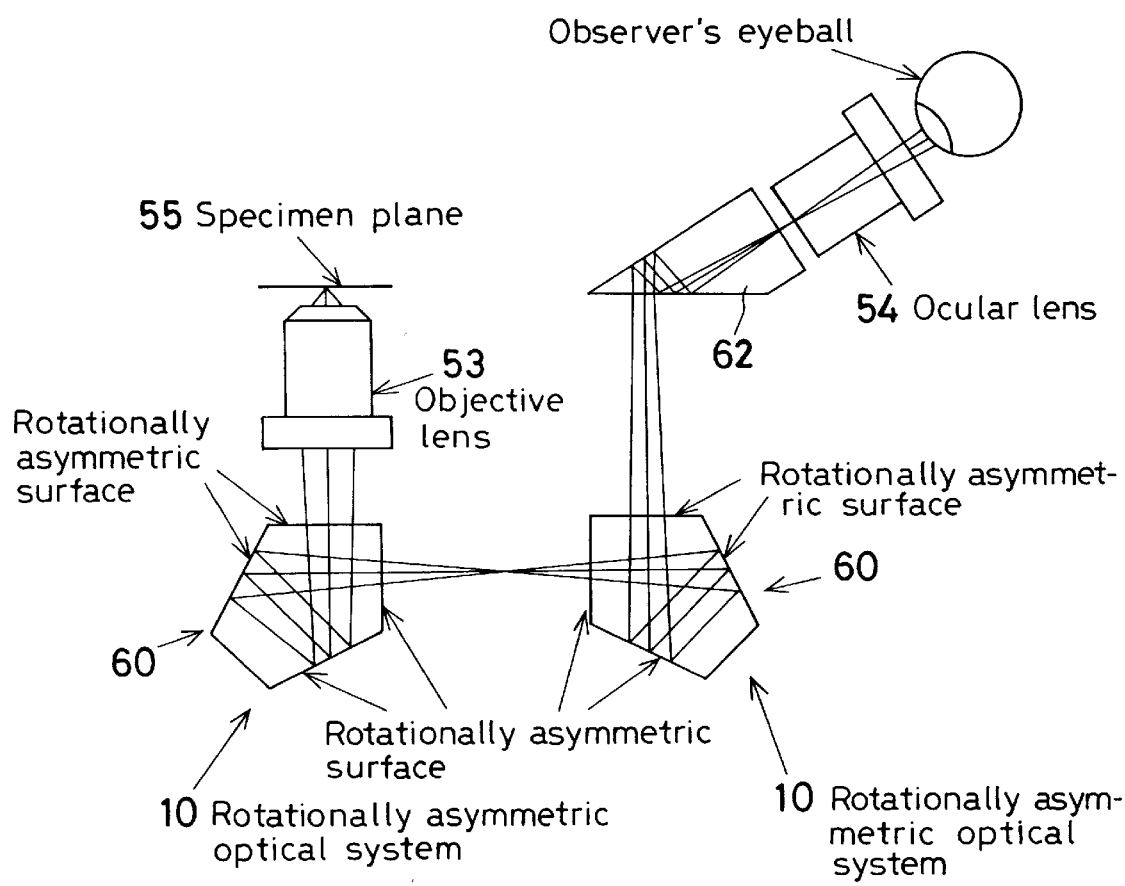
FIG. 75 illustrates an optical ray trace of Example 71 in which an optical system according to the present invention is used in an inverted microscope.

In this example, as shown in FIG. 75, a decentered optical system 10 according to the present invention is used in an inverted microscope designed to observe a specimen plane 55 from below it. A decentered optical system 10 according to the present invention is used to constitute each of optical deflection systems 60 for leading a bundle of light rays from an objective lens 53 to an ocular lens 54. In the illustrated example, either of the decentered optical systems 10 comprises a penta prism including at least one rotationally asymmetric surface having power.

EXAMPLE 72

Figure 76:
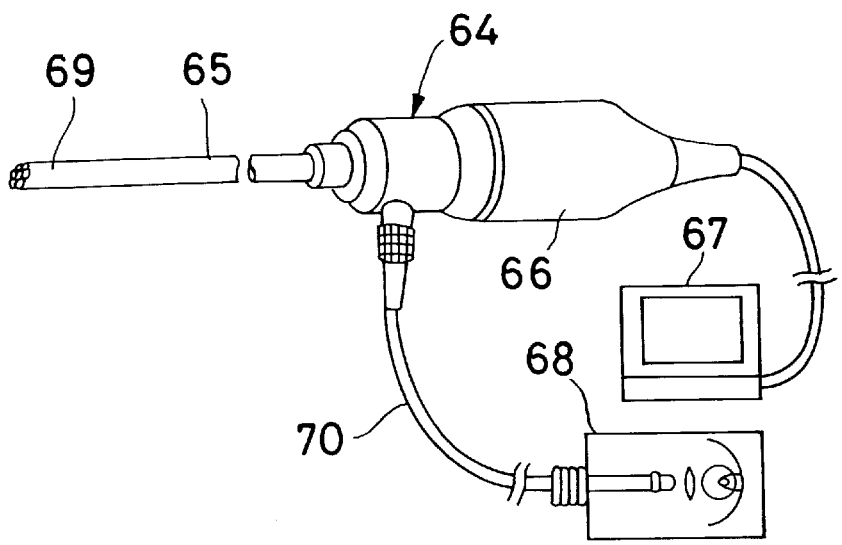
FIG. 76 schematically shows the arrangement of an endoscope using an image guide optical fiber bundle and a relay lens system.

The following is a description of examples in which a decentered optical system according to the present invention is applied to an endoscope. In the following description, the term "endoscope" means an endoscope 64 using an image guide optical fiber bundle and a relay lens system as shown in FIG. 76, and a video endoscope 71 such as that shown in FIG. 77, unless otherwise specified. The endoscope 64 shown in FIG. 76 has an insert part 65 containing an image-forming optical system and illumination optical system (not shown), a camera 66, a monitor 67, and a light source unit 68. The image-forming optical system, together with a light guide for applying light in the direction of the visual field of the image-forming optical system, is-incorporated in a distal end portion 69 of the insert part 65. In the insert part 65, a relay lens system, which is an image and pupil transfer optical system, is provided subsequently to the image-forming optical system. An ocular optical system (not shown) is disposed in the proximal portion of the endoscope 64. The camera 66, which serves as an imaging device, can be attached to the proximal portion of the endoscope 64 at a position subsequent to the ocular optical system. Illuminating light from the light source unit 68 is supplied through a light guide cable 70 and passed through the proximal portion, the insert part 65, and the distal end portion 69 to illuminate an area in the direction of the visual field.

Figure 77:
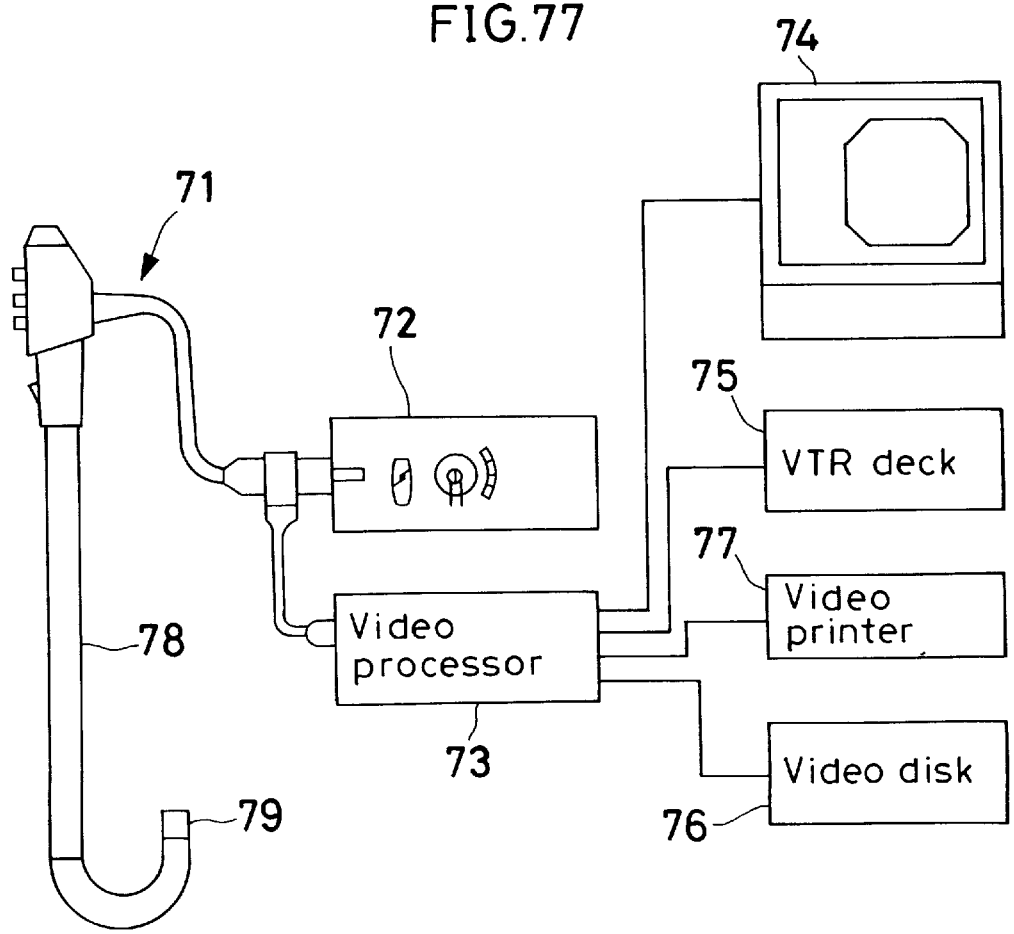
FIG. 77 schematically shows a video endoscope.

The video endoscope 71 shown in FIG. 77 contains an image-forming optical system and an illumination optical system. The video endoscope 71 is associated with a light source unit 72 for supplying illuminating light, a video processor 73 for executing processing of signals associated with the video endoscope 71, a monitor 74 for displaying video signals outputted from the video processor 73, a VTR deck 75 and video disk 76 connected to the video processor 73 to record video signals and so forth, and a video printer 77 for printing out video signals in the form of images. The video endoscope 71 has an insert part 78 with a distal end portion 79. An image-forming optical system, an imaging device, and a light guide for applying light in the direction of the visual field are incorporated in the distal end portion 79.

FIGS. 78(a), 78(b) and 78(c) show some examples in which a decentered optical system 10 having a rotationally asymmetric surface according to the present invention is used in the objective optical systems provided in the distal end portions of these endoscopes. FIG. 78(a) shows the distal end portion of a side-viewing video endoscope. A decentered optical system 10 according to the present invention is disposed behind a lens 80 also serving as a protective glass. The decentered optical system 10 comprises a first transmitting surface T1, a first reflecting surface R1, a second reflecting surface R2, and a second transmitting surface T2, wherein at least one of the four surfaces is formed from a rotationally asymmetric surface. The optical axis is deflected through approximately 90° by the decentered optical system 10, and a two-dimensional imaging device 81 is disposed at the image plane of the decentered optical system 10. It is, of course, possible to dispose an end face of an optical fiber bundle in place of the two-dimensional imaging device 81 to thereby construct an endoscope such as that shown in FIG. 76.

FIG. 78(b) shows the distal end portion of an endoscope using an optical fiber bundle 82 for guiding an endoscopic image. This endoscope is arranged to enable observation of an object in a diagonally forward direction. A decentered optical system 10 according to the present invention is disposed behind a lens 80 also serving as a protective glass. The decentered optical system 10 comprises a first transmitting surface T1, a first reflecting surface R1, a second reflecting surface R2, and a second transmitting surface T2, wherein the first transmitting surface T1 and the second reflecting surface R2 are the identical surface, and at least one of the four surfaces is formed from a rotationally asymmetric surface. The optical axis is deflected through several tens of degrees by the decentered optical system 10, and an end face of an optical fiber bundle 82 is disposed at the image plane of the decentered optical system 10.

FIG. 78(c) shows the distal end portion of a direct-view video endoscope in which a decentered optical system 10 according to the present invention, such as that shown in FIG. 12, is disposed. The decentered optical system 10 comprises a first transmitting surface T1, a first reflecting surface R1, a second reflecting surface R2, and a second transmitting surface T2, wherein at least one of the four surfaces is formed from a rotationally asymmetric surface. A two-dimensional imaging device 81 is disposed at an image plane tilted with respect to the optical axis.

EXAMPLE 73

As shown in FIGS. 79(a) and 79(b), this example relates to arrangements similar to those shown in FIGS. 78(a) and 78(b), wherein a transparent protective plate 83 is disposed on the entrance side of the decentered optical system 10 in place of the lens 80, which also serves as a protective glass [it should, however, be noted that in FIG. 79(b) a two-dimensional imaging device 81 is disposed at the image plane of the decentered optical system 10].

EXAMPLE 74

As shown in FIGS. 80(a) and 80(b), this example relates to arrangements similar to those shown in FIGS. 78(a) and 78(b), wherein the first transmitting surface T1 on the entrance side of the decentered optical system 10 is a plane surface, and the lens 80, which also serves as a protective glass, is omitted [in FIGS. 80(a) and 80(b), a two-dimensional imaging device 81 or optical fiber bundle 82 disposed at the image plane is not shown].

EXAMPLE 75

As shown in FIGS. 81(a) and 81(b), this example relates to arrangements similar to those shown in FIGS. 79(a) and 79(b), wherein the second transmitting surface T2 on the exit side of the decentered optical system 10 is a plane surface.

EXAMPLE 76

As shown in FIGS. 82(a) and 82(b), this example relates to arrangements similar to those shown in FIGS. 81(a) and 81(b), wherein the image plane of the decentered optical system 10 is made coincident with the plane surface T2 on the exit side of the decentered optical system 10, and a two-dimensional imaging device 81 is placed in close contact with the surface T2.

EXAMPLE 77

As shown in FIGS. 83(a) and 83(b), this example relates to arrangements similar to those shown in FIGS. 81(a) and 81(b), wherein the second transmitting surface T2 on the exit side of the decentered optical system 10 is a plane surface. The arrangements differ from those shown in FIGS. 81(a) and 81(b) in that one end of an optical fiber bundle 82 is disposed at the image plane of the decentered optical system 10 in place of the two-dimensional imaging device 81.

EXAMPLE 78

As shown in FIGS. 84(a) and 84(b), this example relates to arrangements similar to those shown in FIGS. 82(a) and 82(b), wherein the image plane of the decentered optical system 10 is made coincident with the plane surface T2 on the exit side of the decentered optical system 10. In this example, one end of an optical fiber bundle 82 is disposed in place of the two-dimensional imaging device 81.

EXAMPLE 79

As shown in FIGS. 85(a) and 85(b), this example relates to arrangements similar to those shown in FIGS. 80(a) and 80(b), wherein the first transmitting surface T1 on the entrance side of the decentered optical system 10 is a plane surface, and the lens 80, which also serves as a protective glass, is omitted. In this example, one end of an optical fiber bundle 82 is disposed at the image plane of the decentered optical system 10.

EXAMPLE 80

In this example, a crystalline material, e.g. sapphire, is used as the protective plate 83 disposed on the entrance side of the decentered optical system 10 in the arrangements shown in FIGS. 81(*a*), 81(*b*) and so forth.

EXAMPLE 81

As shown in FIGS. 86(*a*) and 86(*b*), this example relates to arrangements similar to those shown in FIGS. 79(*a*) and 79(*b*), wherein the first surface of the endoscope objective optical system (in this case, the front surface of the transparent protective plate 83) is recessed inward from the enclosure of the distal end of the endoscope. In other examples also, the first surface of the endoscope objective optical system may be similarly recessed inward from the enclosure of the endoscope distal end.

EXAMPLE 82

As shown in FIGS. 87(*a*) and 87(*b*), this example relates to arrangements similar to those shown in FIGS. 79(*a*) and 79(*b*); wherein the first surface of the endoscope objective optical system (in this case, the front surface of the transparent protective plate 83) projects outward from the enclosure of the distal end of the endoscope. In other examples also, the first surface of the endoscope objective optical system may similarly project outward from the enclosure of the endoscope distal end.

EXAMPLE 83

Figure 88:
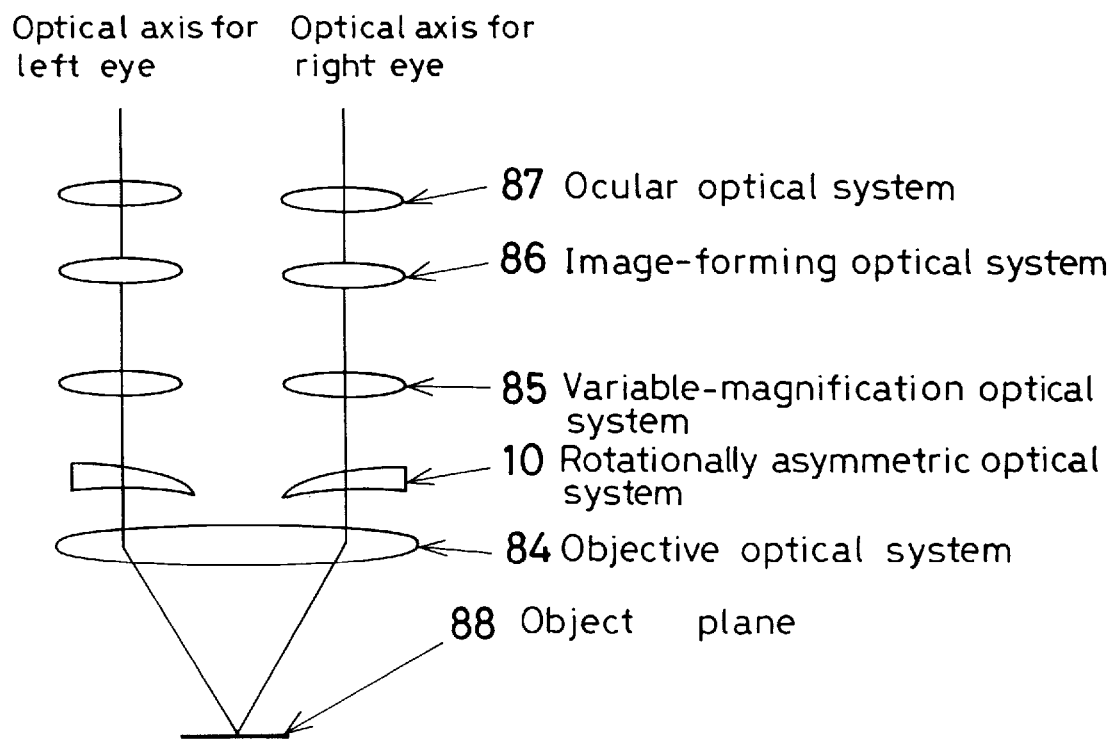
FIG. 88 illustrates an optical ray trace of Example 83 in which an optical system according to the present invention is used in an optical system of a binocular stereoscopic microscope.

In this example, a decentered optical system 10 according to the present invention is disposed to correct decentration aberrations produced by an objective optical system of a binocular stereoscopic microscope. FIG. 88 shows an optical system of a microscope which consists essentially of a single objective optical system 84 common to two optical systems for left and right eyes, and a combination of a variable-magnification optical system 85, an image-forming optical system 86, and an ocular optical system 87, which is disposed on each of optical axes for left and right eyes, whereby an object disposed on a common object plane 88 can be stereoscopically observed. In this example, decentered optical systems 10 according to the present invention are disposed between the objective optical system 84 and the left and right variable-magnification optical systems 85, respectively, to correct decentration aberrations produced owing to the fact that the optical axes for left and right eyes are shifted rightwardly and leftwardly with respect to the optical axis of the objective optical system 84. As the decentered optical systems 10 in this example, refracting decentered optical systems such as those shown for example in FIGS. 1 to 4 are used. It is, of course, possible to use other types of decentered optical system having a reflecting surface.

EXAMPLE 84

Figure 89:
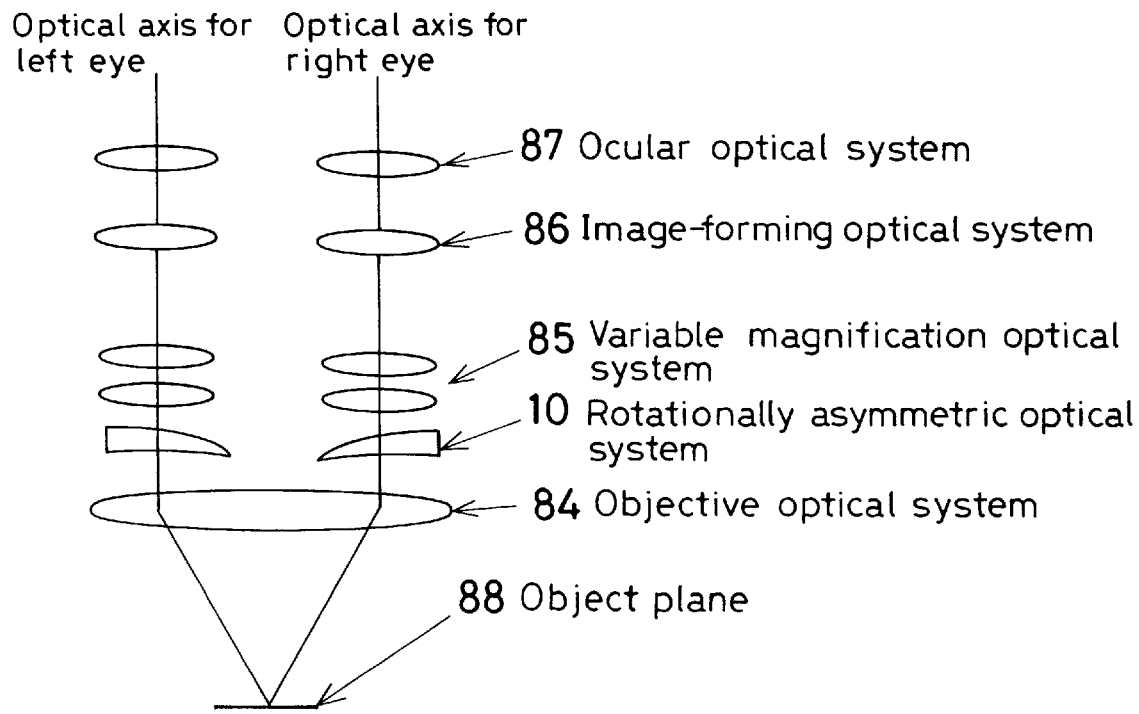
FIG. 89 illustrates an optical ray trace of Example 84 in which an optical system according to the present invention is used in an optical system of a binocular stereoscopic microscope.

In this example, as shown in FIG. 89, a decentered optical system 10 according to the present invention is used to constitute any of a plurality of lens units (a first lens unit of a total of three lens units in the illustrated example) constituting each of left and right variable-magnification optical systems 85 in a binocular stereoscopic microscope such as that shown in FIG. 88 to correct decentration aberrations produced owing to the fact that the optical axes for left and right eyes are shifted rightwardly and leftwardly with respect to the optical axis of the objective optical system 84. As the decentered optical systems 10 in this example, refracting decentered optical systems such as those shown for example in FIGS. 1 to 4 are used. It is, of course, possible to use other types of decentered optical system having a reflecting surface.

EXAMPLE 85

Figure 90:
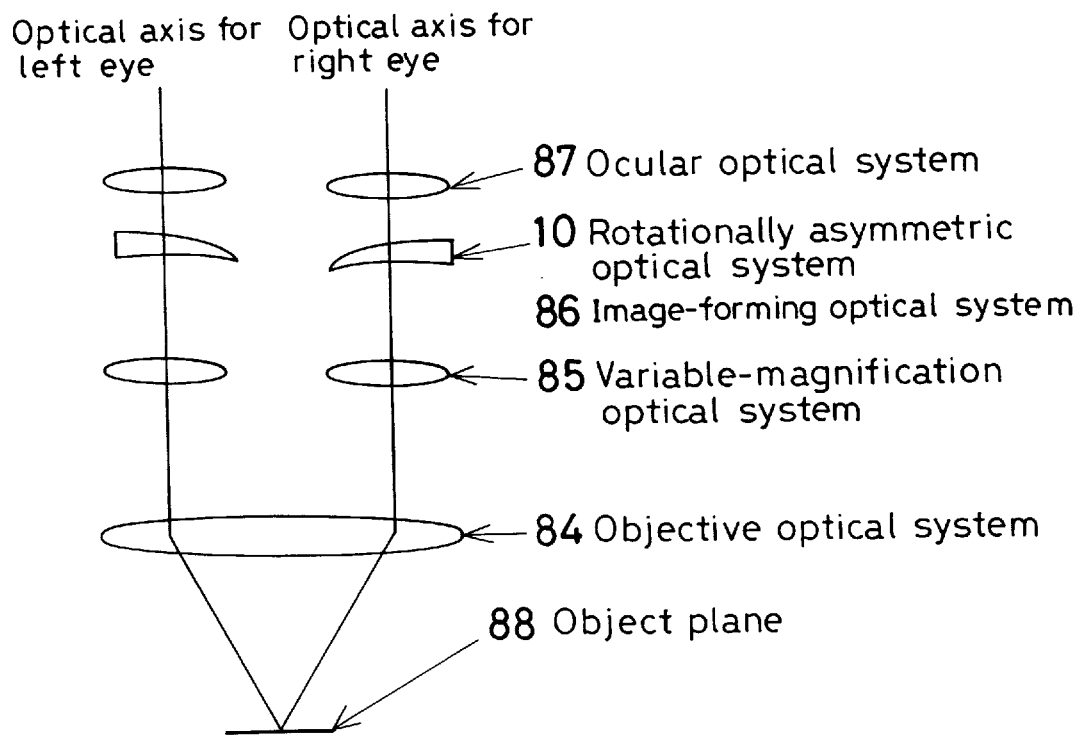
FIG. 90 illustrates an optical ray trace of Example 85 in which an optical system according to the present invention is used in an optical system of a binocular stereoscopic microscope.

In this example, as shown in FIG. 90, a decentered optical system 10 according to the present invention is used to constitute each of left and right image-forming optical systems 86 in a binocular stereoscopic microscope such as that shown in FIG. 88 to correct decentration aberrations produced owing to the fact that the optical axes for left and right eyes are shifted rightwardly and leftwardly with respect to the optical axis of the objective optical system 84. As the decentered optical systems 10 in this example, refracting decentered optical systems such as those shown for example in FIGS. 1 to 4 are used. It is, of course, possible to use other types of decentered optical system having a reflecting surface.

EXAMPLE 86

Figure 91:
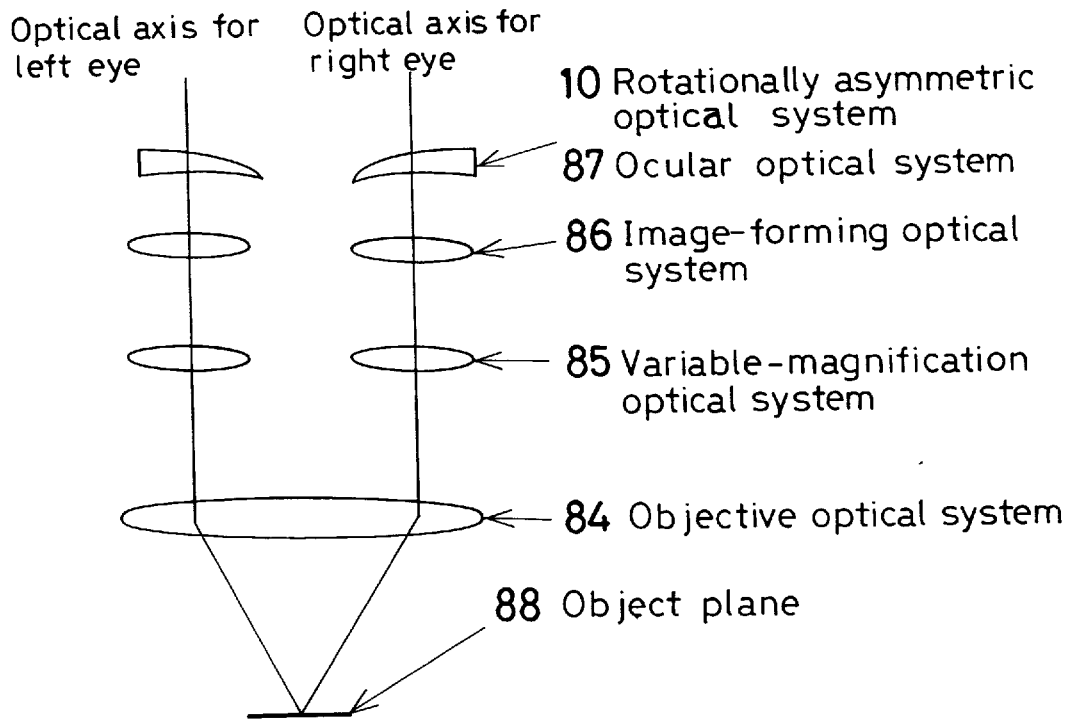
FIG. 91 illustrates an optical ray trace of Example 86 in which an optical system according to the present invention is used in an optical system of a binocular stereoscopic microscope.

In this example, as shown in FIG. 91, a decentered optical system 10 according to the present invention is used to constitute each of left and right ocular optical systems 87 in a binocular stereoscopic microscope such as that shown in FIG. 88 to correct decentration aberrations produced owing to the fact that the optical axes for left and right eyes are shifted rightwardly and leftwardly with respect to the optical axis of the objective optical system 84. As the decentered optical systems 10 in this example, refracting decentered optical systems such as those shown for example in FIGS. 1 to 4 are used. It is, of course, possible to use other types of decentered optical system having a reflecting surface.

EXAMPLE 87

Figure 92:
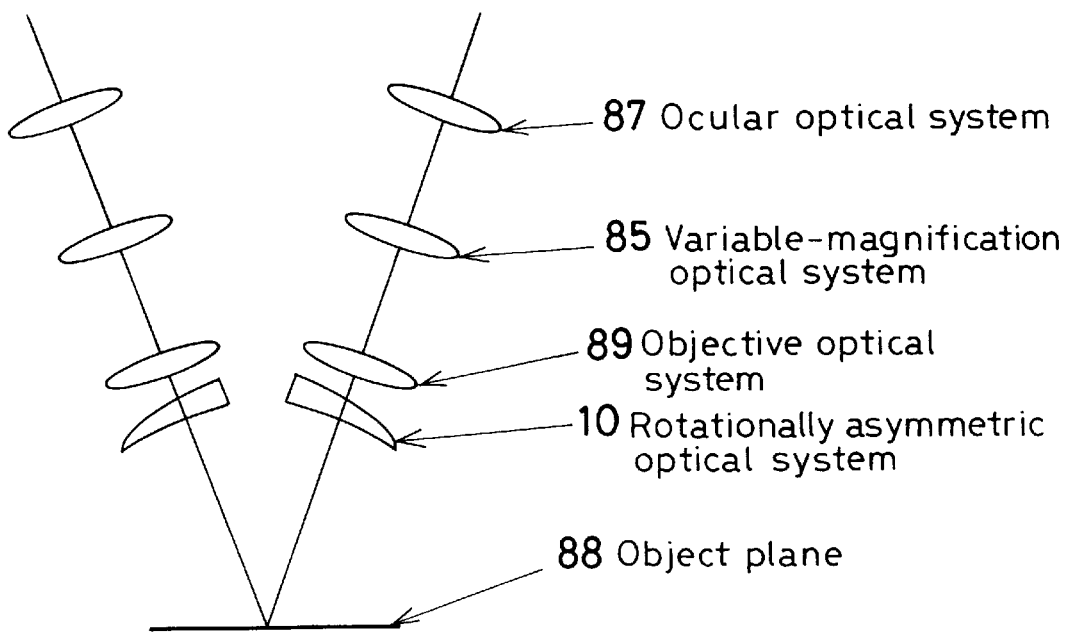
FIG. 92 illustrates an optical ray trace of Example 87 in which an optical system according to the present invention is used in an optical system of a binocular stereoscopic microscope.

In this example, as shown in FIG. 92, a decentered optical system 10 according to the present invention is applied to a binocular stereoscopic microscope having objective optical systems 89 for optical axes for left and right eyes, respectively, which form an angle with a common object plane 88. A decentered optical system 10 according to the present invention is disposed on the object side of each of the objective optical systems 89 to correct decentration aberrations produced owing to the fact that the left and right objective optical systems 89 are tilted with respect to the object plane 88. As the decentered optical systems 10 in this example, refracting decentered optical systems such as those shown for example in FIGS. 1 to 4 are used. It is, of course, possible to use other types of decentered optical system having a reflecting surface.

EXAMPLE 88

Figure 93:
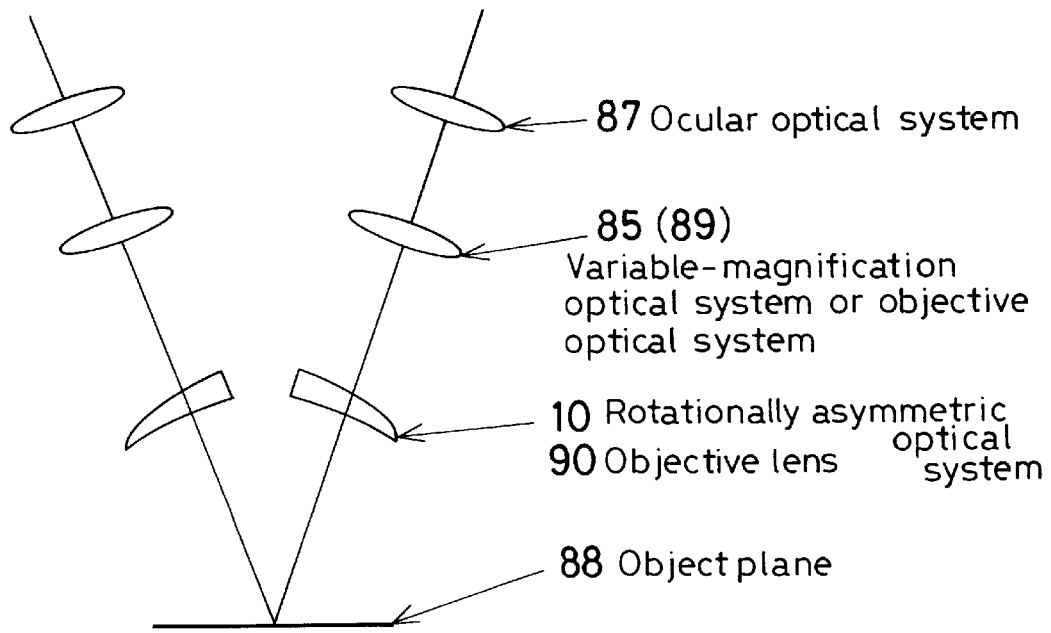
FIG. 93 illustrates an optical ray trace of Example 88 in which an optical system according to the present invention is used in an optical system of a binocular stereoscopic microscope.

In this example, as shown in FIG. 93, a decentered optical system 10 according to the present invention is used to constitute an objective lens 90 constituting a part or the whole of each of left and right objective optical systems 89 in a binocular stereoscopic microscope arranged as shown in FIG. 92 to correct decentration aberrations produced owing to the fact that the left and right objective optical systems 89 are tilted with respect to the object plane 88. As the decentered optical systems 10 in this example, refracting decentered optical systems such as those shown for example in FIGS. 1 to 4 are used. It is, of course, possible to use other types of decentered optical system having a reflecting surface.

EXAMPLE 89

Figure 94:
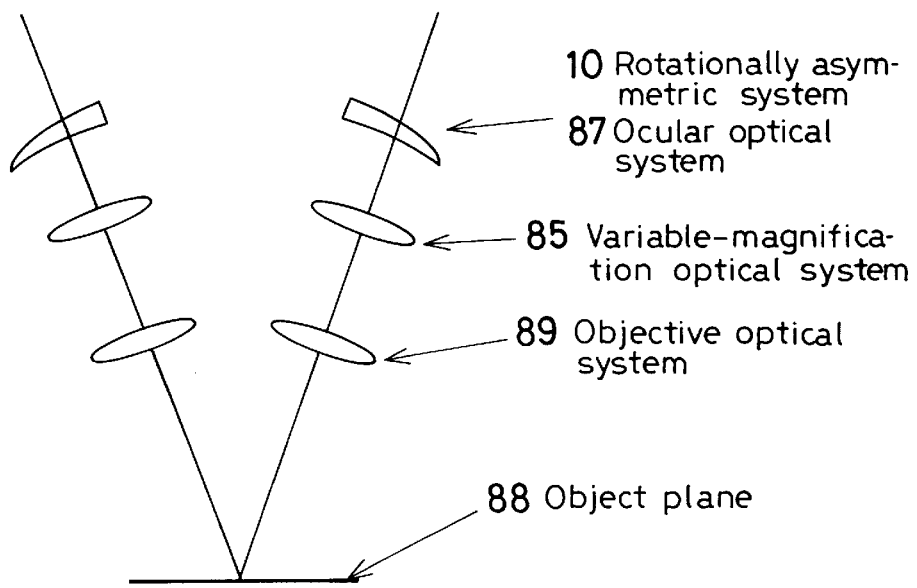
FIG. 94 illustrates an optical ray trace of Example 89 in which an optical system according to the present invention is used in an optical system of a binocular stereoscopic microscope.

In this example, as shown in FIG. 94, a decentered optical system 10 according to the present invention is used to constitute each of left and right ocular optical systems 87 in a binocular stereoscopic microscope arranged as shown in FIG. 92 to correct decentration aberrations produced owing to the fact that the left and right objective optical systems 89 are tilted with respect to the object plane 88. As the decentered optical systems 10 in this example, refracting decentered optical systems such as those shown for example in FIGS. 1 to 4 are used. It is, of course, possible to use other types of decentered optical system having a reflecting surface.

EXAMPLE 90

Figure 95:
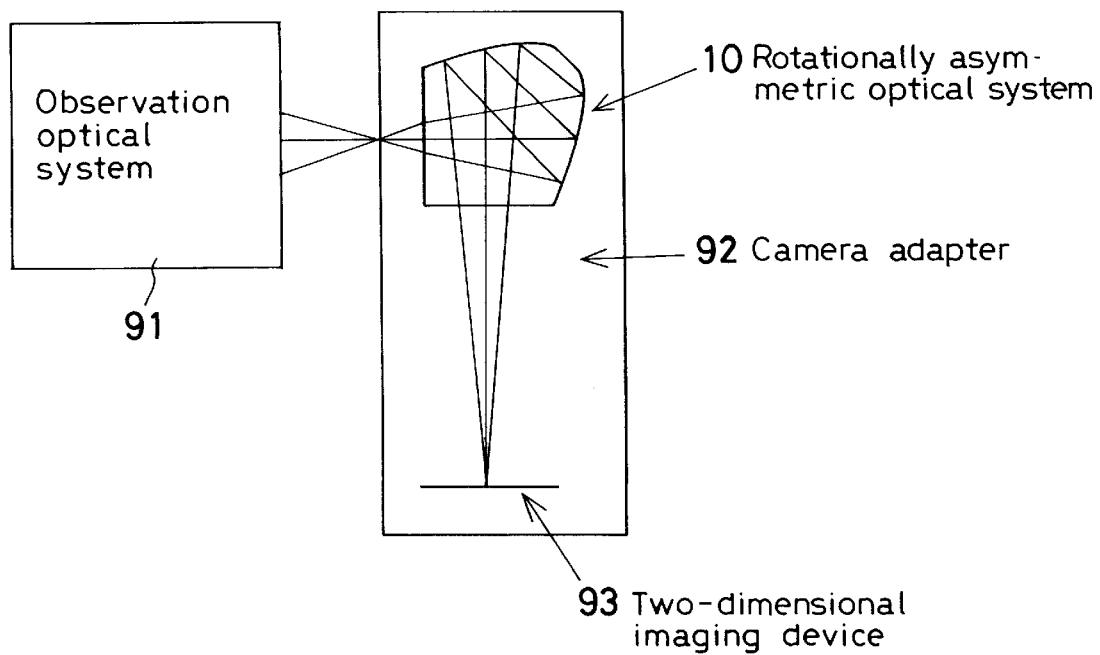
FIG. 95 illustrates an optical ray trace of Example 90 in which an optical system according to the present invention is used in a camera adapter for an endoscope.

In this example, a decentered optical system 10 according to the present invention is used in an optical system of an endoscope camera adapter which is attached to an ocular lens part of an endoscope, e.g. a soft endoscope, which has an ocular lens to project an endoscopic image onto an imaging device. As shown in FIG. 95, an endoscope has an observation optical system 91, and a camera adapter 92 is attached to the observation side of the observation optical system 91. In the camera adapter 92, a decentered optical system 10 according to the present invention, which is arranged in the form of a penta prism including at least one rotationally asymmetric surface having power, is disposed, and a two-dimensional imaging device 93 is disposed at the image plane of the decentered optical system 10.

EXAMPLE 91

Figure 96:
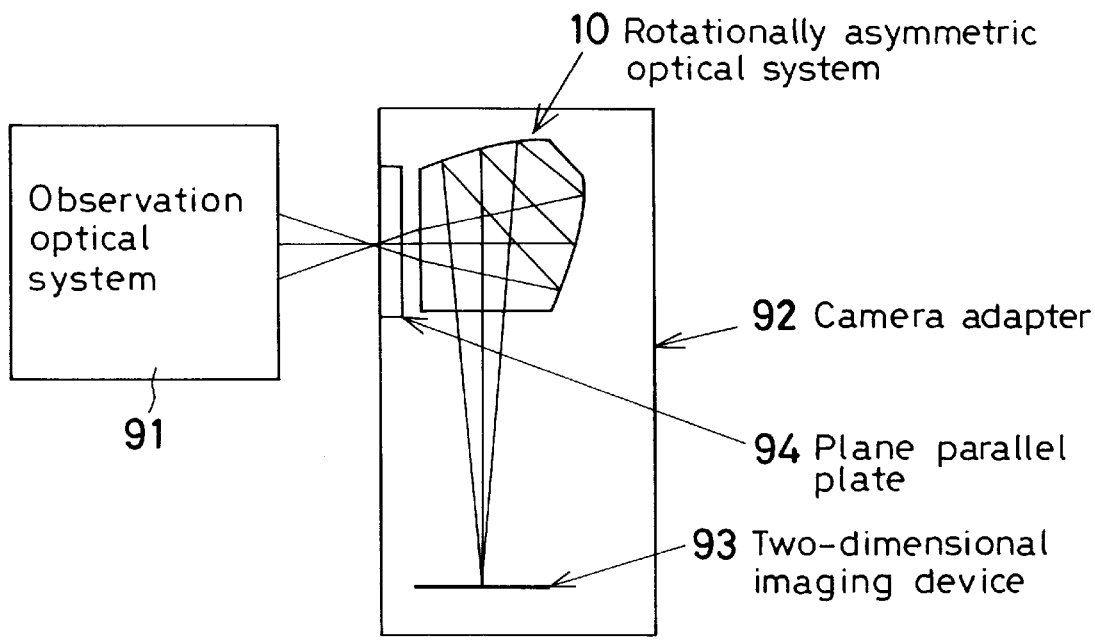
FIG. 96 illustrates an optical ray trace of Example 91 in which an optical system according to the present invention is used in a camera adapter for an endoscope.

In this example, as shown in FIG. 96, a plane-parallel plate 94 which serves as a protective glass is provided on the entrance side of a decentered optical system 10 in an endoscope camera adapter 92 arranged as shown in FIG. 95.

EXAMPLE 92

Figure 97:
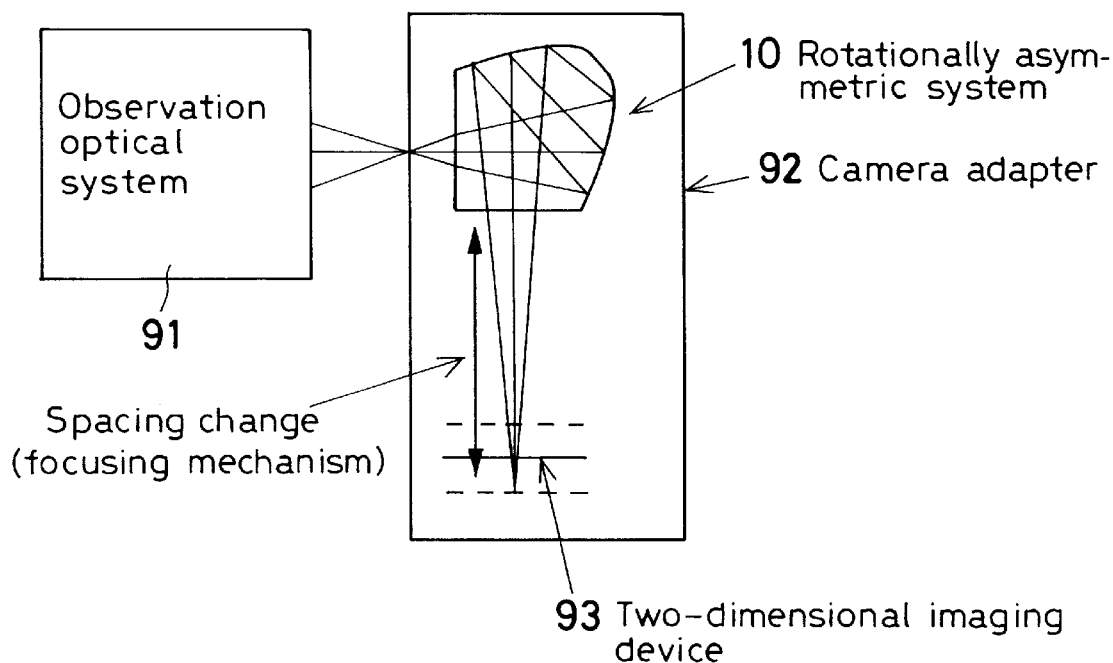
FIG. 97 illustrates an optical ray trace of Example 92 in which an optical system according to the present invention is used in a camera adapter for an endoscope.

In this example, as shown in FIG. 97, an endoscope camera adapter 92 arranged as shown in FIG. 95 is provided with a mechanism for adjusting the spacing between an image-forming decentered optical system 10 and a two-dimensional imaging device 93, thereby enabling focus adjustment.

EXAMPLE 93

Figure 98:
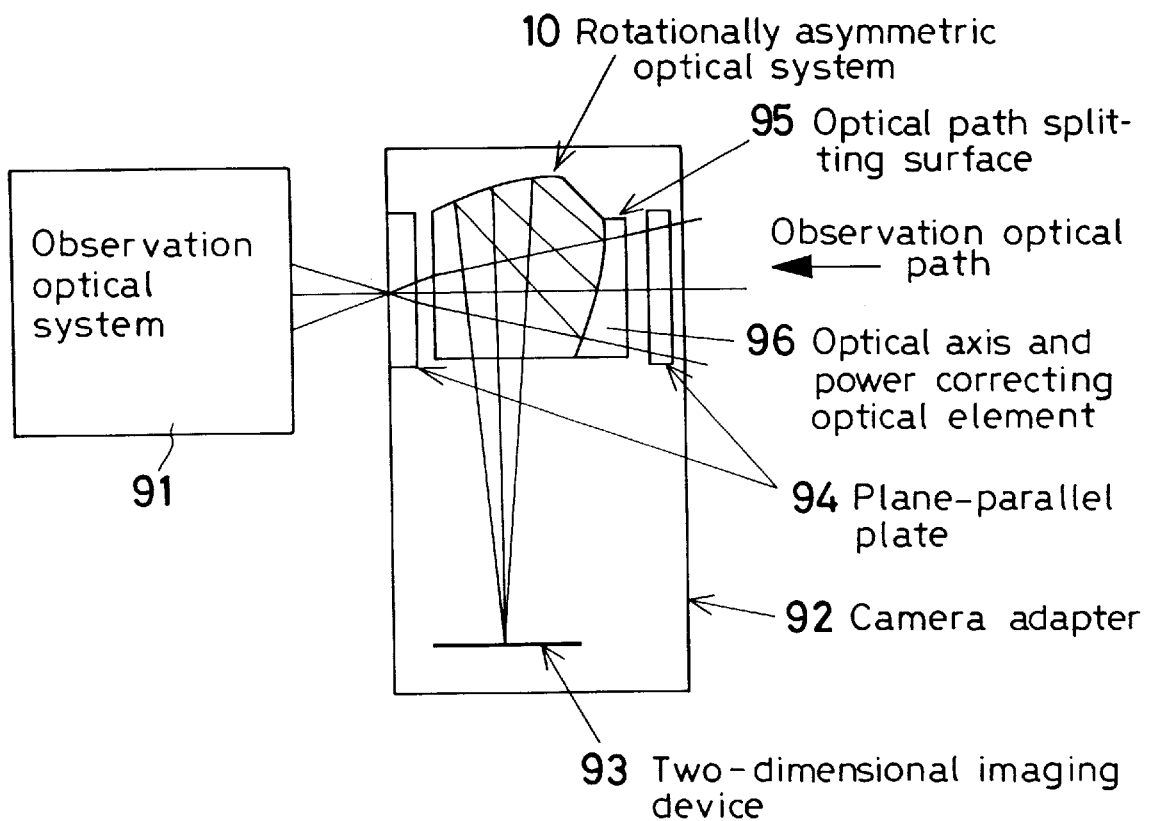
FIG. 98 illustrates an optical ray trace of Example 93 in which an optical system according to the present invention is used in a camera adapter for an endoscope.
Figure 99:
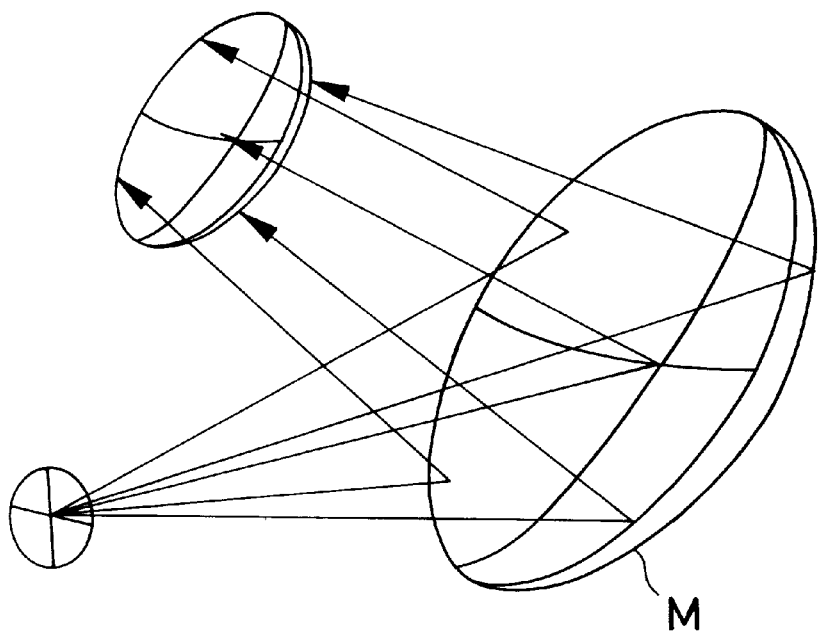
FIG. 99 shows curvature of field produced by a decentered concave mirror.
Figure 100:
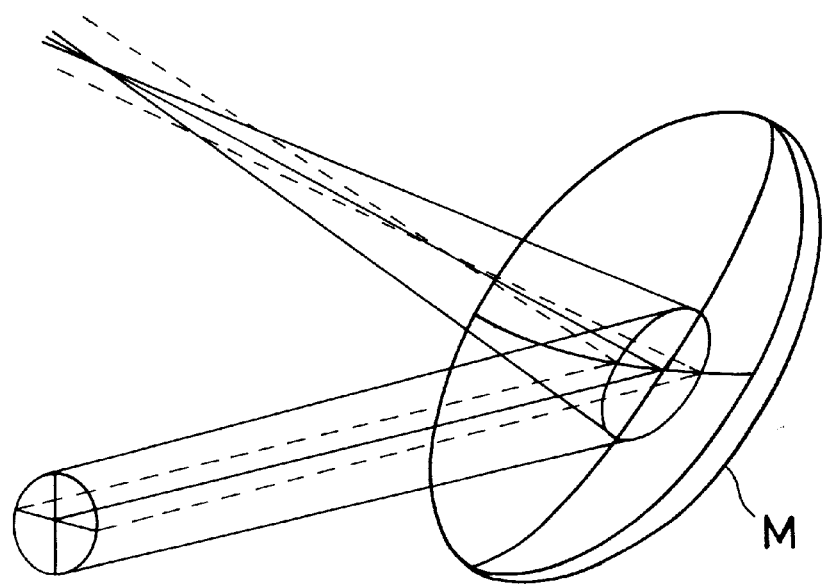
FIG. 100 shows axial astigmatism produced by a decentered concave mirror.
Figure 101:
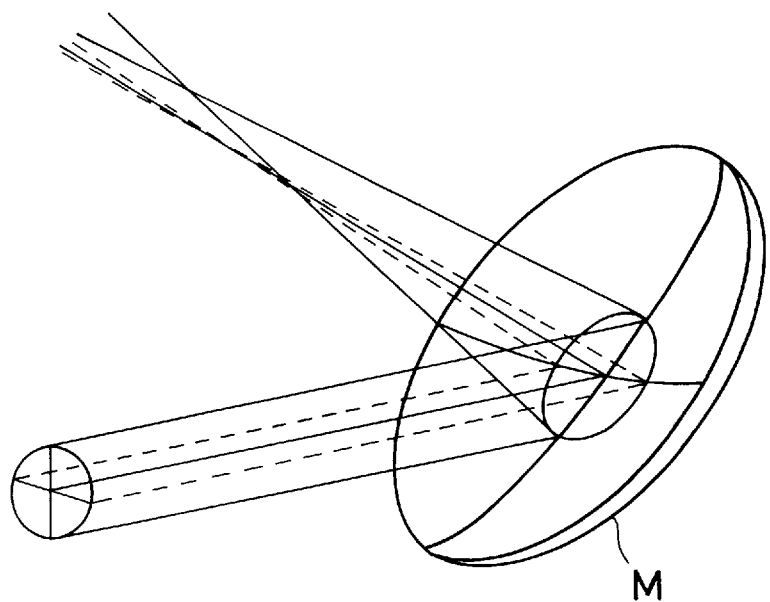
FIG. 101 shows axial coma produced by a decentered concave mirror.
Figure 102:
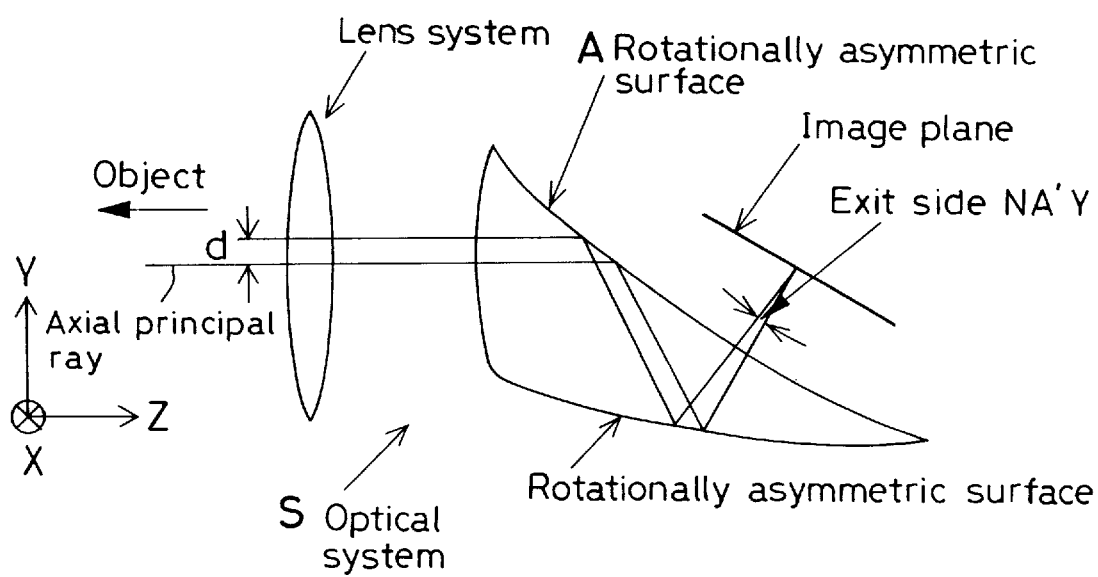
FIG. 102 is a diagram for describing a focal length in an optical system according to the present invention.

In this example, as shown in FIG. 98, an endoscope camera adapter 92 arranged as shown in FIG. 95 is modified such that the first reflecting surface of a penta prism, which constitutes the decentered optical system 10, is formed as an optical path splitting surface 95, e.g. a half-mirror, thereby enabling an endoscopic image to be directly observed simultaneously with imaging by the two-dimensional imaging device 93. In this example, an optical axis and power correcting optical element 96 is pasted on the optical path splitting surface 95, thereby making the observation direction approximately parallel to the optical axis of light rays entering the camera adapter 92 from the observation optical system 91.

In the foregoing, a description has been given of basic examples of decentered optical systems according to the present invention, examples relating to the arrangement of surfaces, and examples of application of the decentered optical systems to various optical elements and optical apparatuses. However, it should be noted that the present invention is not necessarily limited to these examples, and that various modifications may be imparted thereto.

The above-described optical systems according to the present invention may be arranged, for example, as follows:

[1] A decentered optical system comprising at least one rotationally asymmetric surface having no axis of rotational symmetry in nor out of the surface, wherein rotationally asymmetric aberrations due to decentration are corrected by the rotationally asymmetric surface.

[2] The optical system as set forth in [1], wherein the rotationally asymmetric surface is a plane-symmetry three-dimensional surface characterized by having only one plane of symmetry.

[3] The optical system as set forth in [2], wherein the plane of symmetry of said rotationally asymmetric surface is disposed in a plane approximately coincident with a decentration plane, which is a direction of decentration of each surface constituting the optical system.

[4] The optical system as set forth in any one of [1] to [3], wherein said rotationally asymmetric surface is used as a reflecting surface.

[5] The optical system as set forth in [4], wherein said reflecting surface is a surface having totally reflecting action or reflecting action.

[6] The optical system as set forth in [2] or [3], wherein said rotationally asymmetric surface having only one plane of symmetry is used as a back-coated mirror.

[7] The optical system as set forth in any one of [1] to [6], wherein, assuming that a light ray emanating from the center of an object point and passing through the center of a pupil to reach the center of an image is defined as a principal ray, said rotationally asymmetric surface is tilted with respect to said principal ray.

[8] The optical system as set forth in any one of [1] to [7], wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that said principal ray and a light ray which is parallel to said principal ray at a slight distance d in the X-axis direction are made to enter said optical system from an entrance side thereof, and the sine of an angle formed between said two rays as projected on the XZ-plane at an exit side of said optical system is denoted by NA'X, and further that a value obtained by dividing the distance d between said parallel rays by the NA'X is denoted by FX, and the focal length in the X-axis direction of that portion of said rotationally asymmetric surface on which the axial principal ray strikes is denoted by FXn, the following condition is satisfied:

$$-1000 < FX/FXn < 1000 \qquad (1\text{-}1)$$

[9] The optical system as set forth in [8], wherein said FX and FXn satisfy the following condition:

$$-100 < FX/FXn < 100 \qquad (1\text{-}2)$$

[10] The optical system as set forth in [8], wherein said FX and FXn satisfy the following condition:

$$-10 < FX/FXn < 10 \qquad (1\text{-}3)$$

[11] The optical system as set forth in any one of [1] to [10], wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the Y-axis direction are made to enter said optical system from the entrance surface side thereof, and the sine of an angle formed between said two rays in the YZ-plane at the exit side of said optical system is denoted by NA'Y, and further that a value obtained by dividing the distance d between said parallel rays by the NA'Y is denoted by FY, and the focal length in the Y-axis direction of that portion of said rotationally asymmetric surface on which the axial principal ray strikes is denoted by FYn, the following condition is satisfied:

$$-1000<FY/FYn<1000 \tag{2-1}$$

[12] The optical system as set forth in [11], wherein said FY and FYn satisfy the following condition:

$$-100<FY/FYn<100 \tag{2-2}$$

[13] The optical system as set forth in [11], wherein said FY and FYn satisfy the following condition:

$$-10<FY/FYn<10 \tag{2-3}$$

[14] The optical system as set forth in any one of [1] to [13], wherein, assuming that a light ray emanating from the center of an object point and passing through the center of a pupil to reach the center of an image is defined as a principal ray, and that a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further that the principal ray and a light ray which is parallel to the principal ray at a slight distance d in the X-axis direction are made to enter said optical system from an entrance side thereof, and the sine of an angle formed between said two rays as projected on the XZ-plane at an exit side of said optical system is denoted by NA'X, and a value obtained by dividing the distance d between said parallel rays by the NA'X is denoted by FX, and further that the principal ray and a light ray which is parallel to the principal ray at a slight distance d away from it in the Y-axis direction are made to enter said optical system from the entrance side thereof, and the sine of an angle formed between said two rays in the YZ-plane at the exit side of said optical system is denoted by NA'Y, and a value obtained by dividing the distance d between said parallel rays by the NA'Y is denoted by FY, the following condition is satisfied:

$$0.01<|FY/FX|<100 \tag{3-1}$$

[15] The optical system as set forth in [14], wherein said FX and FY satisfy the following condition:

$$0.1<|FY/FX|<10 \tag{3-2}$$

[16] The optical system as set forth in [14], wherein said FX and FY satisfy the following condition:

$$0.5<|FY/FX|<2 \tag{3-3}$$

[17] The optical system as set forth in any one of [1] to [16], which comprises only a first reflecting surface, wherein light rays are reflected by the first reflecting surface in a direction different from a direction in which the light rays are incident thereon.

[18] The optical system as set forth in any one of [1] to [16], which comprises a first reflecting surface and a first transmitting surface, wherein light rays enter the optical system through the first transmitting surface and are reflected by the first reflecting surface to exit from the optical system through the first transmitting surface in a direction different from a direction in which the light rays are incident on the first transmitting surface.

[19] The optical system as set forth in any one of [1] to [16], which comprises a first reflecting surface; a first transmitting surface, and a second transmitting surface, wherein light rays enter the optical system through the first transmitting surface and are reflected by the first reflecting surface to exit from the optical system through the second transmitting surface in a direction different from a direction in which the light rays are incident on the first transmitting surface.

[20] The optical system as set forth in any one of [1] to [16], which comprises a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface.

[21] The optical system as set forth in any one of [1] to [16], which comprises a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface.

[22] The optical system as set forth in [21], wherein an optical path of the optical system has portions intersecting each other.

[23] The optical system as set forth in [21], wherein an optical path of the optical system has no portions intersecting each other.

[24] The optical system as set forth in [21], wherein the first transmitting surface and the second reflecting surface are the identical surface.

[25] The optical system as set forth in [21], wherein the first reflecting surface and the second transmitting surface are the identical surface.

[26] The optical system as set forth in any one of [1] to [16], which comprises a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface.

[27] The optical system as set forth in [26], wherein the first transmitting surface and the second reflecting surface are the identical surface.

[28] The optical system as set forth in [26], wherein the first reflecting surface and the third reflecting surface are the identical surface.

[29] The optical system as set forth in [26], wherein the first transmitting surface and the third reflecting surface are the identical surface.

[30] The optical system as set forth in [26], wherein the second transmitting surface and the second reflecting surface are the identical surface.

[31] The optical system as set forth in any one of [1] to [16], which comprises at least a first reflecting surface, a second reflecting surface, a third reflecting surface, a fourth reflecting surface, a first transmitting surface, and a second transmitting surface, wherein light rays enter the optical system through the first transmitting surface and are reflected successively by the first, second, third and fourth reflecting surfaces to exit from the optical system through the second transmitting surface in a direction different from a direction in which the light rays are incident on the first transmitting surface.

[32] The optical system as set forth in [31], wherein the first transmitting surface and the second reflecting surface are the identical surface.

[33] The optical system as set forth in [31], wherein the second transmitting surface and the third reflecting surface are the identical surface.

[34] The optical system as set forth in [31], wherein the first reflecting surface and the third reflecting surface are the identical surface.

[35] The optical system as set forth in [31], wherein the second reflecting surface and the fourth reflecting surface are the identical surface.

[36] The optical system as set forth in [31], wherein the first transmitting surface, the second reflecting surface, and the fourth reflecting surface are the identical surface.

[37] The optical system as set forth in [31], wherein the first transmitting surface and the second reflecting surface are the identical surface, and wherein the first reflecting surface and the third reflecting surface are the identical surface.

[38] The optical system as set forth in [31], wherein the first transmitting surface and the second reflecting surface are the identical surface, and wherein the second transmitting surface and the third reflecting surface are the identical surface.

[39] The optical system as set forth in [31], wherein the first reflecting surface and the third reflecting surface are the identical surface, and wherein the second reflecting surface and the fourth reflecting surface are the identical surface.

[40] The optical system as set forth in [31], wherein the second reflecting surface and the fourth reflecting surface are the identical surface, and wherein the second transmitting surface and the third reflecting surface are the identical surface.

[41] The optical system as set forth in [31], wherein the first transmitting surface, the second reflecting surface, and the fourth reflecting surface are the identical surface, and wherein the second transmitting surface and the third reflecting surface are the identical surface.

[42] The optical system as set forth in [31], wherein the first transmitting surface, the second reflecting surface, and the fourth reflecting surface are the identical surface, and wherein the first reflecting surface and the third reflecting surface are the identical surface.

[43] The optical system as set forth in [31], wherein the first transmitting surface and the second reflecting surface are the identical surface, and wherein the second transmitting surface, the first reflecting surface, and the third reflecting surface are the identical surface.

[44] The optical system as set forth in [31], wherein the second reflecting surface and the fourth reflecting surface are the identical surface, and wherein the second transmitting surface, the first reflecting surface, and the third reflecting surface are the identical surface.

[45] The optical system as set forth in [31], wherein the first transmitting surface, the second reflecting surface, and the fourth reflecting surface are the identical surface, and wherein the second transmitting surface, the first reflecting surface, and the third reflecting surface are the identical surface.

[46] The optical system as set forth in any one of [1] to [45], wherein a rotationally asymmetric surface is first machined, and then a rotationally symmetric surface is machined.

[47] The optical system as set forth in any one of [1] to [45], which is produced by cementing together an optical component having at least one rotationally asymmetric surface machined thereon and an optical component having another surface machined thereon.

[48] The optical system as set forth in any one of [1] to [47], which is arranged as an ocular optical system having a folded optical path, wherein a reflecting surface constituting said folded optical path has power.

[49] The optical system as set forth in any one of [1] to [47], which is arranged as an image-forming optical system having a folded optical path, wherein a reflecting surface constituting said folded optical path has power.

[50] An optical system which is formed as an afocal optical system from a combination of the image-forming optical system of [49] and an ocular optical system.

[51] The optical system as set forth in [50], wherein said afocal optical system is arranged to obtain an erect image by an even number of reflections.

[52] An optical system which is formed as an afocal optical system from a combination of an image-forming optical system and the ocular optical system of [48].

[53] The optical system as set forth in [52], wherein said afocal optical system is arranged to obtain an erect image by an even number of reflections.

[54] An optical system which is formed as an afocal optical system from a combination of the image-forming optical system of [49] and the ocular optical system of [48].

[55] The optical system as set forth in [54], wherein said afocal optical system is arranged to obtain an erect image by an even number of reflections.

[56] The optical system as set forth in any one of [1] to [55], which is arranged as a camera optical system and provided as optical means in a camera.

[57] The optical system as set forth in [56], wherein said camera optical system is disposed in a real-image finder optical system of a camera.

[58] The optical system as set forth in [56], wherein said camera optical system is disposed in a virtual-image finder optical system of a camera.

[59] The optical system as set forth in [57] or [58], wherein said camera optical system is disposed in an objective lens system of a finder optical system.

[60] The optical system as set forth in [57] or [58], wherein said camera optical system is disposed in an ocular optical system of a finder optical system.

[61] The optical system as set forth in [59], wherein at least one lens whose refracting power is not zero is disposed on the object side of the objective lens system of said camera finder optical system, and said camera optical system is disposed on the observation side of the lens.

[62] The optical system as set forth in [59], wherein said camera optical system is disposed on the object side of the objective lens system of said camera finder optical system, and at least one lens whose refracting power is not zero is disposed on the observation side of said camera optical system.

[63] The optical system as set forth in [59], wherein the objective lens system of said camera finder optical system has: at least one lens whose refracting power is not zero, said lens being disposed on the object side; said camera optical system disposed on the observation side of said lens; and at least one lens whose refracting power is not zero, said lens being disposed on the observation side of said camera optical system.

[64] The optical system as set forth in [59], wherein the objective lens system of said camera finder optical system comprises two lens units, that is, said camera optical system, and a positive lens unit whose overall refracting power is greater than zero.

[65] The optical system as set forth in [59], wherein the objective lens system of said camera finder optical system comprises two lens units, that is, said camera optical system, and a negative lens unit whose overall refracting power is smaller than zero.

[66] The optical system as set forth in [64] or [65], wherein said objective lens system changes a magnification by varying a spacing between said camera optical system and said lens unit.

[67] The optical system as set forth in [59], wherein said objective lens system comprises three lens units, that is, said camera optical system, a positive lens unit whose overall refracting power is greater than zero, and a negative lens unit whose overall refracting power is smaller than zero.

[68] The optical system as set forth in [67]. wherein said objective lens system changes a magnification by varying a spacing between said camera optical system and said positive lens unit and a spacing between said positive lens unit and said negative lens unit.

[69] The optical system as set forth in [56], wherein said camera optical system is disposed in an indication-within-finder optical system of a real-image finder optical system having an objective lens system for forming an object image, and an ocular optical system for observing said object image, said indication-within-finder optical system being arranged to form an indication image different from said object image to display photographic information or the like.

[70] The optical system as set forth in [56], which has an objective lens system for forming an object image, imaging means for receiving the object image, and a distance-measuring part for measuring a displacement between said imaging means and an object image formation position which changes with the object distance, wherein said camera optical system is provided as optical means constituting said distance-measuring part.

[71] The optical system as set forth in [56], which has an objective lens system for forming an object image, imaging means for receiving the object image, and a photometer part for measuring an optimal value of an exposure to said imaging means which changes with the brightness of the object, wherein said camera optical system is provided as optical means constituting said photometer part.

[72] The optical system as set forth in [56], which has an objective lens system for forming an object image, imaging means for receiving the object image, a date display part for displaying an information image, e.g. a date of photo shooting, and an information image forming optical system for forming on said imaging means the information image displayed by said date display part, wherein said camera optical system is provided as said information image forming optical system.

[73] The optical system as set forth in [56], which has an objective lens system for forming an object image, and a silver halide film provided as imaging means for receiving the object image, wherein said camera optical system is provided as said objective lens system.

[74] The optical system as set forth in [56], which has an objective lens system for forming an object image, and an electronic imaging device provided as imaging means for receiving the object image, wherein said camera optical system is provided as said objective lens system.

[75] The optical system as set forth in [73] or [74], wherein said objective lens system has said camera optical system, and an antivibration optical system having the function of preventing formation of a blurred image, e.g. camera-shake, due to vibration.

[76] The optical system as set forth in [75], wherein said antivibration optical system is formed from a wedge-shaped prism.

[77] The optical system as set forth in [73] or [74], wherein said camera optical system provided in said objective lens system is arranged such that refracting power is variable.

[78] The optical system as set forth in [77], wherein said camera optical system has a first decentered optical system with a rotationally asymmetric curved surface whose refracting power varies in a first direction perpendicular to an optical axis, and a second decentered optical system with a rotationally asymmetric curved surface whose refracting power varies in a second direction perpendicular to both the optical axis and the first direction, so that refracting power of said camera optical system is changed by moving said first decentered optical system in said first direction, and/or moving said second decentered optical system in said second direction.

[79] The optical system as set forth in any one of [1] to [55], which is arranged as a converter lens.

[80] The optical system as set forth in any one of [1] to [55], which is disposed in optical means provided in binoculars.

[81] The optical system as set forth in [80], which is disposed in an objective lens system provided in binoculars.

[82] The optical system as set forth in [80], which is disposed in an ocular lens system provided in binoculars.

[83] The optical system as set forth in [80], which is disposed in each of an objective lens system and ocular lens system provided in binoculars.

[84] The optical system as set forth in any one of [1] to [55], which is disposed at an entrance surface and/or an exit surface of an image rotator.

[85] The optical system as set forth in any one of [1] to [55], which is disposed in optical means provided in a microscope.

[86] The optical system as set forth in [85], which is disposed in an objective optical system for a microscope.

[87] The optical system as set forth in [85], which is disposed in an ocular optical system for a microscope.

[88] The optical system as set forth in [85], which is disposed in an intermediate-image relay optical system for a microscope.

[89] The optical system as set forth in [85], which is disposed in an illumination system for a microscope.

[90] The optical system as set forth in [89], which is disposed in an incident-light illumination system for a microscope.

[91] The optical system as set forth in [89], which is disposed in a transmission illumination system for a microscope.

[92] The optical system as set forth in [85], which is disposed in a multi-discussion lens barrel for a microscope.

[93] The optical system as set forth in [85], which is disposed in an optical system of an image-drawing device for a microscope.

[94] The optical system as set forth in [85], which is disposed in an autofocus system for a microscope.

[95] The optical system as set forth in [85], which is disposed in a projection optical system for an inverted microscope.

[96] The optical system as set forth in any one of [1] [55], which is disposed in optical means provided in a binocular stereoscopic microscope having an optical axis for right eye and an optical axis for a left eye.

[97] The optical system as set forth in [96], wherein said binocular stereoscopic microscope has an objective lens system common to said optical axes for right and left eyes, said optical system being provided for each of said optical axes for right and left eyes in order to correct aberrations due to decentration which are produced by said objective lens system.

[98] The optical system as set forth in [97], which is provided in a variable-magnification optical system.

[99] The optical system as set forth in [97], which is provided in an image-forming optical system.

[100] The optical system as set forth in [97], which is provided in an ocular optical system.

[101] The optical system as set forth in [96], wherein said optical axes for right and left eyes are tilted with respect to an object plane, and two objective lens systems are provided for said two optical axes, respectively, said optical system being provided for each of said optical axes for right and left eyes to correct aberrations produced by said two objective lens systems.

[102] The optical system as set forth in [101], which is disposed closest to the object side on each of said right and left optical axes.

[103] The optical system as set forth in [101], which is disposed on the image side of each of said right and left objective lens systems.

[104] The optical system as set forth in any one of [1] to [55], which is disposed in optical means provided in an endoscope.

[105] The optical system as set forth in [104], wherein said endoscope uses an imaging device.

[106] The optical system as set forth in [104], which is used in an endoscope objective optical system.

[107] The optical system as set forth in [106], wherein a protective transparent plate is disposed on the object side of said optical system.

[108] The optical system as set forth in [106], wherein an object-side surface of said optical system is a plane surface.

[109] The optical system as set forth in [106], wherein an image-side surface of said optical system is a plane surface.

[110] The optical system as set forth in [109], wherein the image-side surface of said optical system is placed in close contact with an imaging device.

[111] The optical system as set forth in [104], wherein an optical fiber bundle is disposed at an image-formation plane of said optical system separately from said optical system.

[112] The optical system as set forth in [104], wherein an optical fiber bundle is placed in close contact with an image-side surface of said optical system.

[113] The optical system as set forth in [111], wherein an object-side surface of said optical system is formed from a protective transparent plate.

[114] The optical system as set forth in [111], wherein an object-side surface of said optical system is a plane surface.

[115] The optical system as set forth in [104], wherein a first surface in a distal end part of the endoscope is made of glass or a crystalline material, e.g. sapphire.

[116] The optical system as set forth in [104], wherein a first surface of the endoscope objective optical system is recessed from an enclosure of the endoscope.

[117] The optical system as set forth in [104], wherein a first surface of the endoscope objective optical system projects from an enclosure of the endoscope.

[118] The optical system as set forth in any one of [1] to [55], which is disposed in a camera adapter for an endoscope to project an observation image onto an imaging device through said optical system.

[119] The optical system as set forth in [118], wherein a plane glass plate is provided in front of or behind said optical system.

[120] The optical system as set forth in [118], which has means for varying a spacing between said optical system and another optical system or an image-formation plane.

[121] The optical system as set forth in [118], wherein a sum total of reflections taking place in said optical system and another optical system is an even number.

[122] The optical system as set forth in [118], wherein said camera adapter for an endoscope comprises an optical system in which a sum total of reflections is an odd number, and an electrically image-inverting circuit.

[123] The optical system as set forth in [118], wherein said camera adapter for an endoscope has a semitransparent reflecting surface to divide an optical path into two.

[124] The optical system as set forth in [118], wherein an observation optical path for an observer is approximately parallel to an optical axis of light rays entering said endoscope camera adapter from an observation optical system.

As will be clear from the foregoing description, the present invention provides an optical system which is compact and has minimal aberrations in comparison to rotationally symmetric transmission optical systems.

What is claimed is:

1. A microscope comprising:
an optical system provided in said microscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
wherein said optical system comprises a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface.

2. A microscope comprising:
an optical system provided in said microscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface,
wherein said optical system comprises a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface, and
wherein the first reflecting surface and the second transmitting surface are portions of single surface.

3. The microscope as set forth in claim 2, wherein said light rays define an optical path in said optical system, said optical path having intersecting portions.

4. The microscope as set forth in claim 2, wherein said light rays define an optical path in said optical system, said optical path being without intersecting portions.

5. The microscope as set forth in claim 2, wherein the first transmitting surface and the second reflecting surface are portions of a single surface.

6. A microscope comprising:

an optical system provided in said microscope;

wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and wherein said optical system comprises a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface.

7. The microscope as set forth in claim 6, wherein the first transmitting surface and the second reflecting surface are portions of a single surface.

8. The microscope as set forth in claim 6, wherein the first reflection surface and the third reflection surface are portions of a single surface.

9. The microscope as set forth in claim 6, wherein the first transmitting surface and the third reflecting surface are portions of a single surface.

10. The microscope as set forth in claim 6, wherein the second transmitting surface and the second reflecting surface are portions of a single surface.

11. A microscope comprising:

an optical system provided in said microscope;

wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and wherein said optical system comprises at least a first reflecting surface, a second reflecting surface, a third reflecting surface, a fourth reflecting surface, a first transmitting surface, and a second transmitting surface, wherein light rays enter the optical system through the first transmitting surface and are reflected successively by the first, second, third and fourth reflecting surfaces to exit from the optical system through the second transmitting surface in a direction different from a direction in which the light rays are incident on the first transmitting surface.

12. The microscope as set forth in claim 1, 2, 6 or 11, wherein the rotationally asymmetric surface is a plane-symmetric three-dimensional surface having only one plane of symmetry.

13. The microscope as set forth in claim 12, wherein a plane of symmetry of said rotationally asymmetric surface is disposed in a plane approximately coincident with a decentration plane, which is a direction of decentration of each surface constituting the optical system.

14. The microscope as set forth in claim 1, 2, 6 or 11, wherein said rotationally asymmetric surface is a reflecting surface.

15. The microscope as set forth in claim 14, wherein said reflecting surface is a surface having totally reflecting action.

16. The microscope as set forth in claim 12, wherein said rotationally asymmetric surface having only one plane of symmetry is a back-coated mirror.

17. The microscope as set forth in claim 1, 2, 6 or 11, wherein said rotationally asymmetric surface is tilted with respect to a principal ray which is a light ray emanating from a center of an object point and passing through a center of a pupil to reach a center of an image.

18. The microscope as set forth in claim 1, 2, 6 or 11, wherein a light ray emanating from the center of an object point and passing through the center of a pupil to reach the center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter said optical system from an entrance side thereof, and the sine of an angle formed between said two rays as projected on the XZ-plane at an exit side of said optical system is denoted by NA'X, and further that a value obtained by dividing the distance d between said parallel rays by the NA'X is denoted by FX, and the focal length in the X-axis direction of a portion of said rotationally asymmetric surface on which the axial principal ray strikes is denoted by FXn, the following condition is satisfied:

$$-1000 < FX/FXn < 1000.$$

19. The microscope as set forth in claim 1, 2, 6 or 11, wherein a light ray emanating from the center of an object point and passing through the center of a pupil to reach the center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the Y-axis direction are made to enter said optical system from the entrance side thereof, and the sine of an angle formed between said two rays in the YZ-plane at the exit side of said optical system is denoted by NA'Y, and further a value obtained by dividing the distance d between said parallel rays by the NA'Y is denoted by FY, and the focal length in the Y-axis direction of a portion of said rotationally asymmetric surface on which the axial principal ray strikes is denoted by FYn, the following condition is satisfied:

$$-1000 < FY/FYn < 1000.$$

20. The microscope as set forth in claim 1, 2, 6 or 11, wherein a light ray emanating from the center of an object point and passing through the center of a pupil to reach the center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter said optical system from an entrance side thereof, and the sine of an angle formed between said two rays as projected on the XZ-plane at the exit side of said optical system is denoted by NA'X, and a value obtained by dividing the distance d between said parallel rays by the NA'X is denoted by FX, and further the principal ray and a light ray which is parallel to the principal ray at a distance d away from it in the Y-axis direction are made to enter said optical system from the entrance side thereof, and the sine of an angle formed between said two rays in the YZ-plane at the exit side of said optical system is denoted by NA'Y, and a value obtained by dividing the distance d between said parallel rays by the NA'Y is denoted by FY, the following condition is satisfied:

0.01<|FY/FX|<100.

21. The microscope as set forth in claim 11, wherein the first transmitting surface and the second reflecting surface are portions of a single surface.

22. The microscope as set forth in claim 11, wherein the second transmitting surface and the third reflecting surface are portions of a single surface.

23. The microscope as set forth in claim 11, wherein the first reflecting surface and the third reflecting surface are portions of a single surface.

24. The microscope as set forth in claim 11, wherein the second reflecting surface and the fourth reflecting surface are portions of a single surface.

25. The microscope as set forth in claim 11, wherein the first transmitting surface, the second reflecting surface, and the fourth reflecting surface are portions of a single surface.

26. The microscope as set forth in claim 11, wherein the first transmitting surface and the second reflecting surface are portions of a single surface, and wherein the first reflecting surface and the third reflecting surface are portions of a single surface.

27. The microscope as set forth in claim 11, wherein the first transmitting surface and the second reflecting surface are portions of a single surface, and wherein the second transmitting surface and the third reflecting surface are portions of a single surface.

28. The microscope as set forth in claim 11, wherein the first reflecting surface and the third reflecting surface are portions of a single surface, and wherein the second reflecting surface and the fourth reflecting surface are portions of a single surface.

29. The microscope as set forth in claim 11, wherein the second reflecting surface and the fourth reflecting surface are portions of a single surface, and wherein the second transmitting surface and the third reflecting surface are portions of a single surface.

30. The microscope as set forth in claim 11, wherein the first transmitting surface, the second reflecting surface, and the fourth reflecting surface are portions of a single surface, and wherein the second transmitting surface and the third reflecting surface are portions of a single surface.

31. The microscope as set forth in claim 11, wherein the first transmitting surface, the second reflecting surface, and the fourth reflecting surface are portions of a single surface, and wherein the first reflecting surface and the third reflecting surface are portions of a single surface.

32. The microscope as set forth in claim 11, wherein the first transmitting surface and the second reflecting surface are portions of a single surface, and wherein the second transmitting surface, the first reflecting surface, and the third reflecting surface are portions of a single surface.

33. The microscope as set forth in claim 11, wherein the second reflecting surface and the forth reflecting surface are portions of a single surface, and wherein the second transmitting surface, the first reflecting surface, and the third reflecting surface are portions of a single surface.

34. The microscope as set forth in claim 11, wherein the first transmitting surface, the second reflecting surface, and the fourth reflecting surface are portions of a single surface, and wherein the second transmitting surface, the first reflecting surface, and the third reflecting surface are portions of a single surface.

35. The microscope as set forth in claim 1, 2, 6 or 11, wherein said optical system is disposed in an objective optical system of said microscope.

36. The microscope as set forth in claim 35, wherein said objective optical system has a reflecting surface forming a folded optical path, and wherein said reflecting surface forming said folded optical path has power.

37. The microscope as set forth in claim 36, further comprising an ocular optical system for observing an image formed by said objective optical system, a combination of the objective optical system and the ocular optical system forms an afocal optical system.

38. The microscope as set forth in claim 37, wherein said afocal optical system is arranged to obtain an erect image by an even number of reflections.

39. The microscope as set forth in claim 1, 2, 6 or 11, wherein said optical system is disposed in an ocular optical system for said microscope.

40. The microscope as set forth in claim 39, wherein said ocular optical system has a reflecting surface for forming a folded optical path, and wherein said reflecting surface forming said folded optical path has power.

41. The microscope as set forth in claim 40, further comprising an objective optical system for observing an image formed by said ocular optical system, wherein a combination of the objective optical system and the ocular optical system forms an afocal optical system.

42. The microscope as set forth in claim 41, wherein said afocal optical system is arranged to obtain an erect image by an even number of reflections.

43. The microscope as set forth in claim 1, 2, 6 or 11, wherein said optical system is disposed in an intermediate-image relay optical system for said microscope.

44. The microscope as set forth in claim 1, 2, 6 or 11, wherein said optical system is disposed in an illumination system for said microscope.

45. The microscope as set forth in claim 1, 2, 6 or 11, wherein said optical system is disposed in an incident-light illumination system for microscope.

46. The microscope as set forth in claim 1, 2, 6 or 11, wherein said optical system is disposed in a transmission illumination system for said microscope.

47. The microscope as set forth in claim 1, 2, 6 or 11, wherein said optical system is disposed in a multi-discussion lens barrel for said microscope.

48. The microscope as set forth in claim 1, 2, 6 or 11, wherein said optical system is disposed in an optical system of an image-drawing device for said microscope.

49. The microscope as set forth in claim 1, 2, 6 or 11, wherein said optical system is disposed in an autofocus system for said microscope.

50. The microscope as set forth in claim 1, 2, 6 or 11, wherein said optical system is disposed in a projection optical system for said microscope.

51. The microscope as set forth in claim 1, 2, 6 or 11, wherein said optical system is disposed in optical means provided in a binocular stereoscopic microscope having an optical axis for a right eye and an optical axis for a left eye.

52. The microscope as set forth in claim 51, wherein said binocular stereoscopic microscope has an objective lens system common to said optical axes for said right and left eyes, said optical system being provided for each of said optical axes for said right eye and said left eye in order to correct aberrations due to decentration which are produced by said objective lens system.

53. The microscope as set forth in claim 51, wherein said optical axes for said right eye and said left eye are tilted with respect to an object plane, and two objective lens systems are provided for said two optical axes, respectively, said optical system being provided for each of said optical axes for said right and left eyes to correct aberrations produced by said two objective lens systems.

54. The microscope as set forth in claim 51, wherein said optical system is disposed closest to an object side on each of said right and left optical axes.

55. An endoscope comprising:
an optical system provided in said endoscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
wherein said optical system comprises a first reflecting surface, a second reflecting surface, and a first transmitting surface, wherein light rays enter the optical system through the first transmitting surface and are reflected by the first reflecting surface and then reflected by the second reflecting surface to exit from the optical system through the first transmitting surface.

56. An endoscope, comprising:
an optical system provided in said endoscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface,
wherein said optical system comprises a first reflecting surface, a second reflecting surface, a first transmitting surface, and a second transmitting surface, wherein light rays enter the optical system through the first transmitting surface and are reflected by the first reflecting surface and then reflected by the second reflecting surface to exit from the optical system through the second transmitting surface, and
wherein the first reflecting surface and the second transmitting surface are portions of a single surface.

57. The endoscope as set forth in claim 56, wherein said light rays define an optical path in said optical system, said optical path having intersecting portions.

58. The endoscope as set forth in claim 56, wherein said light rays define an optical path in said optical system, said optical path being without intersecting portions.

59. The endoscope as set forth in claim 56, wherein the first transmitting surface and the second reflecting surface are portions of a single surface.

60. An endoscope comprising:
an optical system provided in said endoscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
wherein said optical system comprises a first reflecting surface, a second reflecting surface, a third reflecting surface, a first transmitting surface, and a second transmitting surface, wherein light rays enter the optical system through the first transmitting surface and are reflected successively by the first, second and third reflecting surfaces to exit from the optical system through the second transmitting surface in a direction different from a direction in which the light rays are incident on the first transmitting surface.

61. The endoscope as set forth in claim 60, wherein the first transmitting surface and the second reflecting surface are portions of a single surface.

62. The endoscope as set forth in claim 60, wherein the first reflection surface and the third reflection surface are portions of a single surface.

63. The endoscope as set forth in claim 60, wherein the first transmitting surface and the third reflecting surface are portions of a single surface.

64. The endoscope as set forth in claim 60, wherein the second transmitting surface and the second reflecting surface are portions of a single surface.

65. An endoscope comprising:
an optical system provided in said endoscope;
wherein said optical system has at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
wherein, said optical system comprises at least a first reflecting surface, a second reflecting surface, a third reflecting surface, a fourth reflecting surface, a first transmitting surface, and a second transmitting surface, wherein light rays enter the optical system through the first transmitting surface and are reflected successively by the first, second, third and fourth reflecting surfaces to exit from the optical system through the second transmitting surface in a direction different from a direction in which the light rays are incident on the first transmitting surface.

66. The endoscope as set forth in claim 55, 56, 60 or 65, wherein the rotationally asymmetric surface is a plane-symmetric three-dimensional surface having only one plane of symmetry.

67. The endoscope as set forth in claim 66, wherein a plane of symmetry of said rotationally asymmetric surface is disposed in a plane approximately coincident with a decentration plane, and a direction of decentration of each surface constituting the optical system is in said decentration plane.

68. The endoscope as set forth in claim 55, 56, 60 or 65, wherein said rotationally asymmetric surface is a reflecting surface.

69. The endoscope as set forth in claim 68, wherein said reflecting surface is a surface having totally reflecting action.

70. The endoscope as set forth in claim 66, wherein said rotationally asymmetric surface having only one plane of symmetry is used as a back-coated mirror.

71. The endoscope as set forth in claim 55, 56, 60 or 65, wherein said rotationally asymmetric surface is tilted with respect to a principal ray which is a light ray emanating from a center of an object point and passing through a center of a pupil to reach a center of an image.

72. The endoscope as set forth in claim 55, 56, 60 or 65, wherein a light ray emanating from a center of an object point and passing through a center of a pupil to reach a center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter said optical system from an entrance side thereof, and the sine of an angle formed between said two rays as projected on the XZ-plane at an exit side of said optical system is denoted by NA'X, and further a value obtained by dividing the distance d between said parallel rays by the NA'X is denoted by FX, and the focal length in the X-axis direction of a portion of said rotationally asymmetric surface on which the axial principal ray strikes is denoted by FXn, the following condition is satisfied:

$$-1000 < FX/FXn < 1000.$$

73. The endoscope as set forth in claim 55, 56, 60 or 65, wherein a light ray emanating from the center of an object point and passing through the center of a pupil to reach the center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the Y-axis direction are made to enter said optical system from the entrance side thereof, and the sine of an angle formed between said two rays in the YZ-plane at the exit side of said optical system is denoted by NA'Y, and further a value obtained by dividing the distance d between said parallel rays by the NA'Y is denoted by FY, and the focal length in the Y-axis direction of a portion of said rotationally asymmetric surface on which the axial principal ray strikes is denoted by FYn, the following condition is satisfied:

$$1000 < FY/FYn < 1000.$$

74. The endoscope as set forth in claim 55, 56, 60 or 65, wherein a light ray emanating from a center of an object point and passing through a center of a pupil to reach a center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter said optical system from an entrance side thereof, and the sine of an angle formed between said two rays as projected on the XZ-plane at the exit side of said optical system is denoted by NA'X, and a value obtained by dividing the distance d between said parallel rays by the NA'X is denoted by FX, and further the principal ray and a light ray which is parallel to the principal ray at a distance d away from it in the Y-axis direction are made to enter said optical system from the entrance side thereof, and the sine of an angle formed between said two rays in the YZ-plane at the exit side of said optical system is denoted by NA'Y, and a value obtained by dividing the distance d between said parallel rays by the NA'Y is denoted by FY, the following condition is satisfied:

$$0.01 < |FY/FX| < 100.$$

75. The endoscope as set forth in claim 65, wherein the first transmitting surface and the second reflecting surface are portions of a single surface.

76. The endoscope as set forth in claim 65, wherein the second transmitting surface and the third reflecting surface are portions of a single surface.

77. The endoscope as set forth in claim 65, wherein the first reflecting surface and the third reflecting surface are portions of a single surface.

78. The endoscope as set forth in claim 65, wherein the second reflecting surface and the fourth reflecting surface are portions of a single surface.

79. The endoscope as set forth in claim 65, wherein the first transmitting surface, the second reflecting surface, and the fourth reflecting surface are portions of a single surface.

80. The endoscope as set forth in claim 65, wherein the first transmitting surface and the second reflecting surface are portions of a single surface, and wherein the first reflecting surface and the third reflecting surface are portions of a single surface.

81. The endoscope as set forth in claim 65, wherein the first transmitting surface and the second reflecting surface are portions of a single surface, and wherein the second transmitting surface and the third reflecting surface are portions of a single surface.

82. The endoscope as set forth in claim 65, wherein the first reflecting surface and the third reflecting surface are an identical surface, and wherein the second reflecting surface and the fourth reflecting surface are portions of a single surface.

83. The endoscope as set forth in claim 65, wherein the second reflecting surface and the fourth reflecting surface are portions of a single surface, and wherein the second transmitting surface and the third reflecting surface are portions of a single surface.

84. The endoscope as set forth in claim 65, wherein the first transmitting surface, the second reflecting surface, and the fourth reflecting surface are portions of a single surface, and wherein the second transmitting surface and the third reflecting surface are portions of a single surface.

85. The endoscope as set forth in claim 65, wherein the first transmitting surface, the second reflecting surface, and the fourth reflecting surface are portions of a single surface, and wherein the first reflecting surface and the third reflecting surface are portions of a single surface.

86. The endoscope as set forth in claim 65, wherein the first transmitting surface and the second reflecting surface are an identical surface, and wherein the second transmitting surface, the first reflecting surface, and the third reflecting surface are portions of a single surface.

87. The endoscope as set forth in claim 65, wherein the second reflecting surface and the forth reflecting surface are an identical surface, and wherein the second transmitting surface, the first reflecting surface, and the third reflecting surface are portions of a single surface.

88. The endoscope as set forth in claim 65, wherein the first transmitting surface, the second reflecting surface, and the fourth reflecting surface are portions of a single surface, and wherein the second transmitting surface, the first reflecting surface, and the third reflecting surface are portions of a single surface.

89. The endoscope as set forth in claim 55, 56, 60 or 65, wherein said optical system is disposed in an endoscope objective optical system.

90. The endoscope as set forth in claim 89, wherein an imaging device is disposed at an image plain formed by said objective optical system.

91. The endoscope as set forth in claim 89, wherein said objective optical system has a reflecting surface forming a folded optical path, and wherein said reflecting surface forming said folded optical path has power.

92. The endoscope as set forth in claim 89, wherein a protective transparent plate is disposed on an object side of said optical system.

93. The endoscope as set forth in claim 89, wherein an object-side surface of said optical system is a plane surface.

94. The endoscope as set forth in claim 89, wherein an image-side surface of said optical system is a plane surface.

95. The endoscope as set forth in claim 94, wherein the image-side surface of said optical system is placed in close contact with an imaging device.

96. The endoscope as set forth in claim 89, wherein an optical fiber bundle is disposed at an image-formation plane of said objective optical system separately from said optical system.

97. The endoscope as set forth in claim 89, wherein an optical fiber bundle is disposed at an image-formation plane of said objective optical system separately from said optical system, the closest plane to said image-formation plane of said objective optical contacts said optical fiber bundle.

98. The endoscope as set forth in claim 96, wherein an object-side surface of said objective optical system is formed from a protective transparent plate.

99. The endoscope as set forth in claim 96, wherein an object-side surface of said objective system is a plane surface.

100. The endoscope as set forth in claim 89, wherein a first surface in a distal end part of the endoscope is made of one of glass and a crystalline material.

101. The endoscope as set forth in claim 89, wherein a first surface of the endoscope objective optical system is recessed from an enclosure of the endoscope.

102. The endoscope as set forth in claim 89, wherein a first surface of the endoscope objective optical system projects from an enclosure of the endoscope.

103. The endoscope as set forth in claim 55, 56, 60 or 65, further comprising a camera adapter having an imaging device, wherein said optical system is disposed in said camera adapter to project an observation image onto said imaging device through said optical system.

104. The endoscope as set forth in claim 103, wherein a plane glass plate is provided in front of or behind said optical system.

105. The endoscope as set forth in claim 103, further comprising means for varying a spacing between said optical system and an image-formation plane.

106. The endoscope as set forth in claim 103, wherein said camera adapter comprises a second optical system in addition to the first-mentioned optical system, and said endoscope has means for varying a spacing between the first-mentioned optical system and said second optical system.

107. The endoscope as set forth in claim 103, wherein said camera adapter comprises a second optical system in addition to the first-mentioned optical system, wherein a sum total of reflections taking place in the first-mentioned optical system and said second optical system is an even number.

108. The endoscope as set forth in claim 103, wherein said camera adapter for said endoscope comprises an optical system in which a sum total of reflection is an odd number, and an electrically image-inverting circuit.

109. The endoscope as set forth in claim 103, wherein said camera adapter for said endoscope has a semitransparent reflecting surface to divide an optical path into two.

110. The endoscope as set forth in claim 103, wherein an observation optical path of an observer is approximately parallel to an optical axis of light rays entering said endoscope camera adapter from an observation optical system.

111. The endoscope as set forth in claim 100, wherein said crystalline material is sapphire.

112. A pair of binoculars comprising:
 a right eye objective lens system and a left eye objective lens system, both said objective lens systems being provided in the binoculars;
 said left eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
 said right eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface,
 wherein the rotationally asymmetric surface is a plane-symmetric three-dimensional surface having only one plane of symmetry, and
 wherein said left eye objective lens system and said right eye objective lens system each comprises a first reflecting surface, a second reflecting surface, and a first transmitting surface, wherein light rays enter each said objective lens system through the corresponding first transmitting surface and are reflected by the corresponding first reflecting surface and then reflected by the corresponding second reflecting surface to exit from each said objective lens system through the corresponding first transmitting surface.

113. A pair of binoculars comprising:
 a right eye ocular lens system and a left eye ocular lens system, both said ocular lens systems being provided in the binoculars;
 said left eye ocular lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and
 said right eye ocular lens system having at least an optical surface for one of transmitting rays and reflecting light rays, said optical surface having a curved shape, said curved surface having no axis of rotational symmetry into or out of said optical surface, wherein rotationally asymmetric aberrations due to decentration are corrected by the rotationally asymmetric surface,
 wherein the rotationally asymmetric surface is a plane-symmetric three-dimensional surface having only one plane of symmetry, and wherein said left eye ocular lens system and said night eye ocular lens system each comprises a first reflecting surface, a second reflecting surface, and a first transmitting surface, wherein light rays enter each said ocular lens system through the corresponding first transmitting surface and are reflected by the corresponding first reflecting surface and then reflected by the corresponding second reflecting surface to exit from each said ocular lens system through the corresponding first transmitting surface.

114. A pair of binoculars comprising:

a right eye objective lens system and a left eye objective lens system, both said objective lens systems being provided in the binoculars;

said left eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, wherein said left eye objective lens system and said night eye objective lens system each comprises a first reflecting surface, a second reflecting surface, a first transmitting surface, and a second transmitting surface, wherein light rays enter each said objective lens system through the corresponding first transmitting surface and are reflected by the corresponding first reflecting surface and then reflected by the corresponding second reflecting surface to exit from each said objective lens system through the corresponding second transmitting surface, and wherein the first corresponding reflecting surface and the second corresponding transmitting surface are portions of a single surface.

115. A pair of binoculars comprising:

a right eye ocular lens system and a left eye ocular lens system, both said ocular lens systems being provided in the binoculars;

said left eye ocular lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye ocular lens system having at least an optical surface for one of transmitting rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, wherein said left eye ocular lens system and said right eye ocular lens system each comprises a first reflecting surface, a second reflecting surface, a first transmitting surface, and a second transmitting surface, wherein light rays enter each said ocular lens system through the corresponding first transmitting surface and are reflected by the corresponding first reflecting surface and then reflected by the corresponding second reflecting surface to exit from each said ocular lens system through the corresponding second transmitting surface, and wherein the first corresponding reflecting surface and the second corresponding transmitting surface are portions of a single surface.

116. The binoculars as set forth in claim 114 or 115, wherein said light rays define an optical path in said optical system, said optical path having intersecting portions.

117. The binoculars as set forth in claim 114 or 115, wherein the corresponding first transmitting surface and the corresponding second reflecting surface are a same surface.

118. A pair of binoculars comprising:

a right eye objective lens system and a left eye objective lens system, both said objective lens systems being provided in the binoculars;

said left eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, and wherein said left eye objective lens system and said right eye objective lens system each are integrally formed as a unitary lens structure and comprise a first reflecting surface, a second reflecting surface, a third reflecting surface, a first transmitting surface, and a second transmitting surface, wherein light rays enter each said objective lens system through the corresponding first transmitting surface and are reflected successively by the corresponding first, second and third reflecting surfaces to exit from each said objective lens system through the corresponding second transmitting surface in a direction different from a direction in which the light rays are incident on the corresponding first transmitting surface.

119. A pair of binoculars comprising:

a right eye ocular lens system and a left eye ocular lens system, both said ocular lens systems being provided in the binoculars;

said left eye ocular lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye ocular lens system having at least an optical surface for one of transmitting rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, and wherein said left eye ocular lens system and said right eye ocular lens system each are integrally formed as a unitary lens structure and comprise a first reflecting surface, a second reflecting surface, a third reflecting surface, a first transmitting surface, and a second transmitting surface wherein light rays enter each said ocular lens system through the corresponding first transmitting surface and are reflected successively by the corresponding first, second and third reflecting surfaces to exit from each said ocular lens system through the corresponding second transmitting surface in a direction different from a direction in which the light rays are incident on the corresponding first transmitting surface.

120. The binoculars as set forth in claim 118 or 119, wherein the corresponding first transmitting surface and the corresponding second reflecting surface are portions of a single surface.

121. The binoculars as set forth in claim 118 or 119, wherein the corresponding first reflection surface and the corresponding third reflection surface are portions of a single surface.

122. The binoculars as set forth in claim 118 or 119, wherein the corresponding first transmitting surface and the corresponding third reflecting surface are portions of a single surface.

123. The binoculars as set forth in claim 118 or 119, wherein the corresponding second transmitting surface and the corresponding second reflecting surface are portions of a single surface.

124. A pair of binoculars comprising:

a right eye objective lens system and a left eye objective lens system, both said objective lens systems being provided in the binoculars;

said left eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye objective lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, and wherein said left eye objective lens system and said right eye objective lens system each are integrally formed as a unitary lens structure and comprise at least a first reflecting surface, a second reflecting surface, a third reflecting surface, a fourth reflecting surface, a first transmitting surface, and a second transmitting surface, wherein light rays enter each said objective lens system through the corresponding first transmitting surface and are reflected successively by the first, second, third and fourth reflecting surfaces to exit from each said objective lens system through the corresponding second transmit ting surface in a direction different from a direction in which the light rays are incident on the corresponding first transmitting surface.

125. A pair of binoculars comprising:

a right eye ocular lens system and a left eye ocular lens system, both said ocular lens systems being provided in the binoculars;

said left eye ocular lens system having at least an optical surface for one of transmitting light rays and reflecting light rays, said optical surface having a curved shape, said curved surface having no axis of rotational symmetry into or out of said optical surface, wherein rotationally asymmetric aberrations due to decentration are corrected by the rotationally asymmetric surface, and said right eye ocular lens system having at least an optical surface for one of transmitting rays and reflecting light rays, said optical surface having a curved shape, said curved surface having no axis of rotational symmetry into or out of said optical surface, wherein rotationally asymmetric aberrations due to decentration are corrected by the rotationally asymmetric surface, wherein the rotationally asymmetric surface is a plane-symmetric three-dimensional surface having only one plane of symmetry, and wherein said left eye ocular lens system and said right eye ocular lens system each are integrally formed as a unitary lens structure and comprise at least a first reflecting surface, a second reflecting surface, a third reflecting surface, a fourth reflecting surface, a first transmitting surface, and a second transmitting surface, wherein light rays enter each said ocular lens system through the corresponding first transmitting surface and are reflected successively by the corresponding first, second, third and fourth reflecting surfaces to exit from each said ocular lens system through the corresponding second transmitting surface in a direction different from a direction in which the light rays are incident on the corresponding first transmitting surface.

126. The binoculars as set forth in claim 112, 113, 114, 115, 118, 119, 124 or 125, wherein the plane of symmetry of said rotationally asymmetric surface is disposed in a plane approximately coincident with a decentration plane, and a direction of decentration of each surface constituting the optical system is in said decentration plane.

127. The binoculars as set forth in claim 112, 113, 114, 115, 118, 119, 124 or 125, wherein said rotationally asymmetric surface is a reflecting surface.

128. The binoculars as set forth in claim 127, wherein said reflecting surface is a surface having totally reflecting action.

129. The binoculars as set forth in claim 112, 113, 114, 115, 118, 119, 124 or 125, wherein said rotationally asymmetric surface having only one plane of symmetry is a back-coated mirror.

130. The binoculars as set forth in claim 112, 113, 114, 115, 118, 119, 124 or 125, wherein said rotationally asymmetric surface is tilted with respect to a principal ray which is a light ray emanating from a center of an object point and passing through a center of a pupil to reach a center of an image.

131. The binoculars as set forth in claim 112, 113, 114, 115, 118, 119, 124 or 125, wherein a light ray emanating from a center of an object point and passing through a center of a pupil to reach a center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter one of said objective lens systems and said ocular lens systems from an entrance side thereof, and the sine of an angle formed between said two rays as projected on the XZ-plane at an exit side of said optical system is denoted by NA'X, and further a value obtained by dividing the distance d between said parallel rays by the NA'X is denoted by FX, and the focal length in the X-axis direction of a portion of said rotationally asymmetric surface on which the axial principal ray strikes is denoted by FXn, the following condition is satisfied:

$$-1000 < FX/FXn < 1000.$$

132. The binoculars as set forth in claim 112, 113, 114, 115, 118, 119, 124 or 125, wherein a light ray emanating from a center of an object point and passing through a center of a pupil to reach a center of an image is defined as a principal ray, and a Y-axis is taken in the decentration plane of the surface, and an X-axis is taken in a direction perpendicularly intersecting the Y-ax is, and further an axis constituting an orthogonal coordinate system in combination with the X- and Y-axes is defined as a Z-axis, and further said principal ray and a light ray which is parallel to said principal ray at a distance d in the Y-axis direction are made to enter one of said objective lens systems and said ocular lens systems from an entrance side thereof, and the sine of an angle formed between said two rays in the YZ-plane at an exit side of said optical system is denoted by NA'Y, and further a value obtained by dividing the distance d between said parallel rays by the NA'Y is denoted by FY, and the focal length in the Y-axis direction of a portion of said rotationally asymmetric surface on which the axial principal ray strikes is denoted by FYn, the following condition is satisfied:

$$-1000 < FY/FYn < 1000.$$

133. The binoculars as set forth in claim 112, 113, 114, 115, 118, 119, 124 or 125, wherein a light ray emanating from a center of an object point and passing through a center of a pupil to reach a center of an image is defined as a principal ray, and a Y-axis is taken in the decentration plane of the surface, and an X-axis is taken in a direction perpendicularly intersecting the Y-axis, and further an axis constituting an orthogonal coordinate system in combination with the X- and Y-axes is defined as a Z-axis, and further said principal ray and a light ray which is parallel to said principal ray at a distance d in the X-axis direction are made to enter one of said objective lens systems and said ocular lens systems from an entrance side thereof, and the sine of an angle formed between said two rays as projected on the XZ-plane at the exit side of said optical system is denoted by NA'X, and a value obtained by dividing the distance d between said parallel rays by the NA'X is denoted by FX, and further the principal ray and a light ray which is parallel to the principal ray at a distance d away from it in the Y-axis direction are made to enter one of said objective lens systems and said ocular lens systems from the entrance side thereof, and the sine of an angle formed between said two rays in the YZ-plane at the exit side of said objective lens system or said ocular lens system is denoted by NA'Y, and a value obtained by dividing the distance d between said parallel rays by the NA'Y is denoted by FY, the following condition is satisfied:

$$0.01 < |FY/FX| < 100.$$

134. The binoculars as set forth in claim 124 or 125, wherein at least one of the first transmitting surfaces and the corresponding second reflecting surface are portions of a single surface.

135. The binoculars as set forth in claim 124 or 125, wherein at least one of the second transmitting surfaces and the corresponding third reflecting surface are portions of a single surface.

136. The binoculars as set forth in claim 124 or 125, wherein at least one of the first reflecting surfaces and the corresponding third reflecting surface are portions of a single surface.

137. The binoculars as set forth in claim 124 or 125, wherein at least one of the second reflecting surfaces and the corresponding fourth reflecting surface are portions of a single surface.

138. The binoculars as set forth in claim 124 or 125, wherein at least one of the first transmitting surfaces, the corresponding second reflecting surface, and the corresponding fourth reflecting surface are portions of a single surface.

139. The binoculars as set forth in claim 124 or 125, wherein at least one of the first transmitting surfaces and the corresponding second reflecting surface are portions of a single surface, and wherein at least one of the first reflecting surfaces and the corresponding third reflecting surface are portions of a single surface.

140. The binoculars as set forth in claim 124 or 125, wherein at least one of the first transmitting surfaces and the corresponding second reflecting surface are portions of a single surface, and wherein at least one of the second transmitting surfaces and the corresponding third reflecting surface are portions of a single surface.

141. The binoculars as set forth in claim 124 or 125, wherein at least one of the first reflecting surfaces and the corresponding third reflecting surface are portions of a single surface, and wherein at least one of the second reflecting surfaces and the corresponding fourth reflecting surface are portions of a single surface.

142. The binoculars as set forth in claim 124 or 125, wherein at least one of the second reflecting surfaces and the corresponding fourth reflecting surface are portions of a single surface, and wherein at least one of the second transmitting surfaces and the corresponding third reflecting surface are portions of a single surface.

143. The binoculars as set forth in claim 124 or 125, wherein at least one of the first transmitting surfaces, the corresponding second reflecting surface, and the corresponding fourth reflecting surface are portions of a single surface, and wherein at least one of the second transmitting surfaces and the corresponding third reflecting surface are portions of a single surface.

144. The binoculars as set forth in claim 124 or 125, wherein at least one of the first transmitting surfaces, the corresponding second reflecting surface, and the corresponding fourth reflecting surface are portions of a single surface, and wherein at least one of the first reflecting surfaces and the corresponding third reflecting surface are portions of a single surface.

145. The binoculars as set forth in claim 124 or 125, wherein at least one of the first transmitting surfaces and the corresponding second reflecting surface are portions of a single surface, and wherein at least one of the second transmitting surfaces, the corresponding first reflecting surface, and the corresponding third reflecting surface are portions of a single surface.

146. The binoculars as set forth in claim 124 or 125, wherein at least one of the second reflecting surfaces and the corresponding fourth reflecting surface are portions of a single surface, and wherein at least one of the second transmitting surfaces, the corresponding first reflecting surface, and the corresponding third reflecting surface are portions of a single surface.

147. The binoculars as set forth in claim 124 or 125, wherein at least one of the first transmitting surfaces, the corresponding second reflecting surface, and the corresponding fourth reflecting surface are a same surface, and wherein at lest one of the second transmitting surfaces, the corresponding first reflecting surface, and the corresponding third reflecting surface are a same surface.

148. The binoculars as set forth in claim 113, 115, 119 or 125, further comprising an ocular optical system having a folded optical path comprising a reflecting surface having power.

149. The binoculars as set forth in claim 112, 114, 118 or 124, further comprising an objective optical system having a folded optical path comprising a reflecting surface having power.

150. The binoculars as set forth in claim 112, 114, 118 or 124, further comprising a night eye ocular optical system and a left eye ocular optical system, both said ocular optical systems being provided in the binoculars, a combination of the right and left objective lens systems and the right and left ocular optical systems forming an afocal optical system.

151. The binoculars as set forth in claim 150, wherein said afocal optical system is constructed to obtain an erect image by an even number of reflections.

152. The binoculars as set forth in claim 113, 115, 119 or 125, further comprising a right eye objective optical system and a left eye objective optical system, both said objective optical systems being provided in the binoculars, a combination of the right and left objective optical systems and the right and left ocular lens systems forming an afocal optical system.

153. The binoculars as set forth in claim 152, wherein said afocal optical system is constructed to obtain an erect image by an even number of reflections.

* * * * *